(12) United States Patent
Mitola, III

(10) Patent No.: US 11,093,616 B2
(45) Date of Patent: Aug. 17, 2021

(54) SOFT-WIRED RADIO (SWR) WEB MACHINE

(71) Applicant: Hackproof Technologies Inc., Cocoa Beach, FL (US)

(72) Inventor: Joseph Mitola, III, Cocoa Beach, FL (US)

(73) Assignee: Hackproof Technologies Inc., Cocoa Beach, FL (US)

( * ) Notice: Subject to any disclaimer, the term of this patent is extended or adjusted under 35 U.S.C. 154(b) by 97 days.

(21) Appl. No.: 16/400,207

(22) Filed: May 1, 2019

(65) Prior Publication Data
US 2019/0258801 A1    Aug. 22, 2019

Related U.S. Application Data

(63) Continuation of application No. 15/292,371, filed on Oct. 13, 2016, now Pat. No. 10,303,881.
(Continued)

(51) Int. Cl.
*H04L 29/06* (2006.01)
*G06F 21/57* (2013.01)
(Continued)

(52) U.S. Cl.
CPC .............. *G06F 21/57* (2013.01); *G06F 21/53* (2013.01); *G06F 21/56* (2013.01); *G06F 21/74* (2013.01);
(Continued)

(58) Field of Classification Search
CPC .......... G06F 21/57; G06F 21/53; G06F 21/56; G06F 21/74; G06F 21/76; H04W 12/10;
(Continued)

(56) References Cited

U.S. PATENT DOCUMENTS 6,006,264 A    12/1999    Colby et al.
8,875,227 B2   10/2014    Kundu et al.
(Continued)

FOREIGN PATENT DOCUMENTS

CN    1059799 A    3/1992
CN    1467658 A    1/2004
(Continued)

OTHER PUBLICATIONS

Perkowski, Marek Andrzej, "Learning Hardware," Jun. 24, 2010, retrieved from http://web.cecs.pdx.edu/mperkows/CLASS_VHDL_99/tran888/lecture008-learning-hardware.pdf, retrieved Jun. 13, 2014, pp. 1-119.
(Continued)

*Primary Examiner* — Taghi T Arani
*Assistant Examiner* — Lin Chang
(74) *Attorney, Agent, or Firm* — Banner & Witcoff, Ltd.

(57) ABSTRACT

A domain-specific hardwired symbolic communications machine is described that processes information via the hardwired mapping of symbols from one or more domains onto other such domains, computing and communicating with improved security and reduced power consumption because it has no CPU, no Random Access Memory (RAM), no instruction registers, no Instruction Set Architecture (ISA), no operating system (OS) and no applications programming. The machine provides web services by recognizing valid requests based on the processing of symbols and the validating of those symbols according to various domains. In some embodiments the requests may conform or be related to, for example, Long Term Evolution (LTE), Hypertext Transfer Protocol (HTTP), or fourth generation (4G) wireless technology. Further, in some embodiments, the machine has no unconstrained RAM into which malware may insert itself and needs no anti-virus software.

20 Claims, 16 Drawing Sheets

Related U.S. Application Data

(60) Provisional application No. 62/240,724, filed on Oct. 13, 2015.

(51) Int. Cl.

| | |
|---|---|
| *G06F 21/74* | (2013.01) |
| *G06F 21/76* | (2013.01) |
| *H04W 12/10* | (2021.01) |
| *G06F 21/53* | (2013.01) |
| *G06F 21/56* | (2013.01) |
| *H04B 1/00* | (2006.01) |
| *H04L 29/08* | (2006.01) |

(52) U.S. Cl.
CPC ............ *G06F 21/76* (2013.01); *H04W 12/10* (2013.01); *H04B 1/0003* (2013.01); *H04L 67/02* (2013.01); *H04L 69/12* (2013.01); *Y02D 30/70* (2020.08)

(58) Field of Classification Search
CPC ...... Y02D 30/70; H04B 1/0003; H04L 67/02; H04L 69/12
See application file for complete search history.

(56) References Cited

U.S. PATENT DOCUMENTS

| | | | |
|---|---|---|---|
| 9,246,523 B1 | 1/2016 | Stopler et al. | |
| 9,490,885 B1* | 11/2016 | Zheng | H04W 52/42 |
| 10,013,384 B1 | 7/2018 | Wang-Roveda et al. | |
| 2009/0054016 A1 | 2/2009 | Waheed et al. | |
| 2011/0264721 A1 | 10/2011 | Patel et al. | |
| 2011/0302397 A1 | 12/2011 | Mitola, III | |
| 2012/0131316 A1 | 5/2012 | Mitola, III et al. | |
| 2013/0064176 A1* | 3/2013 | Hsu | H04W 36/14 370/328 |
| 2013/0208647 A1* | 8/2013 | Kottkamp | H04W 74/08 370/312 |
| 2014/0223561 A1* | 8/2014 | Mitola, III | G06F 11/0721 726/23 |
| 2015/0096006 A1 | 4/2015 | Chu et al. | |

FOREIGN PATENT DOCUMENTS

| | | |
|---|---|---|
| CN | 1811630 A | 8/2006 |
| CN | 101236574 A | 8/2008 |
| CN | 102694756 A | 9/2012 |
| TW | 200937293 A | 9/2009 |

OTHER PUBLICATIONS

Perkowski, et al, "Evolvable Hardware or Learning Hardware? Induction of State Machines from Temporal Logic Constraints," Evolvable Hardware, 1999. Proceeding of the First NASA/DOD Workshop O N. Pasadena, CA, Jul. 19-21, 1999, pp. 129-138.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Jul. 2, 2014 (WO) International Search Report and Written Opinion—App. PCT/US2014/013337.

Jul. 30, 2015 U.S. Non-Final Office Action—U.S. Appl. No. 13/799,277.

Sep. 28, 2015 (WO) International Search Report—App. PCT/US2015/037182.

WebPHY DATABUS: "WebPHY DATABUS—A Web Server/Ethernet IP Core for FPGAs", Jun. 3, 2013, Retrieved from the Internet: URL: https:ljwww.youtube.com/watch?v=QQRmjNZXH5g, 1 page, retrieved on Sep. 17, 2015.

Magdaleno, et al., "A FPGA Embedded Web Server for Remote Monitoring and Control of Smart Sensors Networks," SENSORS, vol. 14, No. 1, Dec. 27, 2013, pp. 416-430.

Arab, Gawen, "Web Server on a FPGA, without CPU, only VHDL (French)," Jan. 29, 2010, Retrieved from the Internet: URL:https://www.youtube.com/watch?, v=7syu5E, retrieved on Sep. 17, 2015, 1 page.

Anonymous: "Anatomy of an HTTP Transaction—Web Performance Monitoring and Optimization," catchpoint.com; May 14, 2013, Retrieved from the Internet: URL:https://web.archive.org/web/20130514104338//http://blog.catchpoint.com/2010/09/17//anatomyhttp; [retrieved on Sep. 18, 2015] p. 1-4.

Wikipedia, "Field-programmable gate array," Feb. 4, 2013, retrieved Jun. 13, 2013 from: http://en.wikipedia.org/w/index.php?title=Field=programmalbe_gate_array&oldid=536512233.

Jan. 3, 2017 (WO) International Search Report and Written Opinion—App. PCT/US2016/056809.

May 20, 2016 U.S. Non-Final Office Action—U.S. Appl. No. 14/321,097.

Jan. 12, 2016 U.S. Final Office Action—U.S. Appl. No. 13/799,277.

Dec. 12, 2017—U.S. Non-Final Office Action—U.S. Appl. No. 14/825,813.

Apr. 19, 2017—(CN) First Office Action—App 201480019881.X, Eng Tran.

Jul. 13, 2018—U.S. Non-Final Office Action—U.S. Appl. No. 14/825,813.

Nov. 30, 2020—U.S. Notice of Allowance—U.S. Appl. No. 15/682,101.

* cited by examiner

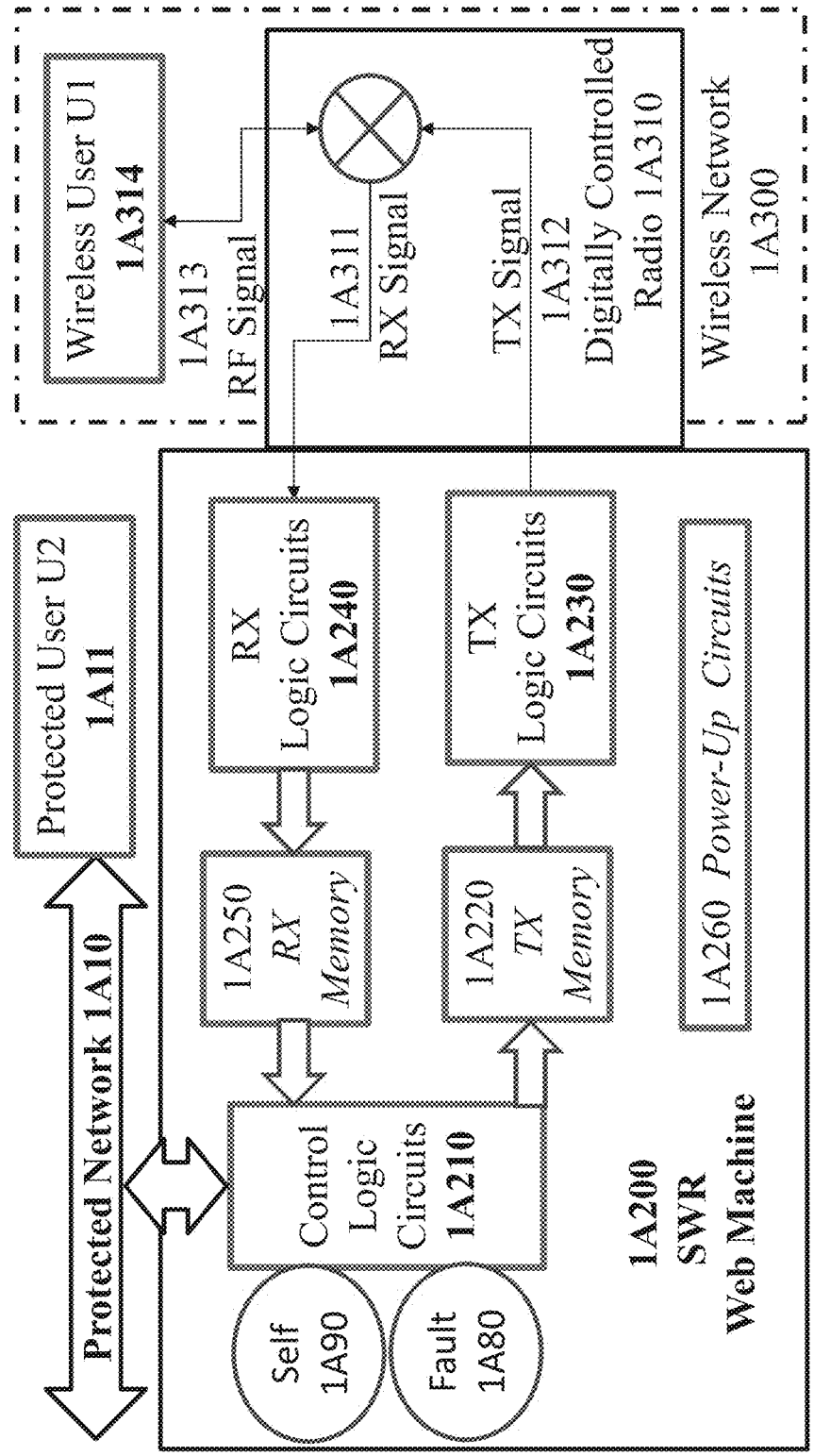

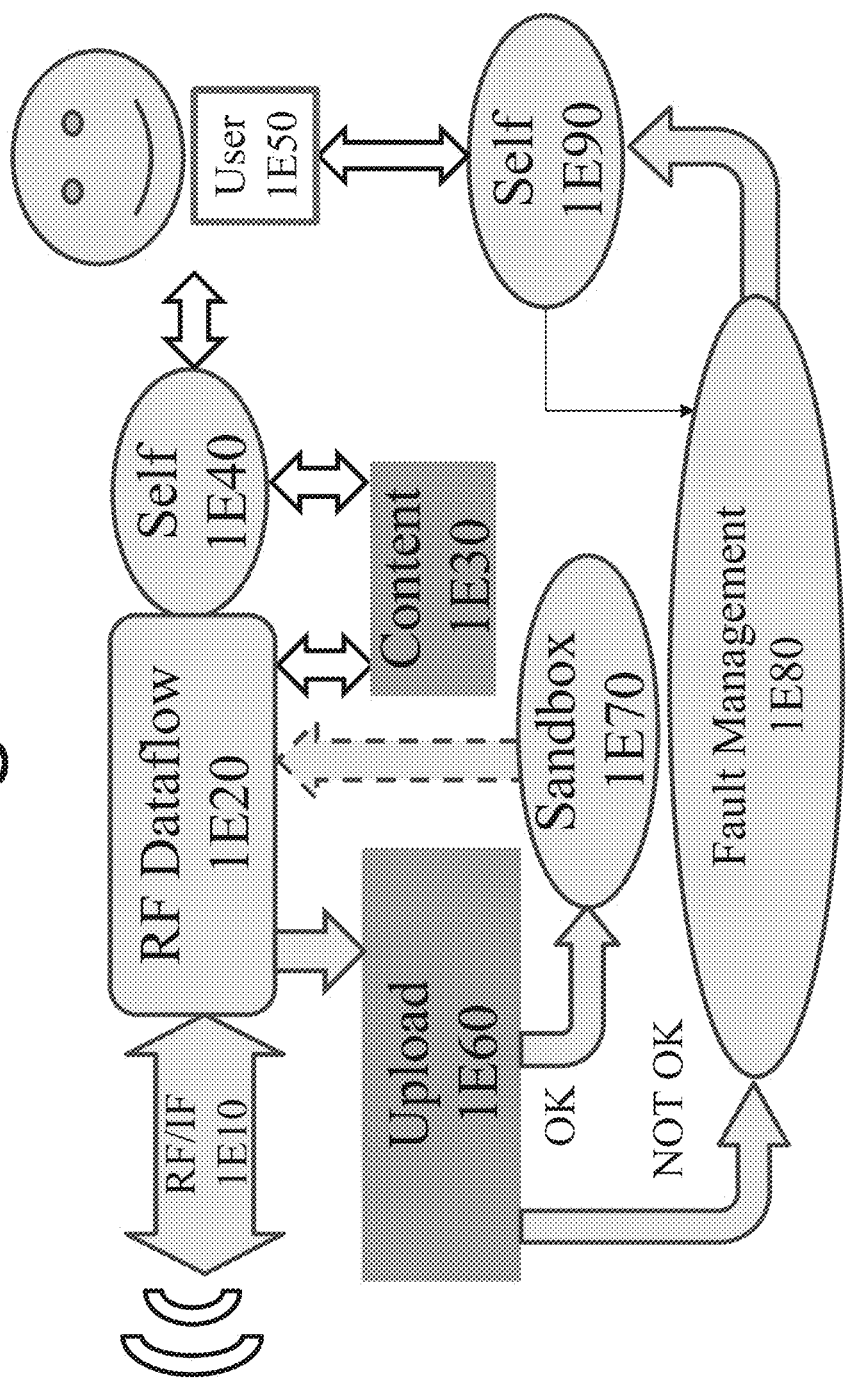

Fig 2A

2A10 Symbol a

2A20 ( )

2A30 'RRB1'

2A40 "Payload"

- 2A31 'RF' '2400'
- 2A41 'TX' "2401"

2A00

2A50
- 2A51 (Thing)
- 2A52 (Thing [Place])
- 2A53 {Path [Place1] ... [Place N]}
- 2A54 /Action (Actor) {Path place (Object)]}\
- 2A55 <Cause (Actor) /Action >
- 2A56 (Event [Place] (Time) /Action\)

©2016 Hackproof Technologies Inc.

Specification for messaging via a smart radio controller in text form:

"A smart radio controller shall receive data from an RF channel according to an LTE protocol stack; one message from a sending user U1; a POST operation shall transmit the message via LTE to a receiving user U2; an inverse flow shall transmit data from U2 via a TX domain of an RF domain to user U1. Messages shall be text of length less than 120 characters of English text; allowed movie ratings are G, PG, PG13."

2B200 providing 2B100 in symbolic form:

(Self (things [RF [TX (frame)(payload)][RX[(frame) (payload)] [protocol(LTE)] )
{TOP {Receiving {[User U1(message)] → [RF[RX([LTE(payload)] → (message)]] →
[HTTP[POST(User U2(message)]}
{Transmitting [HTTP[POST[User U2(message) → (payload)]]] → [RF[TX([LTE (payload)]]] → [(User U2(message)]}{(message) →[text[English(message)]}
{(LTE[RX[frame]] → (LTE(TX(ACK))} {[>)(message)120] → (message[1..120])} }
{Receiving[Movie[NetFlix[Ratings (G) (PG) (PG13)]]}

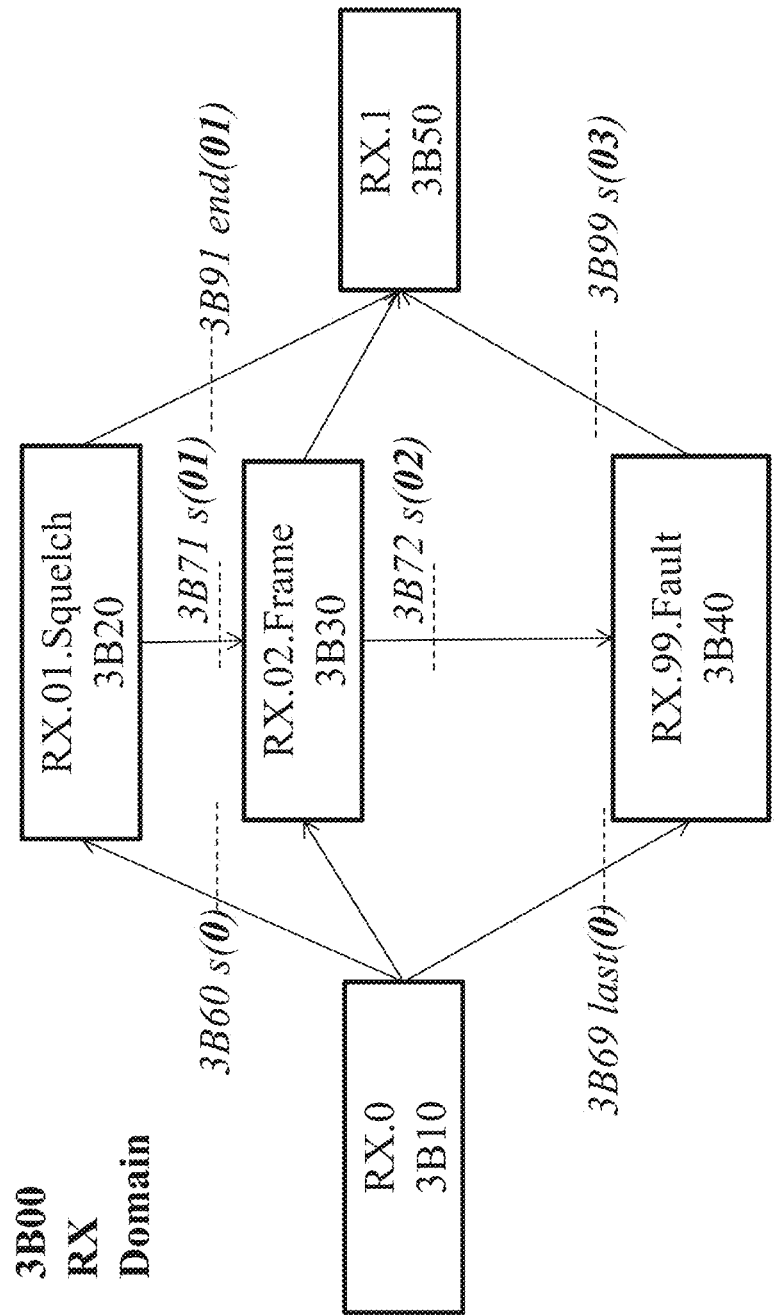

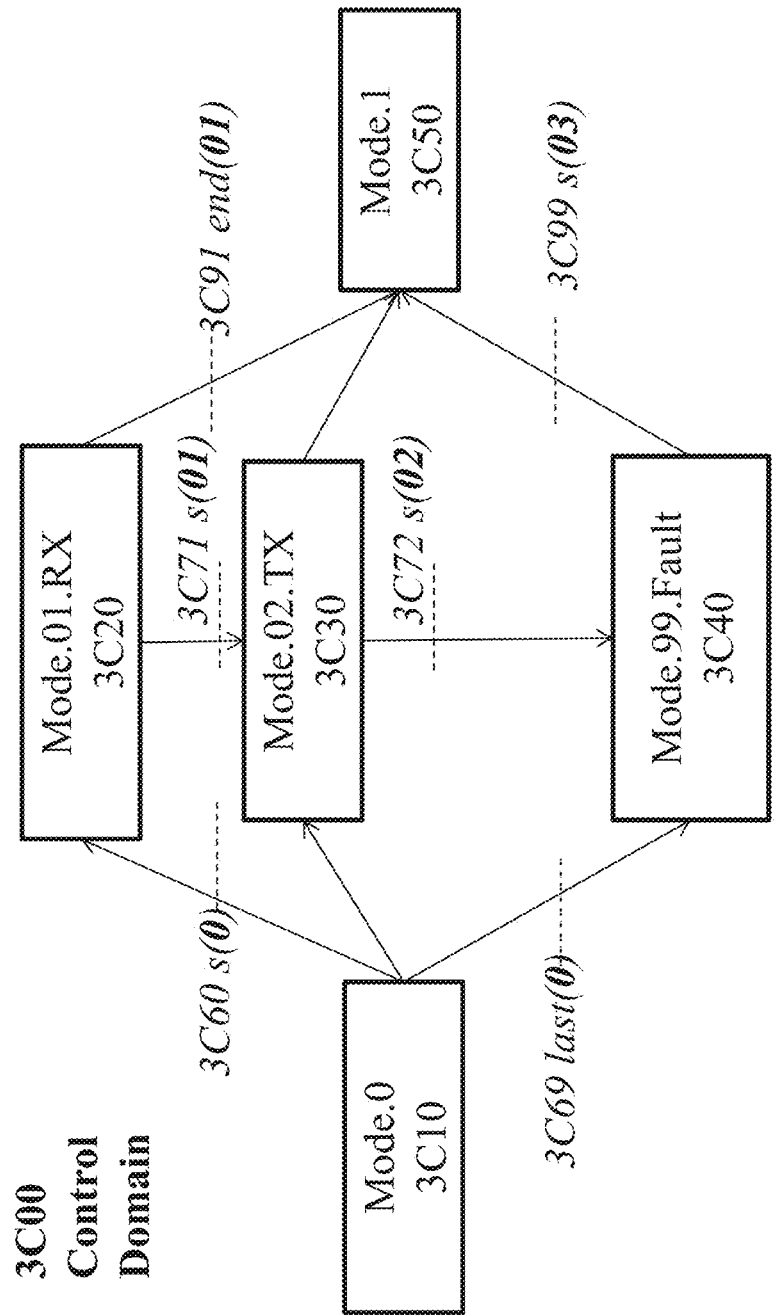

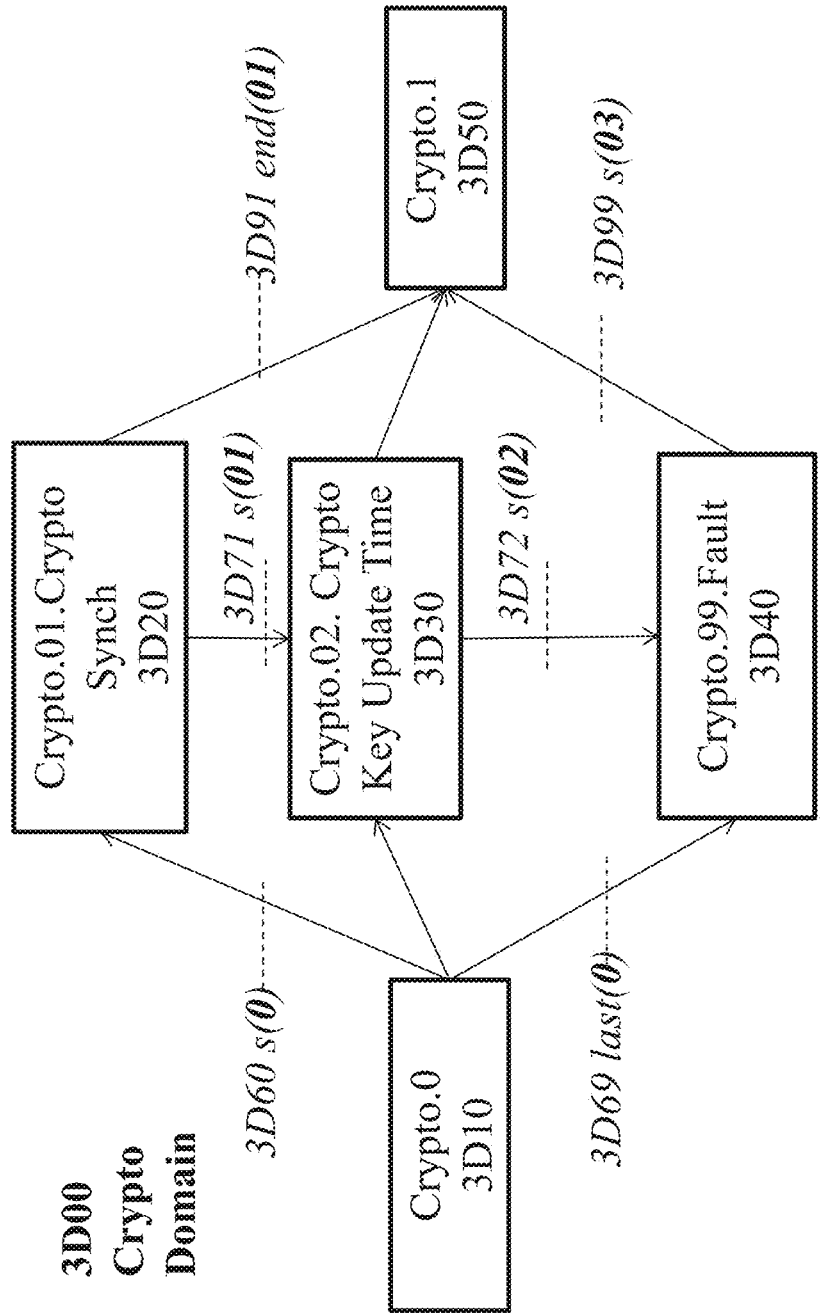

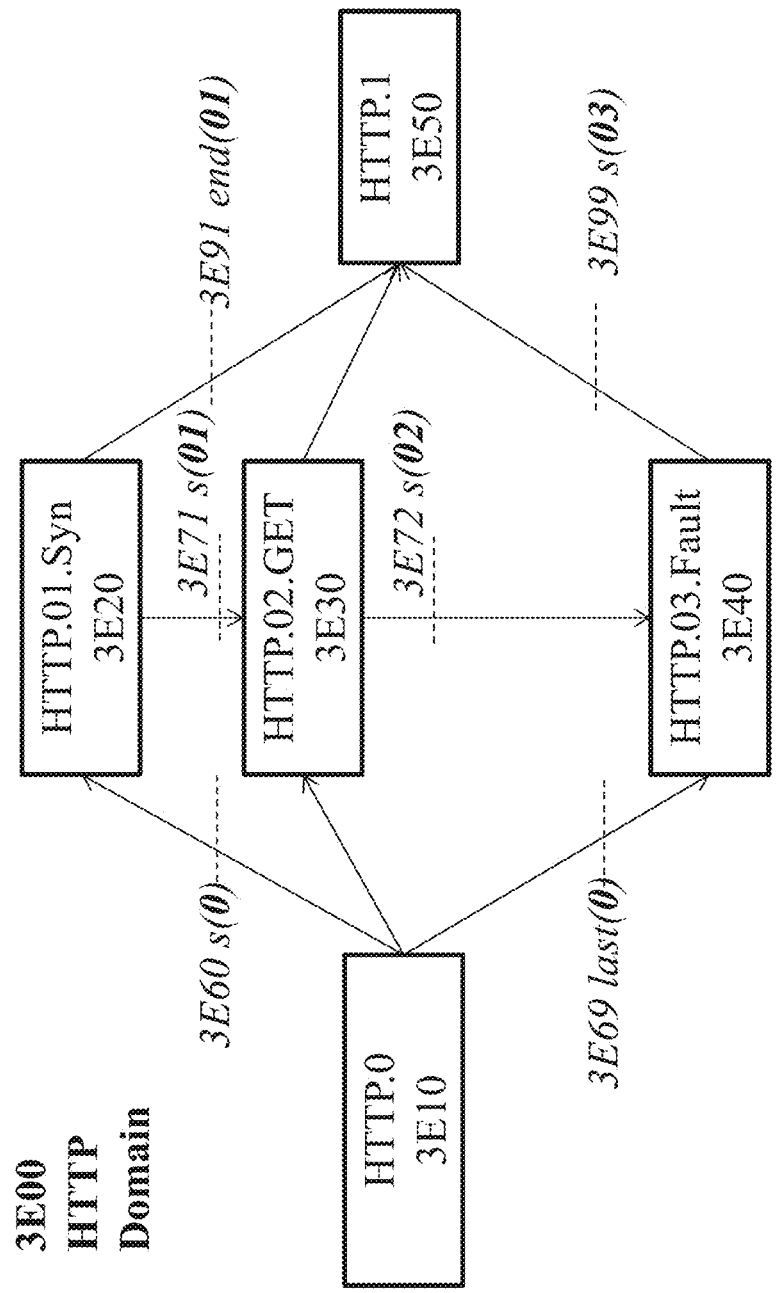

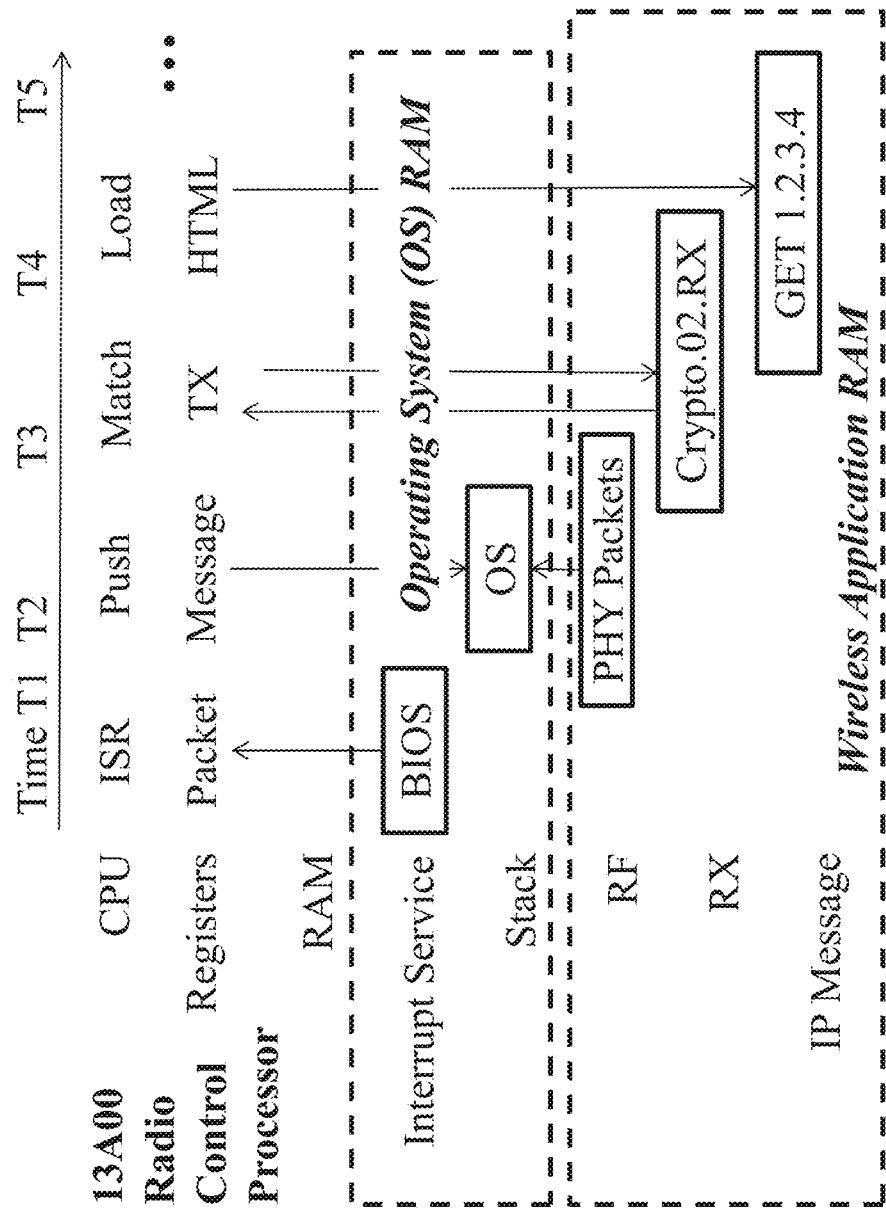

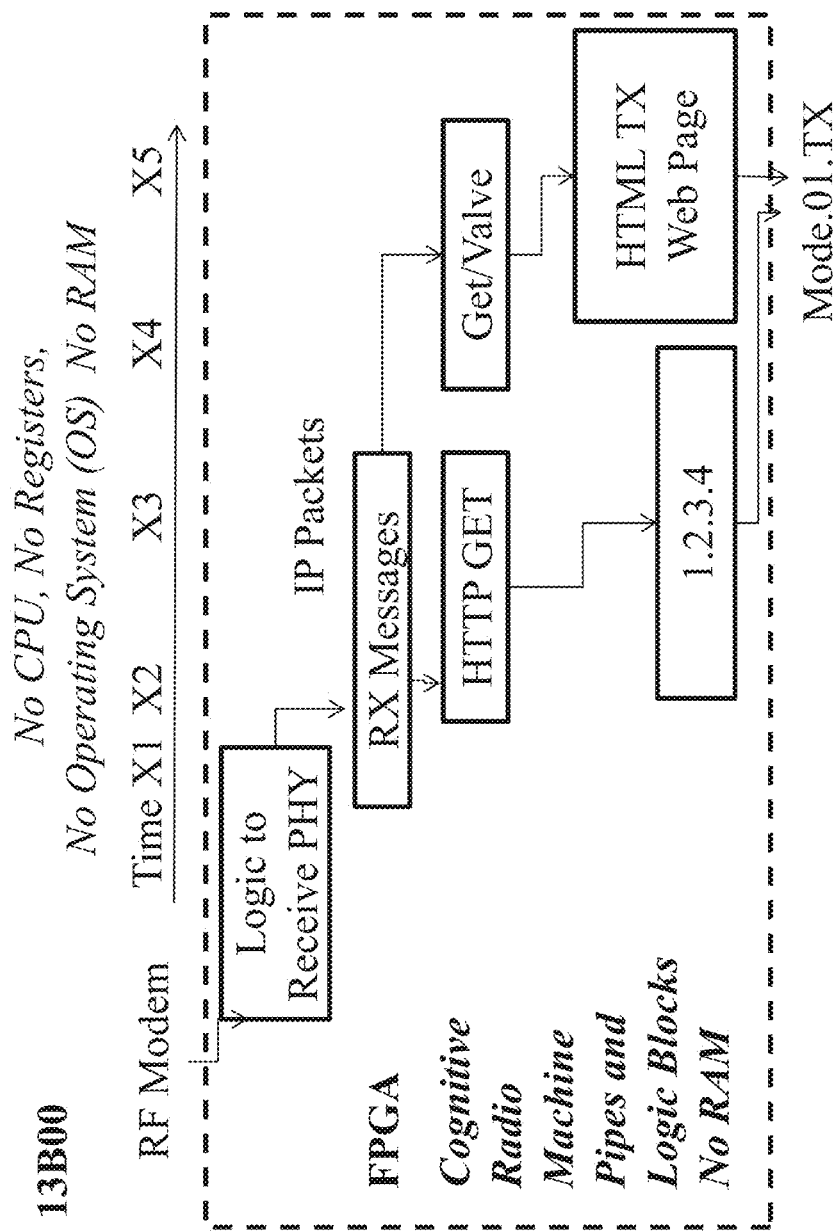

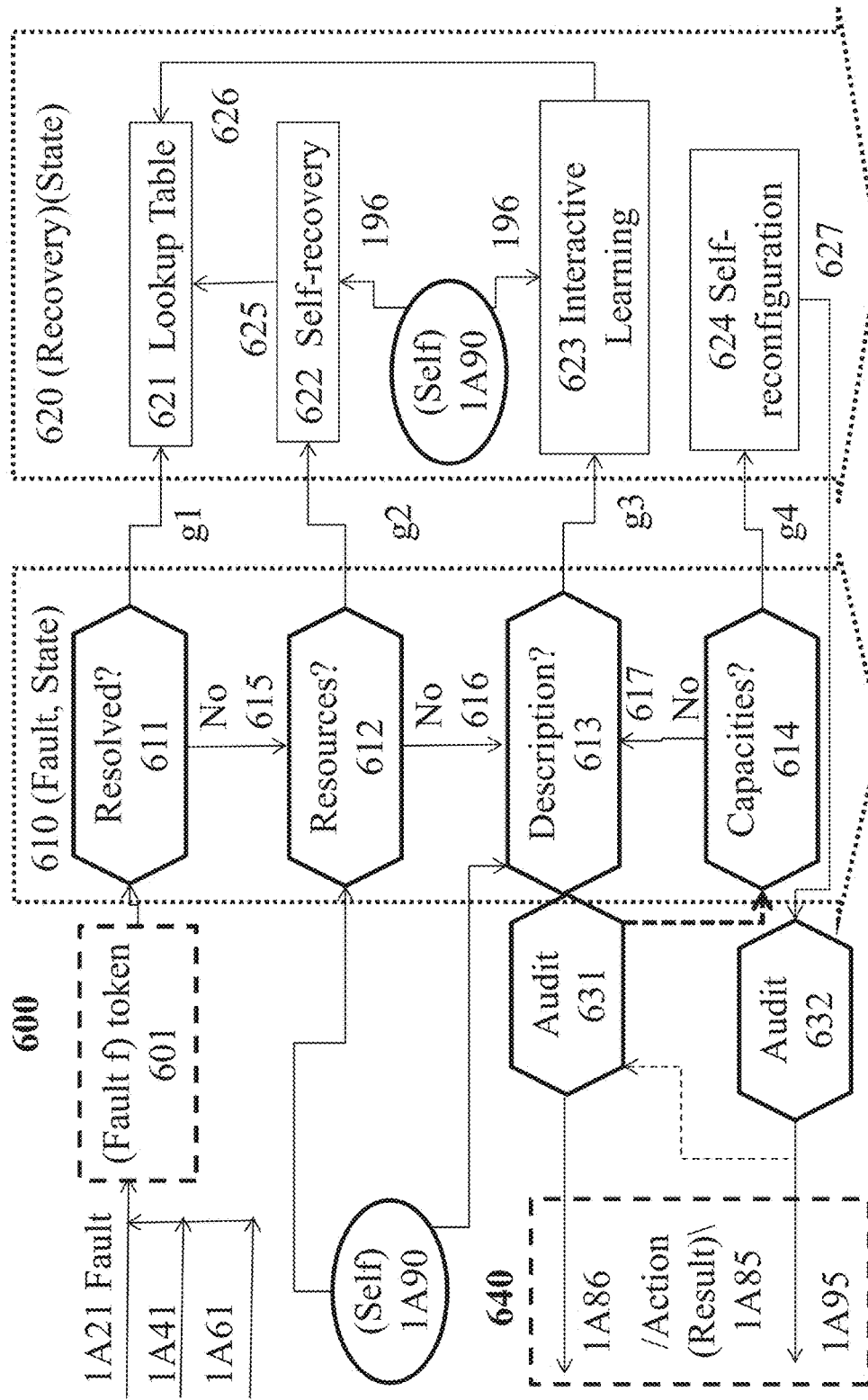

SOFT-WIRED RADIO (SWR) WEB MACHINE

CROSS REFERENCE TO RELATED APPLICATIONS

This Application is a Continuation of application Ser. No. 15/292,371, filed on Oct. 13, 2016, which claims the benefit of U.S. Provisional Application 62/240,724, filed on Oct. 13, 2015, entitled "A Soft-Wired Radio (SWR) Web Machine." Additionally, the present application is related by subject matter to the following applications: U.S. Non-Provisional application Ser. No. 14/321,097, entitled "A Domain-Specific Hardwired Web Server Machine," filed on Jul. 1, 2014, issued Dec. 13, 2016 as U.S. Pat. No. 9,519,806; U.S. Non-Provisional application Ser. No. 14/825,813, entitled "A Domain-Specific Hardwired eCommerce Learning Machine," filed on Aug. 13, 2015, issued Mar. 26, 2019 as U.S. Pat. No. 10,242,365; U.S. Non-Provisional application Ser. No. 13/799,277, entitled (as filed) "A Domain Specific Hardwired Symbolic Machine," filed Mar. 13, 2013, issued Dec. 13, 2016 as U.S. Pat. No. 9,519,804, which is a non-provisional of U.S. Provisional Application 61/760,913, filed Feb. 5, 2013; and U.S. Non-Provisional application Ser. No. 15/682,101, entitled "Domain-Specific Hardwired Web Browser Machine," filed Aug. 21, 2017, which is a non-provisional of U.S. Provisional Application 62/377,912, filed Aug. 22, 2016. Each of the above-mentioned applications is incorporated herein by reference in its entirety.

COPYRIGHT AUTHORIZATION

A portion of the disclosure contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This application is related to secure computing and wireless communications.

BACKGROUND

Wireless devices are configured to perform various functions including, for example, the ability to access large, complex networks like GSM (also called second generation or 2G networks), third (3G), fourth (4G) and envisioned fifth generation (5G) wireless networks. A software-defined radio (SDR) may be a wireless device (e.g., a 2G or 4G handset or base station) whose function is defined in software on a general purpose computer (GPC) (also called a general purpose processor (GPP)) and/or digital and analog radio hardware. Devices within contemporary 4G SDR networks may connect and transmit digital communications to computer-based consumer electronics (smart phones, tablet computers, etc.). Based on the communications, various functions may be performed including the execution of a command, an access of a database, the display of various types of information, and the like. Devices that are able to connect to a 4G SDR network (also referred to as 4G SDR devices and/or 4G SDR terminals) may incorporate processor elements (PE) such as a central processor unit (CPU) with an associated memory hierarchy of cache, random access memory (RAM), hard drive(s) and/or network storage. PE's may be organized into a system on chip (SoC) or network on chip (NoC) of many PEs and memories, such as a graphics processing unit (GPU). A GPU may incorporate one or more application-specific integrated circuit (ASIC) co-processors, such as a floating point unit, or may incorporate a reconfigurable co-processor such as a field programmable gate array (FPGA). Such 4G SDR terminals may incorporate general purpose computers that require an operating system (OS) such as Google Android, Microsoft Windows, Apple iOS, or Linux and may support various protocols and/or architectures such as the Internet Protocol (IP) or the Evolved Packet Core (EPC). Networks that rely on wireless technology may use, for example, backhaul point to point radio links for status reporting and a Policy and Charging Rules Function (PCRF) of a wireless service provider for control. Users of 4G SDR include many small, medium, large, and global enterprises including federal, state, and local governments.

Conventional 4G SDR devices may support and/or use various types of conventional computer technology in connection with performing its functions. For example, some 4G SDR functions may be supported by software programmed using computer programming languages such as assembly languages, C and C++, which are known in the art for computationally efficient software libraries offering basic capabilities (e.g., extending an OS). Other 4G SDR software packages can be created using other languages including higher level computer languages such as Python, FORTRAN, Java, PHP, and JavaScript and may include 4G SDR functions such as recording network transactions and facilitating user interface services (e.g., 4G SDR wireless services built on OS services). Some 4G SDR functions may use one or more virtual machines or some other type of virtualized technology or remote computing technology. A virtual machine such as the Java Virtual Machine (JVM) may facilitate the use of a language like Java on a variety of computers and embedded 4G SDR controllers having a variety of instruction set architectures (ISAs). Other virtual machines may comprise a sandbox within which software for one ISA may be interpreted on a CPU having another ISA. Web services on multiple associated virtual machines (termed "the cloud") may be tailored via software tools (e.g. OpenStack) to provide 4G SDR services including control planes and databases that may be used to control one or more 4G SDR terminals. Some 4G SDR functions may use remote computing technology. For example, a military SDR terminal may incorporate no display per se, but may instead use the remote displays of a laptop or mobile consumer devices like smart phones (e.g. via a downloaded 4G SDR application via a wired or wireless commercial and military networks).

There are numerous news reports and technical papers on how malicious agents obtain fraudulent access to networks, escalate privileges, and then export data in huge quantities. 4G SDRs may facilitate such crimes. In view of the various types of conventional computer technology that a 4G SDR device uses in connection with performing its functions, the arrangement of computing hardware, OS, virtual machines, and software may be computationally inefficient. As one example, the arrangement may be inefficient because of the overhead involved with the pushing and popping of interrupt stacks in random access memory for software sharing one or more CPUs, virtual machines, and/or OS functions. Additionally, additional overhead may be incurred in connection with ensuring the cybersecurity of the 4G SDR device including, for example, scanning for malware and monitoring the contents of instruction registers for prohibited data and actions.

A public safety, corporate, or other proprietary system such as for shipping (e.g. Mersk lines), aircraft (e.g. Federal Express), robotic guard force (e.g. at a nuclear power plant), or ground vehicle (such as a UPS delivery truck) may incorporate networks of radios, some of a proprietary nature and others analogous to commercial 4G standard wireless networks, potentially incorporating commercial 4G SDR wireless base stations and user devices. Some such embedded computers may perform sensing (e.g. ship radar functions) while others perform Internet access while others perform control functions while others provide a user interface and while still others may provide wireless transmission, reception, control, and user interfaces simultaneously. Such computers embedded and otherwise housed aboard such mobile systems may be vulnerable to malware delivered by wireless networks, by uploads of software, e.g. during wireless network operations, via system configuration, or by files inserted on removable media such as a hard drive or USB stick. Related personal, military, and corporate information may include passwords to high level information networks or bank accounts made available on line by which fraudulent charges and other control actions may be made if the data is obtained by a thief, e.g. via malware such as a keystroke logger and related malicious wireless networking.

The vulnerability of a computing device to various cyber-attacks or malware may be due to the conventional architecture of a general computing device. General computing devices or machines have an arrangement of CPU registers, an instruction set architecture (ISA), and memory. Such general computing devices may be commonly referred to as Turing-equivalent (TE), and may be able to compute anything that is possible to envision. Many types of cybercrime exploit Turing-Equivalence. For example, by exploiting the vast degrees of freedom, uncontrolled states of registers and memory, and sequences of instructions (which may never terminate or return a result) that compose the OS, device drivers, software, and applications of a Turing-equivalent machine, various types of cybercrime may be performed. In other words, Turing-equivalence of shared CPU hardware, open ended nature of register sequences, layering of software, device drivers, and re-programmability of local and networked memory systems may provide vast, uncountable opportunities for malware to perform computing tasks that are not authorized and may result in, among other things, financial or physical damage. An attack surface enables a device to be compromised with malware and, once compromised, a device may be manipulated in various ways. For example, malware may manipulate a compromised device to execute an unintended program, may be manipulated to disclose stored information in an unauthorized manner, and/or may be manipulated in such a way as to commit a cybercrime on another, uncompromised, device. Such attack surfaces may enable the unauthorized disclosure and/or use of bank account, passwords, or military information to an unauthorized third party via a 4G SDR wireless network.

The register sequences of CPUs, PEs, and GPUs in various devices in a 4G SDR network can be manipulated by malware to include subsequences that violate the authorized behavior of programming executed by embedded computers and other devices connected via one or more wired or wireless networks. In addition, general purpose computers that perform various radio functions, such as an embedded controller, may incorporate an OS with various input output (IO) software that transfers data to and from non-computing hardware such as a radio transmitter (TX), a radio receiver (RX), a keyboard, display, printer, modem, camera, finger print reader, etc. Such IO software in a 4G SDR wireless or military system controller may be termed a device driver. 4G SDR terminals may be compromised by embedding malware into 4G SDR controllers.

The damage caused by a compromised device can vary in both its magnitude and its detectability. For example, the Stuxnet malware took control of centrifuges, operated the centrifuges out of specification and caused some to fail, but made system operation appear normal to the users of the centrifuges. One may envision comparable damage being accomplished by malware that compromises a 4G SDR terminal that connects to a 4G SDR network (e.g. using the 4G SDR network to steal air time and/or use the network without paying for it). Other damage may include receiving or transmitting data in an unauthorized way (including the use of bank account, passwords, or military information to an unauthorized third party via a 4G SDR wireless network, as mentioned above). A compromised embedded controller then may be used to commit various cybercrimes, such as the destruction of physical property (e.g. by overriding the control information exchanged wirelessly, but operating in such a way that the databases, networks, and users believe that the compromised devices are running properly and within limits). Conventional cybersecurity measures (e.g., hardware roots of trust, sandboxes, virtual machines, antivirus, firewalls, and monitors) have been incapable of providing a permanent solution to such cybercrime.

BRIEF SUMMARY

This Summary is provided to introduce a selection of concepts in a simplified form that are further described below in the Detailed Description. This Summary is not intended to identify key or essential features of the invention.

A Soft Wired Radio (SWR) Web Machine (also referred interchangeably herein as an SWM) may comprise an arrangement of one or more domain-specific user-defined parallel pipelined learning (DUPPL) machines. Each DUPPL machine may be embodied in circuitry or other hardware (e.g., a portion of an FPGA or an ASIC) that is configured to perform some aspect of the radio and logic functions of an SDR. The SWM described herein is configured in such a way as to preclude the entry of malware into itself and/or preclude malware from being distributed via the SWM into a protected network, such as a commercial 4G core network, a military platform, or a home or corporate network. By precluding the entry of malware from a network and by precluding the transmission of malware-control communications (C2) the effects of malware may be reduced and may provide a more permanent solution to cybersecurity. Indeed, some embodiments herein relate to improvements in the security of a wireless network and/or improvements in the exchange of data among network devices. The SWM described herein may include, for example, a computing machine in which open-ended register sequences and uncontrolled memory states of conventional computing and communications do not occur. In other words, the SWM described herein is, for example, a machine with no CPU, no RAM, no instruction registers and no ISA.

According to some aspects described herein, embodiments described herein may relate to an apparatus that includes circuitry for performing various functions of an SWM. For example, if an SWM is to receive a radio frequency signal, the apparatus may include, among other circuitry components, first circuitry configured to receive a radio frequency signal, the radio frequency signal conforming to a Long Term Evolution (LTE) protocol or received via a Fourth Generation (4G) wireless network; second circuitry configured to generate an input symbol based on the radio signal; third circuitry configured to validate that a value of the input symbol is valid according to a first domain, wherein the first domain is one of a plurality of domains embedded into hardware of the apparatus, wherein the first domain includes, via a hardwired symbolic notation, values that the radio signal is allowed to have; fourth circuitry configured to generate an output symbol by mapping the input symbol from the first domain to a second domain of the plurality of domains; fifth circuitry configured to determine output data based on the output symbol; and sixth circuitry configured to transmit the output data.

Compared to a conventional Turing-equivalent computer, cybersecurity may be improved by an SWM through, for example, an SWM's hardwired immutability and soft-wired configurability of information processing; inherent self-checking of domains; self-referential consistency of a (Self) description with its own behavior determined, for example, by comparing values of memory blocks and logic flows to a (Self) description; and by its arrangement of hardwired constants, encapsulated variable objects, and hardwired parallel pipelines; and associated machine learning within (Self) constraints. An SWM may need no virus protection because there is no operating system (OS) managing random access memory in which a virus or advanced persistent threat (APT) may be hidden by a malicious agent. An SWM may need no monitor functions because there are no shared registers of an ISA. These properties of an SWM may introduce a new category of information processing machine that may neutralize a vast range of malware such as computer viruses, keystroke loggers, worms, and advanced persistent threats.

BRIEF DESCRIPTION OF THE DRAWINGS

FIG. 1A illustrates a block diagram for an SWM having an arrangement of DUPPL machines according to various aspects described herein.

FIG. 1E illustrates an example embodiment for SWM management based on one or more functions of an SWM is in accordance with various aspects described herein.

FIG. 2A illustrates example notations of symbols that may be used in an SWM according to various aspects described herein.

FIG. 2B illustrates example notations for a (Self) description of an SWM, which includes both a notation having a text form and a notation having a symbolic form.

FIG. 3B illustrates an example of a domain for an SWM that provides examples of objects for a radio reception capability and relationships thereof.

FIG. 3C illustrates an example of a domain for an SWM that provides examples of radio mode control objects for a radio transceiver capability and relationships thereof.

FIG. 3D illustrates an example of a domain for an SWM that provides examples of cryptographic objects for a radio transceiver capability and relationships thereof.

FIG. 3E illustrates an example of a domain for an SWM that provides examples of Hyper Text Transfer Protocol (HTTP) objects for a radio transceiver capability and relationships thereof.

FIG. 5A illustrates a time line for the operation of an SDR application on a general purpose computer having random access memory and an operating system.

FIG. 5B illustrates an example time line of operation of a SWM having no random access memory or operating system.

FIG. 6 illustrates one or more machine learning operations of an SWM to automatically modify its own hardware as authorized by its internalized (Self) description and as enabled by networked entities including people and other machines.

DETAILED DESCRIPTION

Introduction to Terminology

Figure 1B:
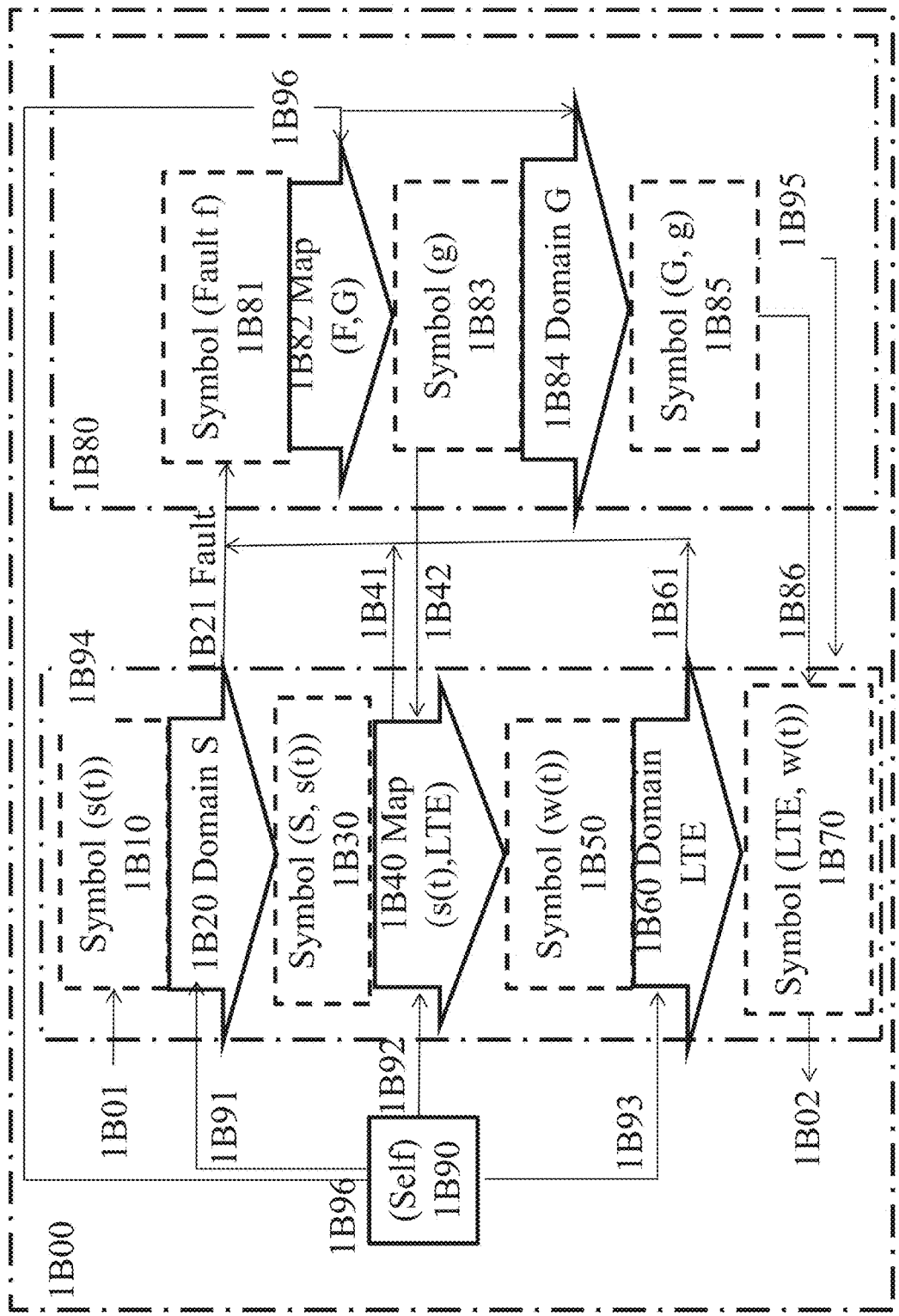
FIG. 1B illustrates an example DUPPL machine used in the SWM of FIG. 1A according to various aspects described herein.

As discussed above in the brief summary, information processing functions of a Soft Wired Radio (SWR) Web Machine (SWM) may be hardwired into the pipes of ASICs, optical computing circuits, FPGAs, and other circuits or computing devices that may comprise such a machine. Information of an SWM is stored and processed through the circuitry of an SWM in various forms. From time to time, SWM's configuration may be changed by an authenticated entity having a time-variable cryptographic credential such as a Trusted Platform Module (TPM) in the (Self) that is paired with a TPM in an Enterprise Web Machine (EWM); one may say that the SWM and EWM are paired cryptographically, sharing the same TPM at time of manufacture. Such a TPM arrangement may comprise a time-variable cryptographic key that may be essentially impossible for a third party to predict. A TPM may generate a cryptographic key that may comprise a symbol of a cryptographic domain of a DUPPL machine of such an SWM. Such information forms may include: symbols, objects, tokens, domains, and a self-description, which is referred herein as "(Self)".

A symbol is textual data, the basic unit of information representation that conforms to a defined logical structure and is expected to be a member of a domain. For example, a symbol could be text such as "Receive (RX)" and an additional symbol could be "Mode: 'TX'". In wireless networking, a generic symbol may be "Radio Frequency (RF)" while a more specific symbol could be "RF carrier frequency (fc): '2.41 GHz'". An SWM may express a symbol as an object (e.g. an RF channel) having a value (e.g. 'OPEN'). Values of objects may be fixed and constant, that of a single symbol hardwired into such an SWM; or objects may be variable, capable of representing alternative symbols of a domain. For example, an object named "Training Sequence" may have a fixed value "0101100110101" a variable object named 'Frame 1 Slot 1' may have a variable "Status" having a temporary value "ACK" at one point in time and a second temporary value "NACK" at another one point in time. A training sequence "0101100110101" may appear at first glance to be a binary number. A symbol, however, is a textual expression. The alternating 0's and 1's in this case are 8 bit bytes (or 16 bit Unicode characters) having textual representations of '0' (the one character string for zero) and '1' (the one character string for the number one). An SWM may be configured to process a symbol based on how the data represented by the symbol is expected to be used in radio engineering and wireless communications, except that the exact manner in which the SWM processes the symbol will be specific to the hardware arrangement of an SWM or a DUPPL machine. A symbol can be used in various ways throughout an SWM. In some instances, a symbol may be able to "flow" through the circuitry of an SWM. When a symbol "flows" through the circuitry of an SWM, it is referred to as a token. A token named 'Request' may have a variable 'Channel' having a value '103.5 FM', forming a token ("Request Channel 103.5 FM") that may flow through a comparison with, for example, a domain of Legal Requests, flowing further to generate a Transmission token, the text value of which may be provided to an isolated memory block representing, e.g. a current value of Data to be transmitted, or exerting an action for the transmission of data associated with an open RF data channel to a radio transmission point TX.

An object is the basic unit of information representation and usage. An object may contain exactly one symbol whether simple as in the example "fc: 2.401" (expressing carrier frequency 2.401 GHz) or may be complex within limits defined in a (Self) description. An object may be variable, containing alternative different symbols, e.g. at different times, or an object may be fixed, containing exactly one symbol for the life of the SWM of which it is a part.

A domain is a listing of symbols. Each symbol that is listed, explicitly (as in an enumerated list) or implicitly (as in a Regular Expression, a RegEx), is a member of that domain. For example, if a domain provides a listing of alternative radio channel symbols "TX", a symbol "QPSK 00" and the symbol "QPSK 01" both may be members of a single domain, e.g. the domain of radio networking protocols at the Physical (PHY) layer, such as the Long Term Evolution (LTE) standard. AnSWM will know how to process symbols of a domain, for example, to test a symbol to determine whether the symbol is a member of the domain. For example, if the symbol to be tested is "QAM 64," although well known as a method of radio transmission, it would not be a member of the QPSK domain, which is a different set of radio transmission methods. However, if the symbol were "QPSK 01" it would be a member of the domain of QPSK protocols well known in the art as physical layer (PHY) transmission methods. Members of a domain may be listed using one or more convenient methods. One convenient method lists each member in a list such as a set {"SYN", "ACK", and "GET"} listing HTTP methods of a higher level of the LTE protocol corresponding to a set of Internet Protocol (IP) messages used in such a radio, for example. Another convenient method lists each member in a brief form such as "00 . . . 99" which lists the one hundred two-digit numbers between zero-zero and nine-nine. A regular expression is another convenient method for listing all of the members of a domain according to a logical test for membership in a domain. For example, the regular expression "/^[A-Z][a-z]*$/" may match a name beginning with a capital letter and consisting of other lower case letters, matching both "Joe" and "Mike." Regular expressions may be termed RegEx. As another example, a RegEx /^[0-9][0-9]$/ may match text strings corresponding to numbers between 00 and 99, but may not match other pairs of characters or names. These methods of listing domains are illustrative of many alternative methods that may list directly (via a listing) or indirectly (via a logical test) of the members of such a domain. A domain may be abstract such as a protocol or may be concrete such as the location of a specific device inside the radio such as an antenna port, a name of a maintenance technician allowed to test the radio, a number describing a measurement such as 120.2 volts, etc. A domain may refer to things that are external to an SWM such as a place, e.g. via GPS coordinates; or to things that may be internal to an SWM, such as a (Self) controlled hardware domain that may include a listing of circuit boards.

A (Self) may include a description of what the SWM is able to perform, is allowed to perform, is not allowed to perform, or and is not able to perform. The (Self) may include all domains and, thus, may indicate all symbols that may validly occur within an SWM. An SWM will know how to process the (Self), for example, to identify a particular domain in order for a symbol to be validated against a domain. In some arrangements, (Self) is hardwired into the SWM and cannot be changed throughout the life of the circuit.

A memory block may be comprised of various circuitry components necessary for storing the symbols. For example, with respect to ASIC and FPGA designs, a memory block may be comprised of various flip-flops, registers, wires and the like. In general, a memory block stores a symbol. In some instances, the memory block may act as a constant (e.g., the stored symbol cannot be changed physically nor electronically for the life of the circuit); a variable object (e.g., have contents that can change throughout the life of the circuit, such as by storing different symbols at different points in time); and an address (e.g., store a symbol that refers to the location of another memory block). An SWM address 'TX' may cause a DUPPL conveyor belt to route a token directly to the transmission (TX) circuits. Conventional radios may convert a logical address 'TX' to a binary address such as 10110, but an SWM may employ the symbolic address 'TX' directly to move data since its circuits operate directly on such symbols. Thus, a memory block may be a circuit representing an information object whether fixed or variable that may have as its contents at a given time a symbol of a given domain.

Additionally, memory blocks may be associated with other memory blocks. For example, a constant (e.g., memory block acting as a constant) may be associated with a variable object (e.g., memory block acting as a variable object) such that the constant provides a label or name for the variable object. Such a label-constant may act as an address that defines where the variable object in located in the conceptual memory space of the SWM e.g., so that a third memory block containing a token may access the variable object with the label as its address. For example, a memory block having the fixed value 'RXOnePacket' may be adjacent to a memory block having the fixed value 'GET', thus associating a symbolic name 'RXOnePacket' with a value expressing the contents received by receiver channel one, i.e. the IP payload 'GET' which also may be a member of an HTTP domain. In a related example, a memory block having the fixed value 'Request' may be adjacent to a memory block having the variable value "Close", associating a symbolic name 'Request' with a value "Close" in this example, not a legal request if RX One may not be closed. The memory block associations of an SWM may be defined in the (Self) via a one or more symbols and/or domains.

A pipe is circuitry that is located between at least two memory blocks. The circuitry of a pipe may be comprised of logic necessary to perform one or more designated functions, such as AND-gates, OR-gates, NAND-gates, inverters, and the like. The designated functions are generally related to the logic of the service being provided by the SWM. Pipes may take the contents of one memory block as input, process the input according to, for example, a map between two symbols or an arrow between two domains, and produce output that is stored in a memory block. For example, a pipe may include circuitry that validates that a symbol is a member of domain. In a specific SWM, for example, a 'RXOneDomain' memory block defining a 'RXOne' domain may be compared with a "PUT" value of a 'Request to Receive' token, resulting in a failure of such a token to conform to the 'RXOne' domain. A (Self) hard wired into such an SWM may not allow a RXOne domain to be altered by pipes accessing the domain. On the other hand, a domain of names of 4G SDR operational personnel may comprise a "Names" domain that may be extended by pipes accessing objects of such a domain provided conditions specified in the hardwired (Self) are met.

A pipe may include circuitry that maps a symbol from one domain to a different domain. In a specific SWM, for example, a "4G SDR controller" request having a Names value of a '4G SDR controller operator' token conforming to a 'Names' domain may further include a value to post, such as "4G SDR controller Name='Joe'" that may be mapped to a (response) object having a value "(<html><Name> Joe </Name></html>)" of a 'Names' domain represented conveniently in HTML, resulting in a success of such a token 4G SDR controller operator named Joe to conform to the domain to register a (Name) object <html><Name>Joe</Name></html> to, e.g. an HTML Names domain. Since HTML is verbose, requiring 29 characters to represent that 'Joe' is a name, a more compact symbol arrangement may be employed for efficient use of memory space. Thus, a (Self) that recognizes a name Joe may be expressed in a symbol notation as ((Self)[Names (Joe)]) describing in 11 characters a place for Names, one of which is the string 'Joe' representing a Name called Joe. Since there may be many such names, efficient an efficient arrangement of symbols having 11 characters versus 29 comprises a method for reducing the number of text characters embodied into the hardware of a (Self) to indicate that the Name Joe along with many other names is recognized. Since the LTE protocol is complex, efficient representation of radio control information via expressive symbol notation may provide benefits over representing data via standards like HTML, which may be consistently more verbose than the symbol notation.

As is apparent from the above description and the additional details described below, an SWM is comprised of various circuits including memory blocks and pipes. The definitions of the symbols and/or domains in the memory blocks form a part of the reasons an SWM is able to defeat attacks/hacks that a conventional computing device is susceptible to. As mentioned above, conventional computing devices are susceptible to attacks that inject malware into, e.g. the random access memory (RAM) of a 4G software defined radio (SDR). One example is a stack overflow attack. Malicious statements may be inserted, e.g. into a packet sent by a browser providing an SDR data request to a 4G SDR so that the innocent looking packet induces malicious execution. For example, in a stack overflow attack, the number, 4096, may exceed the capacity of a packet stack of a conventional machine. Such a value should be illegal as a packet index because it can cause an access checking for "packet" to check for "4096" which may exceed the stack size, causing the machine to execute a blue screen of death hard fault condition, enabling the machine to be remotely controlled by the attacker. The remote control of the radio by the attacker may be one the purpose of the attack (e.g. to use the wireless device to steal the owner's personal information, passwords, etc.). In contrast, when an SWM is presented with a packet value of "4096" such a value would not match a domain of legal values (e.g., of a "4G SDR controller" domain that allows only 256 packets); therefore, the SWM would ignore the request; it would not enter a hard CPU fault condition (an SWM has no CPU) that enables remote control of the radio, and, thus, is immune to this type of attack. A stack overflow attack is just one example of myriad combinations of illegal inputs that are not fully checked by conventional software and cannot be reliably checked on a general purpose CPU, resulting in unauthorized radio usage by a malicious attacker. The Heartbleed attack is another example by which an expected heartbeat query downloads up to 64 kilobytes of unauthorized data because, in this case, the heartbeat domain had not been sufficiently constrained by the network software. An attack against the OS could have caused a Heartbleed like result by using OS root to change the number of bytes returned to the Heartbeat message. As specified herein, an SWM incorporates a complete specification of each domain used by that SWM into the (Self), employing the (Self) specification via pipes termed domain maps to check each variable object of each domain and immediately rejecting as faults any such objects that do not conform to the domain specification, thus defeating all such attacks of which stack overflow, SQL injection and Heartbleed are illustrative examples.

The terms described above will be used throughout the disclosure when describing various embodiments of an SWM. Additional details of the circuitry used in an SWM will also be provided in connection with the various embodiments of an SWM. Additional details of the various forms information may take when stored or processed in an SWM will also be discussed in connection with the various embodiments.

Each circuit of an SWM may be associated with an information processing purpose and function. For example, the purpose and function of a memory block circuit may be to represent an information object that may have a fixed symbolic name and that may contain a symbol as its value. For example, the purpose of a pipe may be to map a symbol of an input memory block into a resulting symbol of an output memory block. Further, additional circuits or information forms, or variations on the above discussed circuits and information forms, may also be introduced in connection with the various embodiments of an SWM described herein.

Introduction to Embodiments Described Herein

By incorporating the above-mentioned symbols, memory blocks, domains, maps, pipes and the like, an SWM may be configured to perform various functions related to a conventional radio apparatus, such as a cellular phone, a radio access point (e.g. a WiFi device), a base station (in LTE termed an eNode B), or some other device capable of accessing and communicating with a, for example, a 2G network or a 4G LTE network. The following section provides a brief introduction to some of the functions that an SWM can perform. Additional details on these embodiments as well as other embodiments will be described throughout this disclosure.

In some embodiments, an SWM may provide trusted access via soft-wired learning and may be domain-specific via one or more domains that specify what symbols are used by the SWM to perform one or more software-defined radio (SDR) functions. Such functions may include, for example, processing of one or more radio frequency (RF) frequencies; communicating by processing according to one or more wireless protocols (e.g. defined by one or more state machines and one or more message sequence charts (MSCs), according to published wireless standards or according to unpublished or proprietary radio communications methods); processing of user traffic, determining network status; determining wireless communications needs of various services that may be running at the same time for a protected user (e.g. for a given data rate and time delay, termed quality of service (QoS) service level agreement (SLA)); and performing control transactions that may determine the condition of a radio channel, such as various quality indications of LTE, LTE Advanced, and LTE Advanced Pro standards. Learning functions may be related to increasing the protection a user of the SWM is afforded by the SWM and, in general, may include learning how to best protect a specific user (e.g. the SWM owner) in a given situation, such as at a given time, place, radio channel condition and user information service need (e.g. QoS SLA). By employing an SWM, existing 4G core networks then may be protected because the SWM, in some embodiments, does not allow radio frequency (RF) payloads or Internet Protocol (IP) packets to enter or be fully processed by such a network. Instead, an SWM may determine that a portion of the information in a received packet/payload is authorized; extract and/or copy the authorized information extracted; process the authorized information; and, based on the processing of the authorized information, transmit authorized content to a protected network; similarly, an SWM may extract authorized results from a protected network, providing such results as a response to the received packet/payload. In some arrangements, after extracting the authorized information, the SWM may transfer the authorized information to another computing device (e.g., via a wired or wireless connection different from connection at which the packet/payload was received), log data related to the received payload/packet (e.g., keep a log of data in the packet/payload determined to be unauthorized); and may then destroy, drop, delete or otherwise ignore the received packet/payload.

It is noted that for simplicity, one or more IP packets, one or more RF payloads, or one or more other type of IP/RF message may be interchangeably referred to as a message throughout the examples described throughout this disclosure. A sequence of such messages may establish what in the art is termed a "state" of a TX, RX, control machine, network, or radio channel according to information exchange standards that may be established for a wireless or wired channel between such devices. For example, a network may exhibit a state termed "congested" when the traffic offered to such a network caused time delays of packets stored to be forwarded; such time delays are termed queuing delays. If not congested, then a network state may be termed "clear". Wireless and wireline networks may exhibit such states. A wireless channel has a physical (PHY) layer for transmission of RF signals; such a PHY layer may exhibit a high signal to noise ratio (SNR), measured in decibels or dB. An SNR greater than 40 decibels (>40 dB) may constitute a "High SNR" state; High SNR enables the transmission of data at high speeds (e.g. using a channel symbol termed Quadrature Analog Modulation (QAM) with a given number of channel states such as 64 QAM having 64 states). A 64 QAM signal transfers log 2(64) or 6 bits of information per such 64 QAM channel symbol. An SNR between 0 and 10 dB may be a channel state "Low SNR" that may limit channel symbol reception to simple channel symbols such as binary phase shift keyed (BPSK) having just two states. A BPSK signal transfers log 2(2) or 1 bit of information per such BPSK channel symbol. A specific part of a specific PHY layer channel may be time-variable, exhibiting High SNR at one point in time and Low SNR a small fraction of a second later. Thus, adaptive wireless standards like LTE increase and decrease user data rate according to channel state of SNR and other radio parameters (e.g. Doppler shift, multipath delay time, etc.). Various other states of various other layers of a protocol stack may impart various time delays that may depend on: specific location, such as proximity to an automobile accident, to a sports stadium; on time of day; network state, such as normal operations, overnight operations, installing patches, etc.; and overall social condition such as holiday or terrorist attack. Each of these various human states may be referred to as a "situation"; in this specification, embodiments may collect radio, place, time, and social situations into a "wireless usage" situation. An SWM have computational models of wireless usage situations. An SWM may comprise models of wireless usage situations via a DUPPL machine method and apparatus that has no CPU, no Operating System (OS), no software protocol stacks, no interrupt service routines and yet may comprise the digital logic, memory, and encrypted RF transmission and reception; such an encrypted radio may provide law enforcement with an encrypted "front door" that may be opened by court order of other socially acceptable, legally founded methods for establishing the rights of the government to infringe privacy for the needs of law enforcement.

To better visualize the manner in which an SWM performs its functions, think of a bank teller window. Instead of placing a check for deposit into a box that the bank teller draws into the bank (analogous to messages entering a protected network via a conventional firewall or deep packet inspector), the depositor presses the check and deposit ticket against the window so that the teller can copy the relevant information into the bank's private network. With this approach, bank tellers are not exposed to "germs" that may be hidden on the check and that may, for illustrative purposes only, cause sickness or death inside of the bank. By a very exact analogy, an SWR Web Machine copies authorized content from parts of messages across a digital window. This is performed, for example, by copying data from the message that will form the one or more initial symbols that will be processed by the SWM. The SWM may then process those initial symbols and transfer the processed symbols from one DUPPL machine to another DUPPL machine (as will be apparent by the examples described throughout this disclosure, an SWM is composed of an arrangement of one or more DUPPL machines). Each DUPPL machine performs its processing of a symbol via memory blocks and combinatorial logic (or other circuitry). With respect to the above illustrative analogy, these DUPPL machines may serve as the bank teller and bank window, enabling authorized content to be exchanged between users while preventing unauthorized, injurious, and questionable content from entering a protected network.

Similarly, an SWM may protect any isolated network (e.g., a network of a research laboratory of a larger pharmaceutical company or a military installation) by providing wireless connectivity without allowing malware to transit past or through the SDR. Such an SWM may protect sensitive data of the laboratory from being stolen by hackers for hire from across the street or across the world. In addition, an SWM may protect a manufacturing facility from malware that might corrupt its industrial control systems (ICS) to cause physical damage to the advantage of a competitor. A military platform such as a ship, aircraft, or ground vehicle may connect to other such platforms via an SWM. Such military platforms may incorporate one or more internal networks that may be protected from malware by one or more such SWMs. Similarly, an SWM may protect a home or small business network or home computer from giving up personal information wirelessly (e.g. to a keystroke logger that, for example, looks for and then sends social security numbers, bank account numbers, passwords and other critical information to a malicious entity who would sell the information on the black market for identity theft). The analogy of copying information through a window from a physical item, like a check, applies in all of these cases. Since this method of information transfer is unlike firewalls, deep packet inspection or anything previously disclosed for wireless networking, it is important for the reader to have a good intuition for the methods and apparatus herein specified.

One or more Field Programmable Gate Arrays (FPGAs) may be programmed to realize such an SWM in a process that results in a hardwired FPGA. This invention discloses machine learning methods by which such a hardwired machine may modify its own hardware within self-defined constraint (e.g. by interacting with an authorized, authenticated user, and, based on its learning methods, generate a new FPGA image that is used to reconfigure the SWM). Such learning and self-modification may be constrained by a set of self-control rules that may be analogous to the function of DNA in a human cell: DNA specifies what may enter the cell and how cell contents may be arranged (e.g. into proteins). Such constrained, self-controlled self-modification of a hardwired FPGA machine may be termed soft-wiring. Thus, based on the learning capabilities, the SWM can be also referred to as a soft-wired radio web machine.

The remaining paragraphs of this introduction will provide a few additional details to the above discussion. For simplicity of explanation, the example of an SDR network using the GSM, 4G or WiFi® RF and protocol stack will be used throughout this disclosure. The GSM, 4G and/or WiFi® RF networks serve as an example, but are not intended to limit the applicability of this disclosure to other types of networks or SDR technology, such as HF SDR; broadcast SDR, amateur radio SDR; land mobile radio SDR; TV whitespace SDR, police, fire, and rescue radios; emerging 5G commercial wireless networks; line of sight backhaul SDR; satellites and satellite ground station SDR, and military SDR networks that may adopt or adapt the DUPPL commercial computing-communications method and apparatus disclosed throughout this disclosure. A conventional WiFi SDR network may include, for example, an embedded controller computing device in which open-ended register sequences and uncontrolled memory states of conventional computing devices occur and are based on conventional communications processing. Such uncontrolled states provide opportunities for malware to execute tasks, to violate the intent of the rightful owners of such SDR systems, and to send malicious network command and control (C2) information via what would appear to be harmless messages. However such uncontrolled states and malicious C2 do not occur in the Soft-Wired Radio (SWR) Web Machine (SWM) described herein. It is noted that the SWM, for example, has no CPU, no RAM, no instruction registers and no ISA. In some embodiments, a protected network that has malware present (e.g. at time of manufacture and/or via a supply-chain vulnerability) remains protected because the malware cannot communicate with a controlling entity (sometimes termed a bot master) that would operate the malware via a covert C2 network (e.g. embedding its own C2 information into otherwise legitimate messages). An SWM may destroy, drop, delete or otherwise ignored all data that is not specifically authorized. In this manner, the C2 content produced by the malware is prevented from being transmitted further (e.g., to the bot master or another computer).

In some embodiments, an SWM may organize data into symbols and may limit the symbols to members of enumerated sets called domains. Domains may be application-specific. For example, an SWM may include an input domain for a set of valid radio frequency (RF) protocol control messages that relate to one or more states of an SDR system (e.g., a domain for a ready to send (RTS) message, a clear to send (CTS), a message acknowledged (ACK), and the like).

In some embodiments, an SWM may include a management domain such as that provided by the Simple Network Management Protocol (SNMP). SNMP data on such an SDR of a larger wireless network may be termed a Management Information Base (MIB) that may be provided in response to an SNMP request (e.g. from a peer or manager on such a network; a SWM may mutually authenticate the peer or manager via a Crypto domain as further disclosed herein). Thus, an SWM may protect network management information such as a MIB.

An SWM may comprise one or more DUPPL machines. Such machines may allow for the use of fixed symbols and variable symbols. Fixed symbols may be encapsulated into hardwired memory constants, such as read only memory (ROM). In some embodiments, such ROM may not be randomly accessed but may be accessed for domain-specific purposes soft-wired into such a machine. Hardwired constants that may be changed within constraints by user interaction or self-reprogramming (e.g., the above-mentioned learning functions) may be termed soft-wired constants. Variable symbols may be encapsulated into memory blocks that may be isolated from each other and may not be randomly accessed as is characteristic of DUPPL machines. Referring again to the constants that may form a fixed symbol, an SWM may incorporate constants into a hardwired self-specification, briefly noted herein as "(Self)" or a "(Self) description." (Self) may describe the intended information processing behavior of an SDR Web Machine. (Self) may be written in a human language and unlike soft-wired constants may not be modified by the user interaction or self-reprogramming during operation.

A pair of DUPPL machines of an SWM located proximately (e.g. within a tamper-resistant physical enclosure with battery backup for both DUPPL machines) may perform reprogramming as follows: one DUPPL machine (referred to in this example as a local management-backup machine (MBM)) may accept and validate a new (Self) and a related soft-wired (Self) (e.g., an FPGA bitmap) for a second managed DUPPL machine (MDM). A new (MDM.Self) may be accepted locally (e.g., via USB data port) or remotely from a network, validated based on mutually authenticated encrypted network communications, and configured for MBM usage. An (MDM.Self) may be installed by an MBM according to an MDM installation map that may incorporate various MBM-MDM management domains. An MBM may shut down an MDM, may install a new (MDM.Self) and related soft-wired personality of such an MDM, may power up the MDM, and may test the updated MDM for correct operation, initiating MDM operations upon successful testing. An MBM may provide hard-wired backup for an MDM in case an associated MDM may encounter a hardware failure that precludes safe, effective operation of a SWM.

An SWM may encapsulate an information processing operation into isolated hardwired or soft-wired combinatorial logic termed a pipe circuit. A pipe circuit may be interconnected between pairs of domain-specific objects such as, for example a flip-flop, register, or memory block. Instead of a shared-CPU performing instructions stored in memory, such a machine may realize the information processing functions of an application-specific sequence of conventional CPU instructions (e.g. floating point arithmetic) via a soft-wired pipeline that may be a sequence of logic termed a pipe circuit. Each pipe circuit may map (via its circuitry) a domain-specific value of a symbol contained in an input variable object into an intermediate value and may produce ultimately an intended domain-specific symbol as a variable output object. The input-output relationship termed a map of a pipe circuit may be wired to be consistent with a (Self) description. There may be two or more pipe circuits, each of which may perform an identical map between two different pairs of such variable objects. Logic of one pipe circuit may place a symbol contained in an input variable object into one or the other of multiple alternative pipes based on some logical condition having been verified by such a pipe, effecting a choice of pipe, realizing a type of IF-THEN-ELSE logic of such an arrangement of pipes.

Such a machine may accept external stimuli (e.g. in the form of user input touching a screen, radio signals impacting on an antenna, reception of content such as text, status, and control information) represented in variable objects from one or more input ports. Such stimuli may form the basis for generating a composite variable symbol termed a token. A token may contain data (e.g. radio signals represented in symbols, information content extracted from or intended for radio signals, radio status information, etc.) along with associated metadata (data about data) such as the time of presentation of the input data to the SWM, a confidence estimate associated with a radio-related symbol, such as SNR. Such an SWM may accept various input such as a WiFi status request, forming an SWM control token. Such a token may be realized in a variety of ways such as the text ('WiFi status:' "request") or, more simply, as a signal of a circuit configured to be interpreted as an SWM RF control signal.

Such an SWM may realize information processing by copying content selected from an external input into a token. The external input and/or content may be a set of RF packets (that may comprise patterns of frames in the radio air interface) that form a message. A process of creating tokens may employ only information that such a machine has verified to belong to a message-content domain specified by the (Self). A token may be produced by copying authorized data from RF packets into a resulting message token without allowing entire RF packets, which may contain unauthorized or malicious content, to enter the SWM. Pipes extracting such content from messages may be impervious to attacks, while similar attacks on a protocol stack of a conventional computer having software that processes messages would be successful. Such messages may contain malware or malware command and control (C2) information embedded in otherwise legitimate messages. Deep packet inspectors and firewalls inspect such RF packets for known malware, rejecting threatening patterns; in a zero-day attack malware is expressed in a form not previously encountered, hence defeating deep packet inspection and firewalls; an SWM, in contrast, does not seek known malware—instead it seeks only known-authorized content in specified formats, ignoring and discarding all data that does not match its known-good template(s), which herein are termed domain specifications. Thus, firewalls enforce what are termed black lists, while an SWM enforces what may be termed a generalized white list. A conventional white list may list known-good data. This approach is incomplete and inflexible. An SWM domain specification expresses all possible white-list items directly and indirectly without expressing other than white-listed data. This is akin to a bank teller copying only the amount and check number through a window, enabling the depositor to discard the check which itself will not enter the bank, although the bank-specific information expressed in the check would enter via a copying process through the window; the bank teller may ignore the memo field of the check, which in this analogy may contain malware or malware C2 messages, although appearing legitimate.

Such an SWM may realize information processing by moving such domain-specific tokens, devoid of malware, whether as data or as signals, systematically through special-purpose unidirectional parallel symbol processing pipelines (groups of which are also referred herein as arrows) to result in the delivery of tokens representing the results of information processing to one or more output ports. An output port of one DUPPL machine may form an input port of another DUPPL machine, which may be co-located together (e.g. in the same hardware enclosure) so as to comprise an apparatus for an SWM. An output port of the SWM may cause the transmission of data over a network.

One such DUPPL machine of such a co-located set of DUPPL machines comprising an SWM may realize a radio transmitter of a wireless network realized in transmission pipes such as those of the data flow diagrams of a well-known radio engineering tool like the software-based GNU Radio Companion (GRC). GRC expresses the logic of radio data flow in diagrams converted via a suitable compiler that generates code (e.g. Python software code). Thus, GRC may provide a starting point of a block diagram language for expressing the radio functions of an SWM. However, according to this invention GRC must be enhanced to map such block diagrams to enhanced blocks having domain specifications consistent with a (Self) description; thereafter such blocks may be compiled to VHDL for operation, e.g., on an FPGA attached to RF circuits. A resulting SWM transmitter, then, would have no general purpose computer but would realize radio transmission (TX) control state machines via logic embedded into such pipes moving such tokens through such a DUPPL TX machine, converting tokens to air interface packets (termed physical layer or PHY radio packets) via pipes of such a DUPPL TX machine.

Tokens and symbols associated with the token flow from input to RF output of a DUPPL TX machine may be constrained via hardwired tests (e.g., for conformance to behaviors specified in a (Self) description). Simple SWM machines may have a simple (Self) description. In some arrangements, an SWM consisting of multiple DUPPL machines may have a (Self) for each DUPPL machine and another (Self) for the SWM itself. For example, if an SWM includes three DUPPL machines, there may be a (Self) description, for wireless network transmission in a DUPPL TX machine, for wired LAN network access in a DUPPL LAN machine, for wireless network reception in a DUPPL RX machine, and for interconnections among the three DUPPL machines (e.g., for constraining what flows between the TX, RX and LAN DUPPL machines). In this way, the various (Self) descriptions and DUPPL machines may be configured to, for example, enable wireless access while protecting a LAN from malware (e.g., similar to the manner described above in connection with the bank window analogy). In other words, in the general sense, a DUPPL machine may have its own (Self) description and a collection of DUPPL machines may have a further (Self) description that may further constrain the DUPPL machines as they work together to perform the configured function(s).

Input stimuli that form the basis for generating one or more input tokens may be offered by one or more sensors or data communications interfaces such as an industry standard control interface, local area network or wireless link. Resulting output tokens may be converted to text, graphics, voice, video, or other media (e.g. for external usage). The input ports, domains, maps, (Self) description, and output ports of such a machine may be immutable during operation, while allowing for extensibility/reconfiguration via fault management circuits described herein, including learning functions. For example, fault management circuits may be configured to reconfigure an SWM based on an interaction with an authenticated user (termed supervised learning), or from experience in an environment (termed unsupervised learning). Variable objects may enable tokens to flow through the immutable maps to provide information processing services such as secure networking (e.g. via a TX and RX of a wireless modulator-demodulator, such as a modem). Such a machine may embody (e.g. in its pipes that process one or more symbols) the logic of the LTE, SNMP, 4G, WiFi and other SDR interface standards (both current and as yet to be defined), secure protocol(s), military wireless air interfaces (also termed waveforms), specialized military networks (e.g. MIL-STD-1553 LAN or MIL-STD-188 radio interfaces), open standards (e.g. Ethernet), HTTPS, etc. Such an SWM may embody logic to provide, for example, wireless status reporting, control interfaces, databases, and spreadsheet applications that may be part of an SDR system; status messages may be generated by an SWM according to, for example, an email format as might be needed by external entities, such as people and other systems; Internet access (e.g. world wide web), wireless, network protection, and other valuable information processing services may result. The identification of such applications and services does not limit the scope of this disclosure, but is provided by way of an illustrative example for the described embodiments.

Upon encountering a fault, an SWM may provide fault recovery. A protected network may provide systems control and data acquisition (SCADA) of, for example, a hydroelectric power plant having control devices, computers, and one or more human users termed operators. A fault such as a request to operate an item of equipment outside of its normal SCADA control limit may result in a request to an authorized entity (human being or other SWM) for the incorporation of such a control limit into a list of acceptable control limits. In some embodiments, such incorporation of new control limits may be realized via machine learning, such as by a Case Based Reasoning logic, as constrained by a (Self) description that may limit the Cases according to the domains of such an SWM such as a control laws domain. Unresolved faults may be logged or may be ignored by deleting a fault-bearing token from a pipe (e.g., if the fault recovery circuitry determines that the token contains an unresolvable fault).

Thus, an SWM, which comprises domain-specific functionality, may be one implementation of (or may include aspects of) a Domain-specific User-defined Parallel Pipelined Learning (DUPPL) machine. The ability of such a machine to modify its own wiring within the constraints of a (Self) description may warrant the use of the term softwiring. As discussed throughout this disclosure, a domain-specific Soft Wired Radio (SWR) machine may be referred to as a SWR Web Machine (briefly, an SWM). To form an SWM, information processing functions of such an SWM may be wired into ASICs, optical computing circuits, FPGAs, quantum computers, and/or other circuits or computing devices. An SWM may be simple, operating within a limited domain embodied as a domain-specific device such as an ASIC. An SWM may be flexible, operating within a specified set of domains and maps embodied in a flexible device such as a field programmable gate array (FPGA). Multiple simple and flexible SWMs may be interconnected by sharing domains. A collection of simpler machines, proximate or networked, may form a larger, more complex composite SWR Web Machine capable of complex, networked services. Nevertheless, the function of a given chip, network, or system and of a composite machine or network of such machines may occur within the immutable boundaries of a given domain or set of domains that may be embodied into such an SWM via a (Self) description that the machine itself may not change but may employ to limit its own behavior to authorized behavior.

FIG. 1A, Soft-Wired Radio (SWR) Web Machine (SWM)

For ease of understanding the hardware of an SWM, various examples described herein will utilize software-defined radio (SDR). In a generic example, an SDR implements a wireless information transfer service that may encrypt data for transmission security and privacy, connecting information of a user U1 at 1A314 with a user U2 at 1A11 according to methods and processes of this specification. A user in a given situation may comprise a person, a robot, an industrial control, a factory device (e.g. a programmable logic controller), a smart vehicle, an electric power controller, or another physical or computational entity having information that needs to be shared between authorized users {U1,U2} while being protected from unauthorized disclosure, such as by reception of a radio signal by a third party; and from manipulation, such as by malware; a radio transmission by an SDR of such information via a radio signal may be termed, equivalently, a signal in space, an air interface, or a Radio Frequency (RF) protocol of a wireless network; many air interfaces are widely known, such as WiFi®; Zigbee; GSM, the second generation (2G) standard; STANAGs; MIL-STD-188C; Long Term Evolution (LTE) the 4G standard wireless protocol, etc. A wireless network may comprise, for example, a radio frequency (RF) signal at 1A313 according to a protocol for RF information exchanges (sometimes termed hand-shaking) between a Digitally Controlled Radio 1A310 that with an SWM 1A200 may comprise an SDR; and a Wireless User 1A314, having a WiFi laptop, Internet of Things (IoT) device, a smart phone, or other device capable of receiving and transmitting comparable radio signals (equivalently termed wireless signals) according to various standards.

A wireless user U1 may use device 1A314. Device 1A314 may be a generic wireless device that is not a Soft-Wired Radio (SWR) Web Machine (SWM) 1A200A and may be authorized interact in a certain (e.g. limited) way via SWM 1A200 with device 1A11 (associated with user U2). Alternatively, device 1A314 may comprise a counterpart SWM that is paired specifically with device 1A200, one having a (Self) 1A90 paired with a (Self) of a counterpart SWM 1A314. A paired device 1A200 may have a (Self) 1A90 in which may be coded certain fixed information such as an SWM serial number along with an SWM serial number of a paired device 1A314. A counterpart paired device 1A314 may have a (Self) (e.g. designated (1A314.Self)) which may comprise coded fixed information such as a serial number of the SWM 1A314 along with an SWM serial number of the counterpart device 1A200. A paired device 1A200 may have a (Self) 1A90 which may comprise coded variable information such as a Trusted Platform Module (TPM) having an inherent TPM.1A90 serial number and having a variable one-time code, termed code.TPM.1A90(k), that may change each time such a TPM may be queried with index k for such a code. A paired device 1A314 may have (1A314.Self) that may comprise coded variable information such as a TPM having an inherent TPM.1A314 serial number along with a TPM serial number of a (TPM.1A314.Self) along with a serial number of a counterpart TPM device 1A200, designated, for example, TPM.1A90.Self. A TPM of a (Self) 1A90 and a paired TPM of (TPM.1A314.Self) may be initiated with k=1 having different serial numbers, but expressing identical codes so that code.TPM.1A314.Self (k=1) and code.TPM.1A200.Self(k=1) are identical, after which k may be replaced by k+1, at each time generating identical codes. A (Self) 1A90 may retain various TPM codes in a CTL DUPPL machine for Control Logic Circuits 1A210 while at the same time a (1A314.Self) may retain in a CTL DUPPL Machine at 1A314 various paired (identical) TPM codes. In some embodiments, a paired SWM 1A200 may offer a random challenge (RC) of random symbols generated by TPM.1A200.Self (e.g. random.TPM.1A200.self(j) that may be sent wirelessly via 1A313 to any wireless device of wireless network 1A300). A paired device 1A314 may respond to such a random challenge with a set of symbols termed a signed response (SR). The signed response may include a symbol for an encrypted version of its own serial number, a symbol for the iteration k, and one or more symbols for other useful information, such as a time of day t.now. The symbols of the signed response may be encrypted according to a cryptographic key comprising a code code.TPM.1A314.Self(k) by a standard encryption method such as the Advanced Encryption Standard (AES) of the US National Institute for Standards and Technology (NIST). A paired SWM 1A200 may receive the signed response and decrypt the symbols within the SR, and may recognize serial number TPM. 1A314 based on the iteration k and/or the time of day t.now found within the decrypted symbols. Methods of forward error control (FEC) may impart mathematical redundancy into symbols SR so that a paired receiver 1A240 may reliably recover the transmitted symbols SR in a condition of nose and interference of wireless signals 1A313. According to TPM methods and processes known in the art, an unauthorized third party receiving a random challenge (RC) via radio signals 1A313 of wireless network 1A300 may not have a TPM paired to TPM.1A200 and hence may be incapable of generating symbols of an SR in a timely manner. According to the method and apparatus of DUPPL machines and various embodiments of the present disclosure, a random challenge (RC) may comprise a (data) domain that may be mapped from a TPM.code(k) domain, an index domain having a member k, a time domain having a member t.now, and a serial number domain having a member SWM.Self [serial number]. Similarly, a signed response (SR) may comprise a (data) domain that may be mapped from a TPM.code(k) domain having a symbol Z=TPM.code(k), an index domain having a symbol k, a cryptographic key domain having a symbol Z; a time domain having a symbol t.now, and a serial number domain having a symbol SWM-.Self[serial number]. The SR may also comprise an AES map from a symbol for SR to an encrypted symbol for SR according to an AES cryptographic encryption and decryption standard. Paired SWMs may express various methods for encrypted message exchange known in the art and thus may provide for cryptographically secure, mutually authenticated sharing of information between paired SWMs according to embedding of paired TPMs in paired SWMs.

An SWM may be employed to realize secure wireless information exchange. To accomplish this, an SWM may include, among other things, a Transmit (TX) Machine (TXM) and a Receive (RX) machine (RXM), a TX memory 1A220, and RX memory 1A250. A TXM may be referred herein interchangeably as TX logic circuitry 1A230. An RXM may be referred herein interchangeably as RX logic circuitry 1A240. The TX Logic circuits 1A230 (e.g., the TXM) may employ data of various wireless interface standards expressed as one or more DUPPL domains for radio-related symbols; such symbols to be transmitted may be stored in the TX memory 1A220. Such data to be transmitted may be transformed by TX Logic circuits 1A230 from the form at which the data is stored at 1A220 to an analog form 1A312 to be transmitted wirelessly via an interface of a digitally controlled radio 1A310 via Digitally Controlled Radio 1A310. Symbols to be generated by a TXM (e.g., stored at memory 1A220) may be based on symbols generated by an RXM (e.g., stored at 1A250) according to logic of a DUPPL control machine (CTL) having control logic circuits 1A210 (in some arrangements, symbols of a TXM may be based on symbols of the RXM). By realizing secure wireless exchange in the manner illustrated in FIG. 1A (and the other figures), an SWM may protect the information of a user U2 at 1A11 in a network 1A10 via its arrangement 1A200 of DUPPL machines, other circuitry and/or other memories that are configured to, for example, validate and map symbols among the various domains within a SWM. Such DUPPL Machines may comprise various (Self) descriptions that may include (Self) 1A90; such a (Self) 1A90 may comprise various fixed self-description along with a fixed TPM for generating codes of a variable self-description comprising code symbols that may enable encrypted communications between paired SWMs while inhibiting message decoding by an unauthorized third party. Such DUPPL Machines may comprise various fault management circuits that may include circuits 1A80. An SWM may control a Digitally Controlled Radio (1A310) for transmitting via wireless network 1A300 that services user, U1 at 1A314, and may connect another user, U2 at 1A11, securely by, for example, providing limited data exchange, as may be authorized by a (Self) 1A90 and as resulting from the processing of the SWM and its arrangement of DUPPL machines.

Usage of this SDR example service, which may include the encrypted and/or unencrypted exchange of messages, is not intended to constrain the applicability of this disclosure to any other environments not explicitly shown or discussed in this disclosure or from configuring or otherwise using an SWM in a different environment. In such wireless network examples, a Software-Defined Radio (SDR) may include radio-related logic (Transmit (TX), Receive (RX), and Control (CTL), as well as various message transfer protocols (e.g. an HTTP domain having a 'GET' request), and as well as various content-related domains (e.g. a video content-rating domain having a rating 'G,' another rating 'PG,' and another rating 'R,' for example). Such domains of symbols may be characterized as concerns of various layers of information exchange; for example a timing domain of time reference symbols, t, may be characterized as having to do with protocol timing; TX, RX, and CTL of radio channel symbols, s(t), may be characterized as having to do with a Physical (PHY) layer of an air interface; as another example, a data framing domain of data framing symbols, f(t), may express a frame start flag having a specific code and having positions in such a frame for data of a certain type, characterized as having to do with framing of a link-layer of data exchange; as another example a packet sequence number domain of packet sequence symbols, n(k), may be characterized as having to do with a network layer of data exchange; as another example a cryptographic security domain of encrypted symbols e(k), may be characterized as having to do with a session layer of data exchange; as another example an HTTP domain of HTTP symbols (e.g. GET) may be characterized as having to do with a hypertext exchange layer of data exchange; as another example a content rating domain of rating symbols, r(i), may be characterized as having to do with content distribution layer of data exchange, referred to in the ISO seven-layer protocol standard as within the applications layer.

In operation, the basic hardware of an SWM 1A200 may convey a time of day, t.now to the device 1A314 (which may be a second SWM) that may compare t.now of SWM 1A200 to t.now of the device 1A314; another SWM may encrypt data according to a Trusted Platform Module (TPM) of a (Self) at SWM 1A200 at a time t.now that may be transmitted wirelessly to another SWM at 1A11, which may incorporate another TPM and may be paired to a TPM at SWM 1A200 to enable decryption of encrypted data according to a time t.now. Device 1A314 may convey an HTTP "GET" request from a web browser to SWM 1A200. SWM 1A200 may validate such a GET request according to a (Self) description and transfer such an authorized HTTP GET request to a protected web server (represented by device 1A11). Another SWM may convey a page of a spreadsheet from device 1A11 via exchange of data regarding t.now and TPM, encrypting and transferring wirelessly to a remote user's web browser at device 1A314. Another SWM may convey the status of an electric power grid from device 1A11 to a remote power management entity at device 1A314. Another SWM may search a protected database accessible at device 1A11 and provide a confirmation of a credit card to a wireless browser at device 1A314. These and many other such information exchanges may comprise information exchange according to an interface standard that may employ timing standards (e.g. IEEE 1588v2), data encryption standards (e.g. NIST AES, RSA, TPM), and various radio air interfaces (e.g. GSM, WiFi®, 4G) as may be helpful to exchanging data wirelessly.

An SWR Web Machine (SWM) of FIG. 1A may comprise various DUPPL machines 1A210, 1A230, and 1A240 for controlling, receiving, and transmitting data at all of the various layers of information exchange from PHY layer through the various networking layers to an applications layer such as content distribution, playing on-line games, using a spreadsheet in the cloud, etc. A DUPPL machine 1A260 may provide for orderly start up and shut down of an SWM 1A200 and may comprise power management logic configured to perform those functions of an SWM. FIG. 1A provides a top-level diagram of an arrangement of DUPPL machines that, for example, may be configured to provide such SDR services according to the layering of various local, regional, and international standards governing such information exchanges including timing, encryption, decryption, PHY, MAC, link, network, transport, session, and applications layers of RF information exchange. Additionally, it is noted that examples discussed throughout this application may relate to commercially available wireless networks such as an LTE wireless network. In addition, there are similar government and military radio systems to which aspects described throughout this application may be applicable. The lack of explanation of such potentially applicable networks in this disclosure should not be interpreted as limiting the applicability of the embodiments described herein to any such networks or systems (e.g. wireless networks of first responders, military bases, ships, aircraft, ground vehicles, or other type of military, government, or private commercial platform).

A Receive (RX) Domain of symbols at various layers of a radio protocol stack may express data concerning receiving radio signals that may be stored in a memory 1A250; such data may be derived from an RF signal in space received at device 1A313 that may conform to an air interface protocol of a wireless network impinging upon an antenna of a Digitally Controlled Radio 1A310 that may result in a received signal 1A311 (corresponding to an RF signal sent from device 1A314). A received signal 1A311 may be transformed by RX Logic Circuits 1A240 (for an RXM). The received signal 1A311 may be an LTE® signal and/or a 4G signal (e.g., a radio frequency signal conforming to the LTE protocol or a radio frequency signal received via a 4G wireless network). The RX logic circuits may, for example, transform the signal from an original RF analog form via various intermediate analog and digital forms to various RX Domain symbols for storage in RX Memory 1A250. Once stored, these symbols may be accepted by a CTL DUPPL Machine 1A210. The CTL DUPPL Machine 1A210 may be configured to mediate TX and RX logic and to transfer authorized data (e.g., data determined to be authorized by logic 1A210 and via the (Self) 1A90) to a User U2 at 1A11 via a protected network 1A10. A digitally controlled radio 1A310 may comprise a transmitter and a receiver capable of conforming to an air interface transmission and reception frequency, an instantaneous bandwidth (IBW), and other characteristics such as are common to widely known radio standards such as WiFi®, LTE@, GSM®, HF Automatic Link Establishment (ALE), and hundreds of other such air interfaces known to those skilled in the art. Alternatively, a digitally controlled radio 1A310 may employ a specialized protocol stack, such as of police or military radios having transmission security (TRANSEC) with frequencies not widely standardized, with IBW not widely described, and with other parameters not widely reported, such as of a special purpose government or a military radio network. Messages received by an SWM 1A200 may be retained in an RX domain memory 1A250, while messages to be transmitted may be retained in a TX domain memory 1A230. A Digitally Controlled Radio 1A310 may include memory for parameters. The various components and the SWM itself may, in some embodiments, not contain a general purpose computer, OS, or software. Instead, the SWM may perform various TX, RX, and CTL functions required for effective operation of an SDR may be provided by DUPPL TX machine 1A230, DUPPL RX Machine 1A240, and DUPPL CTL machine 1A210, (Self) 1A90, memories 1A220 and 1A250, and various Fault Management circuits 1A80.

A messages domain of such an SWM 1A200 may be a collection of TX and RX messages at various levels of information exchange from PHY through networking to one or more applications layers of the ISO Open Systems Interconnection (OSI) model. Such a messages domain may specify messages (which may be processed within the SWM as sequences of symbols) that are allowed to transit from a Protected User associated with device 1A11 via SWR Web Machine 1A200 through Digitally Controlled Radio at 1A310; messages that are not specified as allowed may not be allowed to transit via the SWM from Protected User associated with device 1A11 to Wireless Network 1A300. Logic may be applied to messages received and to messages to be transmitted according to logic circuits 1A210, which may enforce conformance of messages to the various message domains of symbols (e.g., there may be one or more domains for each level in the supported radio protocol hierarchy from PHY to applications). There may be messages that result in the SWM generating one or more faults that would be resolved by a fault management logic 1A80.

An RX memory may store symbols generated by RX logic circuit 1A240 and may be taken as input to control logic circuit 1A210. TX memory 1A220 may store symbols generated by logic circuit 1A210 and may be taken as input to TX logic circuits 1A230. In the shown arrangement, TX and RX data may be mediated by control logic circuits 1A210. In some arrangements each such component 1A210-1A260 may be comprised of one or more DUPPL machines. An example DUPPL machine for one of the components is described in connection with FIG. 1B (the other components may include a similar DUPPL machine for performing its own functions). Additionally, certain blocks 1A210-1A260 may include circuitry configured as hard-wired domains. For example, RX and TX memory blocks 1A250 and 1A220 may include circuitry similar to those described in connection with FIGS. 3A-3C (e.g., TX memory 1A220 may include circuitry for the [TX] domain described in connection with FIG. 3A; RX memory 1A250 may include circuitry for the [RX] domain described in connection with FIG. 3B). SDR Control Logic Circuits 1A210 may copy data from a RX memory 1A250, process that data and transfer a message via network 1A10 to a protected user 1A11. Logic Circuits 1A210 may test received messages retained in RX Memory 1A250 for conformance to various domains in order to determine if a message or a portion thereof is authorized. The message may be received via protected network 1A10 (and initially processed by control logic circuits 1A210) or via network 1A314 (and initially processed by RX logic circuits 1A240). These messages may be determined to be authorized by representing the message (or a portion thereof) in one or more symbols and determining that those symbols are valid members of a domain (e.g., the message or portion thereof conforms to a domain). Messages that conform to a domain (or are determined to be valid members of a domain) may be termed messages authorized for receipt. SDR Control Logic Circuits 1A210 may test messages received from a network 1A10 to determine whether such messages (or a portion thereof) are authorized for transmission and, if so, may process a message, via TX memory 1A220 and logic circuits 1A230, and generate RF signals 1A312 for transmission. The RF signals 1A312 may be transmitted via digitally controlled radio 1A310 to a wireless user 1 A314 of a wireless network 1A300.

A specification of messages authorized for TX or RX may incorporate the name of sender or recipient; the type of message (e.g. unformatted text, rich text, PDF, etc.); the type of attachments (e.g. JPEG may be authorized while GIF may not be, etc.); type of content (e.g. company proprietary data, news feeds, V-chip indicator, inappropriate images, web site tags, etc.); and data encoding (e.g. whether encrypted or not) among others. These examples of criteria for enabling or disabling message transfer are illustrative of a very wide variety of logic methods that may be embodied in DUPPL CTL logic according to usage needs. These examples are not intended to constrain or limit the types of domains and logic that may be applied to control RX or TX messages. TX Logic Circuits 1A230 may impart link-layer encryption on messages authorized for transmission; RX Logic Circuits 1A240 may decrypt link layer encryption from received messages prior to depositing them in RX Domain Memory 2A250 for further testing.

FIG. 1B, Example RX DUPPL Machine

As discussed above, each block 1A210-1A260 of FIG. 1A may be comprised of one or more DUPPL machines. FIG. 1B illustrates an example block diagram of a DUPPL machine that may be used in the SWM of FIG. 1A. In particular, the DUPPL machine illustrated in FIG. 1B may be configured to operate as the RX logic circuit 1A240 or the RXM mentioned above in connection with FIG. 1A. FIG. 1B, in particular, illustrates a method of organization of the logic circuits for an RXM 1B00. The functions of the RXM 1B00 are performed by pipes 1B94, 1B96, and 1B80, each of which includes combinatorial logic circuitry. Other components of the RXM 1B00 may include, for example, a (Self) symbol 1B90 that may employ symbol notation to express the logic of the RXM; an application logical element 1B94 that may realize a RX function of a larger SWM 1A200; and a fault management logical element 1B80 that may specify logic relating to logical errors that may be termed faults.

An input 1B01 (e.g., RX signal 1A311, which in some embodiments may be an LTE or a 4G signal) may provide input data to an RX logical element 1B94. An input data analysis logic circuit 1B10 may obtain from the input 1B01 an input symbol (e.g., symbol s that may be a function of time noted as s(t)), as illustrated at 1B10. The input symbol may have an example value equal the text "(0.98348 [t 270])" (which in other words represents "signal value=0.98348 at time t=270 nanoseconds" from some timing reference point of a digitally controlled radio 1A310 provided at 1A311 in FIG. 1A, impinging at 1B01 and stored briefly at 1B10). A map circuit 1B20 may validate that the input symbol, s(t), is a member of domain S (a signals domain) and produce an output symbol (S, s(t)) which associates a symbol s(t) with a domain S. The validation may be performed by determining that the value for the input symbol matches one of the enumerated members of the domain, or that the value is otherwise valid according to the members of the domain. A map circuit 1B40 may generate another output symbol, w(t), by mapping the input symbol (S, s(t)) from the domain S to a different domain, such as a domain LTE. Domain LTE may include symbols for digital words, w, receivable at time t, or w(t), according to a wireless standard such as 4G Long Term Evolution (LTE) having a PHY layer, media access control (MAC) layer, link layer, network layer, transport layer, session layer, and applications layer of a radio (e.g., the domain LTE may enumerate valid symbol values that correspond to digital words conforming to the LTE protocol). In other words, circuit 1B40 may accept one or more validated symbols, s(t), stored briefly at 1B30, to generate one or more resulting symbols, w(t) stored briefly at 1B50, that may comprise text characters expressing LTE control information or other network content w at time t, comprising w(t). A symbol w(t), via text characters or other symbolic notation for the domain LTE, may represent a PHY layer channel symbol, a MAC layer authorization to transmit code, a link layer frame marker, a network layer Internet Protocol (IP) address, a transport layer encrypted data block, a session layer password, or an applications layer content stream such as a movie for rent. A map circuit 1B60 may validate whether the symbol, w(t) is a member of domain LTE and may produce output symbol (LTE,w(t)). This output symbol may be output from the DUPPL machine at output 1B02. Prior to being output, additional circuitry may also convert the validated symbol, w(t), to a form suitable for transfer via output 1B02. In some embodiments the output 1B02 may be a connection to RX memory 1 A250 of FIG. 1A and may cause whatever is transferred from the DUPPL machine (e.g., a symbol or generated data suitable for transfer) to be stored in the RX memory 1A250. Additionally, each of locations where a symbol is stored (e.g., 1B10, 1B30, 1B50, 1B70 and the like) may be a memory block. In view of the above, logic circuitry 1B94 may, for example, accept a received signal symbol s(t) at an input 1B01 to generate data w(t) that can be output from the DUPPL machine. In some arrangements, circuitry 1B94 may generate an output symbol, (LTE, w(t)), and provide that symbol to other circuitry of an SWM via output 1B02.

A DUPPL machine may also include fault management circuitry in some embodiments. FIG. 1B illustrates fault management circuitry 1B80. A fault management logic element 1B80 may determine the way in which an RXM 1B00 responds to logic errors termed faults that may be detected, for example, in maps 1B20, 1B40, or 1B60, and conveyed to circuits 1B80 via fault indicator circuits 1B21, 1B41, 1B61. A fault may be generated, for example, if a validation of a symbol fails or if a map is unable to convert the input symbol to the other domain. In some embodiments, fault management circuitry may cause, for example, RXM 1B00 to ignore any input data (e.g., s(t)) that causes the circuitry of 1B94 to generate a fault. In some embodiments, fault management circuitry may cause, for example, RXM 1B00 to correct input data (e.g., s(t)) that causes the circuitry of 1B94 to generate a fault, producing a corrected word w(t) at 1B86 for error correction type of fault management.

In some embodiments, a (Self) symbol 1B90 may indicate the logic of maps 1B20, 1B40 and 1B60; and of circuits 1B10, 1B30, 1B50, and 1B70, which store symbols. In some embodiments a (Self) symbol 1B90 may comprise information that may be represented externally to an RXM apparatus. In some embodiments, a (Self) 1B90 may be realized in hard-wired combinatorial logic. In order for pipe segment 1B40 to satisfy the conditions of being an arrow of category theory, the symbol stored at 1B50, which results from map 1B40, must be a member of a particular domain, which in this example is the LTE domain. The (Self) 1B90 may provide a definition of the members of domain LTE. Therefore, pipe segment 1B60 may validate whether the symbol stored at 1B50 is a member of domain LTE based on the (Self) 1B90 (e.g., is the symbol one of the symbols for PHY, MAC, link layers, etc.). As with pipe segment 1B20, map circuit 1B60 may generate a fault, such as the failure of the circuit to complete the conversion to the domain LTE. In response and based on fault circuitry 1B80, a map circuitry 1B60 may clear a memory block 1B70 so as to not provide a result from the processing of the data that was input at 1B01.

If the symbol stored at 1B50 is validated by pipe segment 1B60, the result may be provided as output to the SWM (e.g., via output 1B02). Similar to memory block 1B10, a memory block 1B70 may be isolated from all of the other memory blocks. Additionally, a memory block 1B70 may not be accessed randomly. Preventing random access to a memory block may limit an RXM to only the domains used in connection with circuits 1B20, 1B40 and 1B60 (e.g., only to domains S and LTE). In other words, an RXM may be considered domain-specific.

Accordingly, an RXM performs information processing through an arrangement that processes symbols via circuitry, such as pipe circuitry, are stored in various memory blocks, which may be isolated from each other via the pipe circuitry. To contrast the differences between an RXM and a conventional radio receiver, in a conventional radio receiver, such data w(t) would be generated in registers of a CPU, digital co-processor, or Digital Signal Processor (DSP) or of comparable general purpose machines of an FPGA and subsequently stored in a random access memory (RAM). However, within an RXM, there may be a rigorous flow of valid information via tokens from a specific input port 1B01 to a specific output port 1B02 through a sequence of isolated memory blocks 1B10, 1B30, 1B50, and 1B70. The pipe segments of an RXM (e.g., pipe segments 1B20, 1B40, and 1B60 of FIG. 1B) may together form a unidirectional portion of circuitry (e.g., tokens only flow one way through the circuitry) that may be referred to as a pipeline. In various arrangements, pipelines may include various numbers of pipe segments, but may not form loops. Looping behavior may be achieved by the regular transformation of inputs to outputs via a flow of tokens through the parallel pipelines of core circuits 1B00 and via signal paths 1B01 and 1B02. Such flows of tokens may update the state of memory of various blocks of such a machine. A circuit representing (Time) may provide an input to an RXM at a regular time interval. A (Self) 1A90 may specify such a time interval.

It is noted that although FIG. 1B illustrates an example of a DUPPL machine for RX logic circuitry 1A240, similar DUPPL machines could be used for the other components of FIG. 1A, including RX memory 1A250, control logic circuitry 1A210, TX memory 1A220, TX logic circuits 1A230, and power-up circuits 1A260. Each DUPPL machine may validate and/or map according to its own set of domains. For example, SDR logic circuit 1A210 may include a DUPPL machine that receives an appropriate input, validates its membership in a domain, maps symbols to other domains, and generates output (e.g., a message or a portion of a message for transmission to user U2 associated with device 1A11 or user U1 associated with user 1A314). As another example, an SWM may include an RXM for reception, such as the one illustrated at FIG. 1B, and also may include a similar DUPPL machine for transmission (e.g., a TXM, as discussed above in connection with FIG. 1A) that takes a symbol as input (e.g., from TX memory 1A220) and generates an RF signal for transmission (e.g., signal 1A312) via a digitally controlled radio (e.g., radio 1A310). In this manner, a message (or a portion of a message) may be transmitted or not transmitted based on the processing of the various DUPPL machines) via an SWM.

TXMs and RXMs may be complementary so that one machine provides radio reception while another provides radio transmission with radio input ports of a Digitally Controlled Radio 1A310 that connects wirelessly to a device for user U11 A314. This establishes a flow of tokens between such machines and these flows may be constrained to domains and maps of each machine with respect to the other. Such constraints may be defined in order to support communications that conform to particular standards including for example, industry standards like LTE, WiFi, Zigbee, etc.; Internet of Things (IoT) standards such as LoRa; automotive engineering standards like MIPI; various military standards (e.g. MIL-STD-188C); various NATO standards (STANAGs); and other published or unpublished wireless air interface, networking, and/or data exchange standards, previously defined and forthcoming.

Figure 1C:
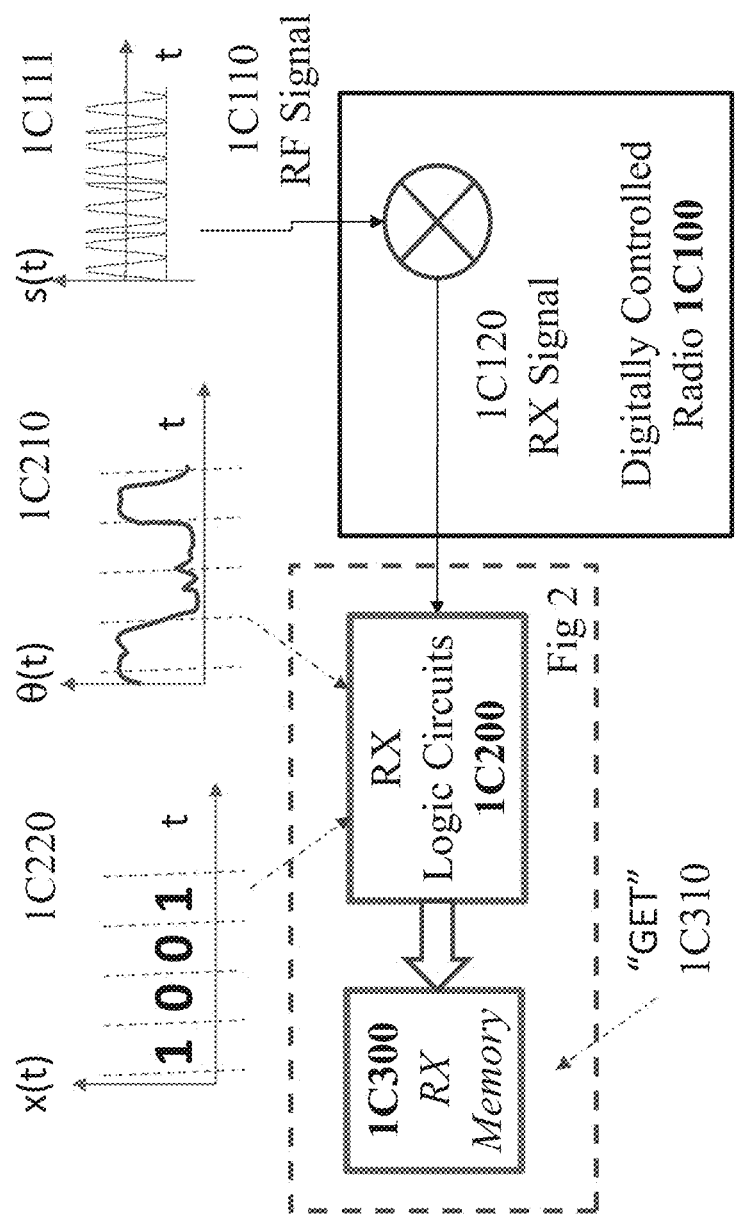
FIG. 1C illustrates various radio signals flowing through the DUPPL machine of FIG. 1B.

FIG. 1C, Radio Signals of an Example RX DUPPL Machine

Accordingly, in view of the above discussion and as further detailed below, an SWM performs radio signal and information processing through an arrangement that processes symbols that are stored in blocks of memory that may be isolated from each other via logic of pipes transforming signals and data represented as symbols. Since signal processing is key to radio TX and RX machines explained in conjunction with FIG. 1B, this figure illustrates the signals of the RX signal processing flow. Specifically, RX Memory 1C300 and RX Logic Circuits 1C200 may, in some embodiments, respectively correspond to RX memory 1A250 and RX1A240 of FIG. 1A.

A radio signal impinging on an antenna of a Digitally Controlled Radio 1C100 may have a form of signal amplitude, s, versus time, s(t) as illustrated at 1C111. Such a signal s(t) may have a short burst of a carrier frequency signal at a given phase, θ that may be a function of time, θ(t). At an appropriate time later, the channel symbol duration T, the carrier frequency may change to some other phase. Changing phase at regular intervals T is termed phase modulation or phase shift keying (PSK). There may be only two phases allowed (for convenience 0 and 180 degrees out of 360 degrees) in an arrangement termed binary PSK (BPSK) physical (PHY) layer. An alternative PHY layer might employ four different phases differing by 90 degrees each for a QPSK PHY layer. Other PHY layers may incorporate amplitude modulation (AM) along with phase modulation in an arrangement termed Quadrature AM (QAM). Each burst of carrier frequency of a given phase and amplitude is termed a channel-symbol. A Digitally Controlled Radio 1C100 may translate such a modulated radio frequency (RF) carrier to an Intermediate Frequency (IF) at 1C120 to facilitate the receiver (RX) signal processing. An RX Logic Circuit 1C200 may employ relatively simple methods such as a Lookup Table (LUT) to convert an IF to phase as a function of time, resulting in the signal θ(t) at 1C210. Other RX Logic Circuits may form statistics of phase values, in this case able to show that there are two phase states, zero and 180 degrees as a function of time. The channel symbol interval T also may be derived from such a statistical process. Such a process need have no loops, but may employ a DSP pipeline that converts an input symbol stream s(t) to a series of phase estimates 1C210. A logic circuit integrating (adding up the energy of) each channel symbol may convert a phase value in a time interval of 1C210 to a binary value, x, producing a binary symbol stream x(t) at 1C220. Such a bit-stream may be deposited in RX Memory 1C310. A sequence of such binary values may be recognized by a control (CTX) machine (1A210 of FIG. 1) to form LTE frames at the link layer of the protocol and thus, for example, IP packets at the network layer sent via such LTE frames, ultimately, at the session layer, yielding a content control symbol such as 'GET' at 1C310 that may be part of an HTTP GET request.

Thus, FIGS. 1A, 1B, and 1C illustrate an example SWM. FIG. 1A, in particular, illustrates a high level block diagram for an SWM, FIG. 1B illustrates a detailed block portion for a portion of the arrangement illustrated in FIG. 1A that implements a DUPPL machine to perform its function, and FIG. 1C illustrates an example flow through a portion of circuitry illustrated in FIG. 1A. The circuitry illustrated in FIG. 1A (e.g., the various circuity and memory blocks of SWR Web Machine 1A200) may be configured to perform various functions. Examples of the types of functions that can be performed will be discussed below including, for example, in connection with FIGS. 1D and 1E.

Accordingly, in view of the above discussion and as further detailed below, an SWM performs information processing through an arrangement that processes symbols that are stored in various memory blocks. The memory blocks that may be isolated from each other and the contents of a memory block may be processed through various pipe segments. It is noted that the manner in which the described arrangements of an SWM perform the configured functions is contrasted from the manner in which such functions would be performed in a conventional radio. For example, in a conventional radio, such data would be generated in registers of a CPU and subsequently stored in a random access memory (RAM). However, within an SWM, there may be a rigorous flow of valid information via tokens from a specific input port to a specific output port through a sequence of isolated memory blocks. The pipe segments of the DUPPL machines that form an SWM (e.g., circuitry of 1B94 of FIG. 1B) may together form a unidirectional flow of tokens through the DUPPL circuitry (e.g., tokens only flow one way through the circuitry) that may be referred to as a pipeline. In various arrangements, pipelines may include various numbers of pipe segments. The flow of tokens may cause new values to be stored in the various memory blocks in the SWM (e.g., after a token is validated as being a member of a first domain, it may be stored in a first memory block, and thereafter the validated symbol may be retrieved from that memory block, mapped to a symbol in a second domain, validated for membership in a second domain, and stored into a second memory block). SDR Web Machines may be paired so that one SDR Web Machine provides inputs to another SDR Web Machine, wireless output ports (the transmitter ports) attached via radio propagation of a radio signal to wireless input ports (the receiver ports) establishing a flow of tokens in a looping arrangement between such paired machines so that the tokens, as they flow between the machines, may be constrained to domains and maps of each machine.

Figure 1D:
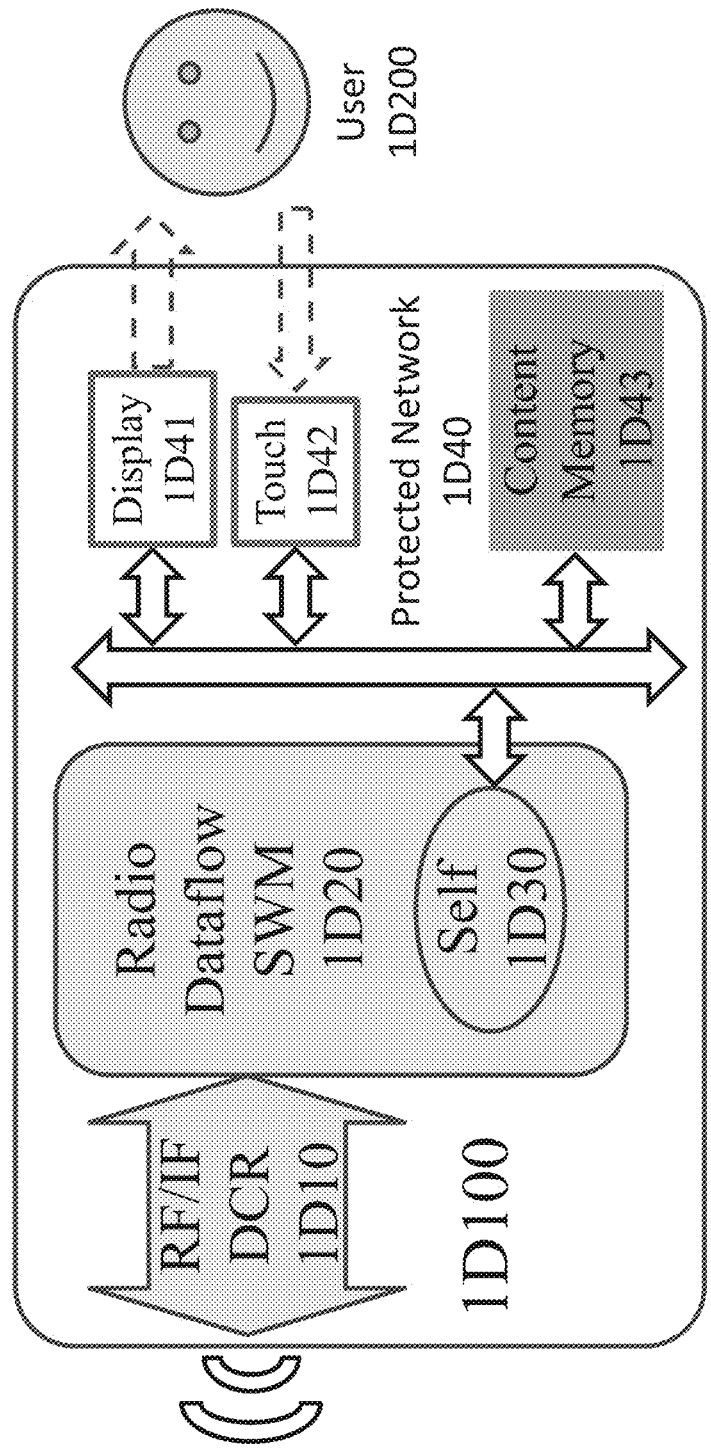
FIG. 1D illustrates an example embodiment for delivering Internet content wirelessly to a user of an SWM in accordance with various aspects described herein.

FIG. 1D, Example SDR Embodiment for Wireless Web Browsing

FIG. 1D illustrates an example embodiment of an SWM of FIG. 1A illustrating an arrangement for browsing the internet wirelessly. In particular, a Digitally Controlled Radio 1A310, a SWM 1A100 (having a Self 1A90), a Protected Network 1A10, and device 1A11 may be configured to perform functions of a handheld radio apparatus 1D100 (e.g. a commercial smart phone, a first responder handset, etc.) such as, for example, the transmission and receipt of information (e.g. via web browsing) for display to User 1D200. Specifically relating FIG. 1A to FIG. 1D, the Digitally Controlled Radio (DCR) 1A310 corresponds to the RF/IF DCR 1D10, the SWM 1A100 corresponds to the Radio Dataflow SWM 1D20 (the Self 1A90 corresponds to the Self 1D30), the Protected Network 1A10 corresponds to the Protected Network 1D40, and the device 1A11 corresponds to a device that incorporates display 1D41 and touch interface 1D42. Display 1D41 may express user-observable content stored in a Content Memory 1D43. Thus, FIG. 1D illustrates how a SWM provides content to a user via the high level flow of messages of various types through the SWM of FIG. 1A. In some instances, the SWM apparatus of a handheld radio 1D100 may, for example, be used to provide video entertainment via the Internet for User 1D200, such as NetFlix® streaming video. Providing video entertainment may be referred herein as a "video use case." It is noted that FIG. 1A is a block diagram of various DUPPL machines that may be configured in a variety of ways to provide wireless services according to various use-cases. FIG. 1D illustrates a higher level block diagram that shows how information flows through the block diagram of FIG. 1A in a hardware embodiment as a handheld radio and illustrates example data flows for a video use case.

The example described in connection with this figure may relate to device 1D100 being part of a wireless network environment. The wireless network environment may comprise an SWM that has a digitally controlled radio and provides radio dataflow with a protected network 1D40. The SWM and digitally controlled radio may be incorporated within a handheld radio 1D100. Content may be provided to a memory 1D43 and may be available to a user 1D200 according to constraints of a Self 1D30. The wireless network environment may include a wireless network, such as an LTE (4G) network. The handheld radio 1D100 may, in some embodiments, be a smart phone and may be in communication with other networked devices (not shown in the figure), such as a web server computer providing access to video content such as the NetFlix® service. The NetFlix® service is termed an over-the-top service because NetFlix® videos are not provided by the 4G wireless service provider (e.g. ATT, Verizon, T-Mobile, etc.) and therefore may contain objectionable video content that in some embodiments cannot be limited by the 4G service provider. An owner of a smart phone 1D100 may provide such a device 1D100 to a user 1D200 (which may be different from the owner) who may need protection from objectionable content. In one use-case, a parent may provide a smart phone 1D100 to a child 1D200 and the parent may intend to protect the child 1D200 from R-rated movies.

Input data may be received by the device 1D100 via an input port and/or via a connection with a 4G network. In some embodiments, the 4G network and/or various devices with in the 4G network (e.g., a 4G Packet Gateway according to the 3GPP standard for 4G networks) may transmit or route the input data to the device 1D100. The input data may comprise data intended for a particular port (e.g. for an Internet Protocol (IP) port, such as port 80, which is commonly used for requesting and receiving various Internet messages). The input data may include text (e.g. from a network server) of various formats. Text may include requests for web service, such as a hypertext transfer protocol (HTTP) request to get a page (e.g. an HTTP 'GET' request), resulting in a response that includes a Hyper Text Markup Language (HTML) web page. Input data may include other binary data such as 16 bit international character sets, bitmap graphics, digital video, etc. For example, in response to a User 1D200 touching a display at 1D42, a SWM 1D20 may transmit an HTTP GET request over a 4G wireless connection. Content 1D30 may comprise HTML text and binary images associated via HTML for a particular web page. The SWM 1D20 may include (Self) 1D30, which may constrain or limit what specific types of content may be made available in the Content Memory 1D43 that would be observable by the User 1D200. Specifically, a (Self) 1D30 may express authority for a user to receive a NetFlix® movie rated G, PG, or PG13; such authority would be expressed in a Movie.Ratings domain of a Self 1D30. For example, a Movie.Ratings domain may comprise (Content [Movies [Ratings (G) (PG) (PG13)]]) expressed in a DUPPL notation that a thing named "Content" is associated with a place named "Movies"; within "Movies" is another associated place named "Ratings" that has acceptable values (G), (PG) and (PG13). As is characteristic of DUPPL machines, any movie ratings not explicitly listed in a movie ratings domain are (by definition) be disabled by default since DUPPL machines cannot perform operations not explicitly enabled. R-rated content is not enabled in such a Self 1D30.

RF/IF DCR 1D10 may represent the processing that occurs in connection with receiving/transmitting from device 1D100. The input data, which in some instances may include objectionable content, may be processed by circuitry represented by RF/IF DCR 1D10 and the SWM 1D100. Such processes may include Radio Frequency (RF) and Intermediate Frequency (IF) signal processing. Additionally, one or more tokens may be generated based on the input data and these tokens may flow through the SWM 1D20. Based on the flow, various functions may be performed (e.g., performed by circuitry 1A210-1A260 of FIG. 1A). Accordingly, the processing that occurs at SWM 1D20 may include the processing of various tokens via a number of parallel pipelines in one or more DUPPL machines, such as the DUPPL machine discussed above in connection with FIG. 1B. In connection with the processing performed by SWM 1D20, input data (e.g., content offered in a web page) may include an expression "Rated G" that may be converted from radio form to text form (via SWM 1D20) based on a (Self) at 1D30. The SWM 1D20 may perform its functions using circuitry configured to process tokens in such a way so that wireless web services for such a G-rated movie are provided. Another part of a web page may offer a movie that includes text having an expression "Rated R". The processing performed by SWM 1D20 performed by based on this input may result in the redaction of the text "Rated R" and any text, images, etc., associated with such a movie (thereby restricting a child 1D200 from viewing the rated R content). The SWM may recognize ratings embedded in headers, embedded in frames of movies, or as otherwise provided by a streaming service such as NetFlix®. In other words, the objectionable content may be received by device 1D100, but the display of that content may be prevented based on the processing of the SWM 1D20.

The SWM 1D20 may perform additional functions not illustrated in FIG. 1D. For example, the SWM 1D20 may incorporate power-up circuits (e.g., power up circuits 1A260 of FIG. 1A) that may be configured to initialize the SWM 1D20; initialization may include the configuring of a field programmable gate array (FPGA) upon power-up according to an example pattern of FPGA circuits, powering up Movie Ratings according to the identity of the User 1D200. For example, the SWM 1D20 may comprise a hardwired machine such as logic circuits that may, for example, be realized in one or more field programmable gate array (FPGA) chips. An SWM FPGA chip may be initialized at power up by circuits to load an SWM FPGA personality into an SWM FPGA chip comprising circuits 1B20. An example pattern of circuits to be loaded at such time are illustrated in circuits described in conjunction with FIGS. 3A-3C, 5B and 6. In addition to or instead of FPGA, other configurable logic circuits such as optical computing, quantum computing, analog signal processing, analog electrical controls, flow controls, etc., may comprise logic circuits configured to perform the processing of RF/IF DCR 1D10 and the SWM 1D20, as well as any of the processing that accesses content 1040 and/or (Self) 1D30.

FIG. 1E, SWM Management

FIG. 1A is a block diagram of various DUPPL machines that may be configured in a variety of ways to provide wireless services according to various use-cases. FIG. 1E illustrates a higher level block diagram that shows how information flows through the block diagram of FIG. 1A in a hardware embodiment as a wireless gateway and illustrates example data flows for an SWM management use case. In particular, FIG. 1E illustrates an arrangement of DUPPL machines that may be configured to receive an upload from a wireless network, determine whether content within the upload is valid and/or authorized, and provide validated and/or authorized content with a user. The DUPPL machines illustrated in FIG. 1E may further receive and process a data upload intended to augment the SWM's capabilities, test and/or analyze the upload, and change or quarantine the upload via fault management that may include machine learning. Alternatively, such an upload may be determined by the logic of a (Self) description to be acceptable to the machine. Once used to reconfigure the SWM, the SWM may be capable of performing enhanced capabilities, such as by operating based on a new radio protocol stack (sometimes termed a waveform) and/or by realizing a new (Self) description. The enhanced capabilities may allow new content to be transferred to a user. In some cases, the illustrated user may be a machine such as a robot (e.g. in an industrial use-case) or a vehicle (e.g. in a smart car use case).

Accordingly, a radio signal may be digitized at Radio Frequency (RF) at 1E10 or converted by analog means (e.g. by super heterodyne) to an Intermediate Frequency (IF) for reception by an RF Dataflow SWM 1E20. The RF Dataflow SWM 1E20 may convert a received signal of a cellular wireless network (e.g. LTE) into channel symbols corresponding to LTE, may synchronize and enhance (e.g. equalize) such signals, may transform channel symbols into data symbols, may correct errors (e.g. via turbocodes), and may format or other generate content 1E30 for output (e.g., for presentation to a user 1E50). The RF Dataflow SWM 1E20 may convert other radio signals, such as from a Global Positioning Satellite (GPS) into GPS-based estimates of radio location (GPS coordinates), direction, and speed according to the GPS standard. Prior to presentation, a (Self) 1E40 may inspect the content 1E30, such as first by determining whether such content 1E30 belongs to a content domain (e.g., determine that the content is a valid member of the content domain based on the content and the enumerated values for the valid symbol, as specified by the content domain). Other content domains may include video feeds, for example. Another domain may include a new bitmap of an FPGA implementing 1E40 for a new (Self). An existing (Self) 1E40 may test video feeds for digital watermark from authorized sources (white listed content), and may scan the video for unacceptable content prior to presentation to the user 1E50. An existing (Self) 1E40 may need to be updated, for example, to enable R-rated content to be viewed. Since a (Self) of a DUPPL machine cannot be modified during operation, a SWM management process must accept an upload, power down the existing (Self) and replace it with a new (Self), then power up the new (Self) for testing and finally transition from the existing (Self), termed the (Old Self) to the new (Self).

Certain types of content such as a new (Self) may comprise control messages of a control messages domain according to symbol notation of a DUPPL machine. Such content may pose risk to the SWM since malware could be present in such content. Accordingly, an SWM may authenticate a source of new content via a TPM of the existing (Self) paired with a TPM of a management authority, which is accessed via a wireless connection. Such an update may not modify the TPM association remotely, in accordance with various domains and processing of an SWM as it processes upload 1E60 and a Sandbox SWM 1E70. An SWM may manage the flow of an upload into upload memory according to a situation determined, such as by determining whether a GPS location, direction and speed is consistent with an update. For example, a SWM connecting an automobile to a manufacturer may not update the SWM while the vehicle is in motion as determined by a current GPS direction and velocity measurement. An SWM may further process the upload based on a sequence of cryptographic security keys of a (Self) 1E90 in a way that is time-varying according to an arrangement conveyed to a remote management system having a paired TPM.

To determine if an upload is authorized, an SWM may examine the upload 1E60 for conformance to a (Self) description 1E90 (arrows not shown for clarity of the figure). If such an upload 1E60 conforms to an upload domain, the upload may be moved to a Sandbox SWM 1E70 that may further test the upload 1E60. Test signals (e.g., test RF signals) may be generated and processed by the Sandbox 1E70 to test the upload according to various tests. Upon passing various tests, the upload 1E70 may be considered an authorized upload. An authorized upload may be used to modify an SWM, such as by changing some aspect of the RF Dataflow SWM 1E20 (e.g. to enable processing based on a new RF signal type or waveform, such as by supporting a new Turbo code). In the case the upload does not pass the domain conformance/validation test that is initially performed or does not pass the tests performed at the Sandbox SWM 1E70, the upload 1E60 may be transferred (e.g. as a token) to fault management 1E80. Fault management 1E80 may interact with a radio network for mutually authentication (e.g. via a TPM embodied the RF Dataflow SEM 1E20 and in fault management 1E80 for time-varying cryptographic authentication). Such mutually authenticated fault management may enable an upload to modify various elements of a SWM 1E, including modifying the (Self) 1E40, 1E90, and elsewhere according to time-varying cryptographic mutual authentication procedures.

In view of the above discussion, the block diagram of FIG. 1A, the details of FIG. 1B, the signal flow details of FIG. 1C, the video use case of FIG. 1D and the SWM gateway maintenance use case of FIG. 1E provide a detailed explanation of functions that may be performed by an SWM. FIGS. 2-6 further illustrate further details for realizing an SWM. The use of specific embodiments and use cases in these explanations is illustrative and should not be interpreted as limiting the applicability of the embodiments described herein to any such devices, configurations, use-cases, networks or systems.

FIG. 2A, Symbol Notation for an SWM

FIG. 2A illustrates an example symbol notation for an SWM and illustrates various ways in which a symbol, such as Symbol a (e.g., a symbol stored at 1B10 of FIG. 1B) may be expressed in greater detail. Specifically, a symbol may be referred to in a textual specification or (Self) description as a generic symbol "a." Instances of such a generic symbol may include a blank symbol 2A20 comprising left and right parentheses. Such a blank symbol may indicate an empty symbol, which may comprise a textual delimitation within which a symbol may be expressed in a specification, for example. A blank symbol may represent a memory block in hardware that may specify that it is blank (e.g. by hardware proximity of coded bit patterns for left and right parenthesis). A fixed symbol 2A30 may express a fixed item of text, memory, or hardware, such as the text characters '4G SDR controller' which may be the exact text expressing an HTTP 4G SDR controller request in a TCP Message from a remote web browser. A notation having single quotes around its object, such as '4G SDR controller', may express a constant symbol 2A30. A variable symbol 2A40 may represent a value that may be defined as having a default or present value and that at some point in the future and that may be subject to change, such as an Internet Protocol (IP) address of a computer sending an SDR controller request via a network 1B10 of FIG. 1B. A symbol notation having double quotes may place double quotes around its object, such as "IP" indicating an unknown IP address. An association 2A31 of a fixed and variable symbol may indicate that a memory block 2A31 may have a fixed name in single quotes that may contain a fixed value in single quotes, such as a memory block named 'RF' containing a fixed value '2400' the name of such an illustrative RF may be fixed for the life of circuits in which it may be incorporated (e.g. as read only memory (ROM)). An association 2A41 of a fixed symbol with a variable symbol may represent what is termed in prior art a named variable; a memory block 2A41 may have a fixed name, in this example, 'TX', in single quotes that may contain a variable value, such as a memory block containing a variable value of a frequency to be transmitted "2401" (MHz) that may consist of four numbers representing transmitted frequency in MHz according to RF usage.

Further illustrative symbol notations are shown at 2A50. For example, a thing may be noted as '(thing),' 2A51. In an explicit notation, a fixed thing X may be noted as '(X)' while a variable thing X may be noted as "(X)". A more generic thing X that may be employed in a self-description to refer to ether a fixed or a variable thing, X, may be noted as (X) or to a collection of such fixed and variable things. Specifically, a (Self) thing may itself contain more specific things 2A51, such as via notation 2A51, for example, (Self ((packet) (message) (GET) (4G SDR controller) (Message)); where a (Self) 1A90 may refer to SDR Web Machine 1A200 as a (thing) comprising things, places, paths, actions, and causes described briefly between the two outer parenthesis of a (Self . . . ) symbol; within a (Self . . . ) a further symbol ((packet) . . . ) may list symbol notations corresponding to (things) comprising the self, such as a (packet), a (message), a (GET) request and a (4G SDR controller) request and a (Message). Listing such (things) within a (Self) notation 1A90 may specify that an SWM 1A200 may receive one or more instances of a (packet) such as a (GET) request or a (4G SDR controller) request that may be more specifically annotated in a (Self) description 1A90 of an SWM 1A200.

A (Self), 1A90, may incorporate further notation regarding things having relationships to each other such as proximity (e.g. proximity of places 2A52 that may refer to specific details of a logical circuit of a (Self). A (Self) may incorporate further notation regarding places, noted as a (thing) which is associated with a [place]. The association is denoted in the symbolic notation as (thing[place]) 2A52 and which may refer to specific details of a logical circuit of a (Self). In one example, there may be [places . . . ] that may refer, for example, to an Ethernet port 80 circuit of the SWM 1A200. In other words, the Ethernet port 80 circuit may be denoted by symbol notation to indicate it acts as an input via, for example, a symbol '(Self . . . [Ethernet[In[Port_80]]] . . . )'. In some embodiments, a (Self) notation may correspond to a circuit 1A90. In some embodiments, a (Self) notation may correspond to documentation. In circuit and documentation usage of symbol notation, a pair of outer parenthesis of the (Self . . . ) notation may indicate the entirety of the (Self). In this example, the Ethernet is expressed as a [place] 2A52 of the (Self). A symbol "[In]" of a lager Ethernet port symbol may express an input feature of an Ethernet circuit with respect to the (Self). In this example, the symbol "In" is a fixed symbol that may be expressed as notation 'In' according to symbolic notation.

Thus, a more explicit symbol for Ethernet port 80 may include many single quotation marks, such as ('Self' . . . 58 'Ethernet' ['Input' ['Port_80'] . . . ] . . . ). However, for the greater clarity of improved readability, a simplified symbol notation (Self) may refer to a more explicit symbol notation ('Self'). A simplified notation may refer to constant symbols. A symbol notation an SWM may include other places that may correspond to logic of an SWM, such as a place for [LTE[In][Out]] that may correspond to logic of the LTE radio protocol. Another symbol for a place of a WSM may include a domain, such as a place [WiFi], e.g. that may list the elements of a Domain WiFi, such as 'FRAME' and 'Link' e.g. (Self [WiFi(FRAME, Link)]). A symbol notation may include a place [HTML] in which there place may be an HTML object, such as a (Message). So a symbol notation for a (Self) may incorporate a variety of symbols that may express a specification.

A flow of information through an SWM may be expressed in a (Self) symbol as a {path . . . } 2A53 according to which a thing such as an (Message), or more simply (packet), may flow, e.g. from an input port to a HTTP domain causing a related flow, e.g. of a (Message) to an output port. According to notation 2A00, a {path} may be named; e.g. a top level path from input to output may be named {TOP . . . }. Such a top level path may include other paths (e.g. paths that may correspond to circuitry 1B20, 1B40 and 1B60 of DUPPL machine 1B00. Such paths may in turn correspond to circuits of pipes that may realize the logic of the circuitry 1B20, 1B40 and 1B60 of FIG. 1B. A top level path {TOP . . . } may express itself as a sequence of lower level paths. For example, a path {TOP} may express more specifically a (packet) thing flowing from an Input Port 80 to an output port, more specifically as: {TOP {[Ethernet[In([TCP[Port_80 [In (packet)]] [HTTP[(request)]} {[HTTP (GET)]] [HTML[Message]]} {[HTML (Message)][Ethernet[Out ([TCP[Port_80 [Out (packet)]]}}. In such a case, the scope of the top level path extends from the first bracket, {, to the last bracket,}. For convenience of understanding the logic of such an SWM, a lower level path may be given a name according to notation 2A53. For example, a path {[Ethernet [In([TCP[Port_80 [In (packet)]] [HTTP[(request)]} may be referred to as a named path {Get_IP}, indicating that such a path may refer to circuits that may get a (request) thing realized, e.g. as a data object from packets of an Ethernet port. A circuit 1B91 from a (Self) circuit 1B90 to circuitry 1B20 may establish a logical relationship between the functions of circuitry 1B20 and the symbols of a {Get_IP} path of a (Self) 1A90.

Another path of (Self) 1A90 noted explicitly as {[HTTP (GET)]] [HTML[Message]]} may be noted for convenience as a path {Respond_to_GET_request} indicating that the logic function of such a path may be to respond to an HTTP GET request. Such an expression may simplify expression of a (Self). A circuit 1B92 from a (Self) circuit 1B90 to a circuitry 1B20 may establish a logical relationship between the logic of circuitry 1B20 and the symbols of a {Respond_to_GET_request} path of a (Self) 1A90, such as that an HTTP GET request results in an HTML Message.

A further path of a top level path {TOP} may comprise {[HTML (Message)][Ethernet[Out([TCP[Port_80 [Out (packet)]]}. Such a path may be referred to more conveniently as a named path {publish page}, indicating that such a path may convert a (Message) thing, realized for example as a data object of an HTML domain that may be located in an HTML place in an SWM. The function of such a thing may be a series of (packet) objects in an Ethernet output port circuit of such a device. A circuit 1B93 from a (Self) circuit 1A90 to circuitry 1B60 may establish a logical relationship between the functions of circuitry 1B60 and the symbols of a {publish_page} path of a (Self) 1B90, such as that an HTML Message may be converted to TCP (packets) for Ethernet output.

Thus, a {TOP} path may comprise three paths {Get_IP}, {Respond_to_GET_request}, and {publish_page}. An equivalent (Self) notation may express a path {TOP} as a sequence of these three named paths, i.e. {TOP {Get_IP} {Respond_to_GET_request} {publish_page}}. In various implementations, it may be convenient for a (Self) circuit 1B90 of FIG. 1B to connect via circuits 1B91, 1B92, and 1B93 to circuitry 1B20, 1B40 and 1B60 according to such notation. In various implementations it may be convenient to express a (Self) symbol in documentation as a guide for circuit design.

A symbol 2A54 may express /action\, e.g. as a symbol '/Action (Actor) {Path [place1 (Object)] [place2 (Object)] . . . [placeN (Object)]}\'. Such an action may include a (thing) as an (Actor) performing an /action\ on another (thing) as an (Object) such that such an (Object) may move along a {Path} consisting of a sequence of [places]. An SWM, for example, may contain a circuit that performs an action to send data down a path {TOP}. An Object may be a mobile (thing) such as an electrical signal, a set of signals coding for data, etc., capable of occupying places along a path such as memory blocks of data flows of paths of such a machine as may be specified in such notation of a path of such an action. Actions of symbols 2A54 may be internal or external. An action symbol of a (Self) 1A90 may have an internal circuit referent of an (information thing) moving down parallel pipelines of a DUPPL machine itself, e.g. performing pre-defined applications via circuitry 1B94 and performing fault recovery, machine learning, and self-reconfiguration actions via fault recovery circuits 1B80. An action symbol of a (Self) 1B90 may have an external referent of an actor external to such a machine that may be causing an external object to move down an external path that may be entirely external to such an SWM. An external action may result in the presentation of an input to an SWM via input 1B01. An internal action may result in the generation of an output from an SWM via output 1B02 realizing an externalized action, such as controlling an external entity such as traffic lights of a city, an electric power grid, or any of a multiplicity of controllable machines; and such as requesting an external action of a human being. Thus an action may occur along an external path that may include an SWM itself.

A symbol 2A55 may express a <cause>. Such a <cause> may comprise a (thing) initiating or constraining /action\. A symbol of a <cause> may refer to things and action in the physical world such as an automobile accident causing an injury. Circuits representing such an external <cause>, for example, may comprise a VHDL constant automobile.accident: string:="<automobile causes>/(accident) {[healthy (person)] [injured (person)]}\"; A symbol of a <cause> may refer to things and action in an SWM itself, such as a choice of pipes down which a token may progress from an input symbol (Token T) of a memory block to an output 1B02. A <cause> may depend on a logic condition such as TRUE or FALSE and more generally on a domain of Beliefs. Common human beliefs include possible, impossible, inconsistent, unknown, and unauthorized in addition to true and false; there may be a degree of belief represented numerically in an SWM, such as a floating point number between −1 and +1 representing degree of belief from strongly negative to strongly positive. Within such an SWM it may be convenient to include a null belief, e.g. corresponding to an empty symbol ( ), [ ], etc. It may be convenient to refer to beliefs as (information things) of a Beliefs domain: (Beliefs (T) (F) (P) (IMP) (INC) (U) (X) (N)). According to criteria for each (Belief (thing)) there may correspond a circuit such as a data constant true: string:="(T)", which is embodied as a fixed symbol of a constant circuit (e.g. of Read Only Memory (ROM), or hardwired into an ASIC or of an FPGA). Circuits for a <cause> may comprise circuits testing an (Actor) token for membership in a Beliefs domain. For example, a symbol 2A55 expressing <Cause (Actor)/Action \> may enumerate an alternative action for each alternative Belief of an actor, such as <cause (condition) [T/actionT\][F/actionF\] [I/actionI\] [U/actionU\] [X/actionX\] [N/actionN\]>. A Map(A,B) of a pipe 1A40 may incorporate circuits of a memory block for a variable object (condition) in associated circuits of pipes therefrom realizing a multiplicity of actions.

More generally, an expression of a (Self) 1B90, <cause (condition)/action\>, may have a circuit referent that may be specified, for example, in a VHDL process expression that may include conditional logic akin to an IF statement of a programming language. Such a VHDL statement may specify circuits action, e.g. of a circuit depending on the value of data in a memory block. A change of state (i.e. a change of value) of such a memory block may initiate an action, e.g. /actionX\ upon change of the state of memory block according to logic, e.g. of a VHDL statement, e.g. "process sensitivity (V); begin if X then block /actionX\; end block; end if; end process". Such VHDL statements are illustrative of logic that may be realized in any of a multiplicity of forms. A symbol <cause (condition) [T/actionT\]> may refer to a circuit having a VHDL behavior model process sensitivity (V); begin if T then block/actionT\; end block; end if; end process; for example.

A condition may result in an empty or "null" action ∧ whereby an SWM would not perform a further action, and a flow of objects may simply end in circuits corresponding to a null action expression ∧ of a (Self). Circuit referents for <causes> may include fork pipes disclosed more fully in FIG. 6A.

An event symbol 2A56 may express a composite (SDR Web Machine information thing) comprising (Event [Place] (Time)/Action\). Such a symbol may signify that a specific /Action\ occurred at a given (time) and in a given [Place]. Event notation 2A56 offers one illustration of the multiplicity of combinations of notation 2A51-2A55 according to which symbols for thing, place, path, action, and cause may be combined to form expressions of a (Self) that may be more specific some embodiments. According to symbol criteria, an (Event) of a (Self) 1B90 may refer to an action, place, and time of the external space-time continuum, or to an event in a virtual or hypothetical world, such as Santa Clause coming to town. Such an (Event) may facilitate user interaction via machine learning circuits of fault recovery circuits 1B80. According to symbol criteria, an (Event) of a (Self) 1A90 referring to circuits of an SWM itself may refer to circuits of a pipe segment in a fixed [Place], for example within circuitry 1B94, performing a specified /action\ at a given (time) by circuits forming a symbol '(Event '[place]' "(time)" '/action\')' where double quotes may refer to the contents of a memory block containing a value of time, and single quotes refer to the place or action of such an event.

A symbol 2A51-2A56 may be empty signifying a null (thing) [place], {path}, /action\, or <cause>, i.e. ( ), [ ], { }, ∧, < >.

An SWM and each of its parts such as wires, cables, power supplies, ASICs, optical switches, optical memories, optical pattern matching circuits, quantum components, FPGA chips, etc., may contain a (Self) description 1B90. For example, the (Self) description 1B90 may describes its constituent things by including, for example, (collections of (things)) as (domains) along with (abstract and concrete [places], {paths} /actions\ and <causes>) of symbols 2A51-2A56. A (Self) 1B90 may include a multiplicity of symbols expressing definitions, specifications, and examples of one or more communications applications relevant to an SWM. Domain symbols of a (Self) 1B90 may include definitions, specifications, constraints, and example members of a domain and non-members of a reference domain. Map symbols of a (Self) 1B90 may include a multiplicity of symbols expressing one or more communications applications with limitations and constraints of an SWM itself with respect to such an application. Symbols of a (Self) 1B90 may express limitations, capacities, response times, and information processing included and not included in a given SDR Web Machine itself. Symbols of a (Self) 1B90 expressing constraints may exhibit identities of authorized users; time and location of authorized usage; and rules of business logic such as a Beliefs domain with <causes> of /actions\ expressed and embodied in circuits of an SWM itself, e.g. expressing legal uses of such an SWM.

There may be a further mathematical relationship between a symbol and an item of hardware such that for each circuit in hardware there is a corresponding symbol. There may be a further mathematical relationship between an item of hardware and a corresponding symbol such that, for each constituent symbol of a given symbol, there is a corresponding circuit of hardware; such a mathematical relationship between symbol and hardware then may be 1:1, complete (mathematically termed ONTO), and may have inverses. Constructing an item of hardware according to a symbol such that there may be 1:1, ONTO, and inverse mathematical relationships may embody mathematical properties of a symbol into such hardware. For example, a symbol may express a finite domain such as a set of valid HTTP requests; corresponding hardware may embody such a symbol (e.g. as text 'HTTP') and as a list of HTTP requests to which such hardware will respond, such as 'Frame', 'GET', 'ACK', and '4G SDR controller'. Such explicit finiteness may impart advantages to hardware. For example, if malware expresses itself to the hardware as an HTTP request, a map of the hardware, not finding the malware expression in its finite domain HTTP, may respond to the malware as a fault or error (e.g., respond not as if a valid HTTP request was received), or may perform a null action, Λ, or may perform a logging action to /log \ the malware, or may respond according to business logic represented in symbols of a (Self).

Such symbols 2A10 through 2A56 may specify the contents of a category. Put briefly, a category may refer generally to a collection of objects and arrows having particular algebraic structure (e.g., an identity map exists for each object of each arrow of such a category). Each pipe circuit of an SWM may represent an arrow of a category of category theory (an example of which is termed a morphism in branches of mathematics). A collection of pipe segments along with memory blocks (e.g., those blocks acting as variable objects) together may realize the mathematical structure of categories with finite limits. By realizing the mathematical structure of such finite limit categories, an SWM may provide increased information security.

Further, due to the formulation and construction of an SWM, in at least some embodiments, an SWM may realize its symbols 2A00 and functions in an FPGA chip. In this way, a DUPPL machine (such as machine 1B00) that forms a part of the SWM contains no shared registers, no random access memory (RAM), no shared central processing unit (CPU) or other processing elements (PEs) of a Turing computer, and no stored program memories of any sort (e.g., no operating system, no applications programming). Because the SWM is composed of DUPPL machines, it also contains no shared registers, no random access memory (RAM), no shared central processing unit (CPU) or other processing elements (PEs) of a Turing computer, and no stored program memories of any sort (e.g., no operating system, no applications programming). Despite not containing these components of a conventional computing device, an SWM (e.g., SWM 1A200) may perform information processing via symbols, hardwired circuitry that map the symbols according to the domains of the (Self) descriptions (e.g. using symbol notation 2A00) via combinatorial logic circuitry (e.g. circuitry 1B94), and memory blocks storing the symbols that operate as the input, intermediate values, stored values, and output for the hardwired connections. Accordingly, an SWM, for example, may interact with a remote user, e.g. via the Internet with respect to an SDR controller message without fear of a malicious software agent entering the SWM web server to change the function in such a way as to assist malicious action via the unauthorized use of the hardware, e.g. as was the widely reported nature of the StuxNet malware. Symbols of a (Self) comprising domains of a finite category may constrain the operations of circuits of an SWM such that unauthorized data may not be remotely accessed, e.g. as with the widely reported Hearbleed malware.

An SWM may be embodied in an ASIC and/or FPGA, and the examples throughout this disclosure are described in connection with an FPGA. However, embodiments of an SWM could be implemented using different computing devices, including optical computing, optical storage devices, optical switching; analog or digital charge coupled devices, and the like.

FIG. 2B, Example Symbol Notation of an SWM Self-Description

FIG. 2B illustrates a symbol notation for a (Self) description of an SWM having a form 2B100 of a document and having a form 2B200 of a symbol. The scroll indicating a document 2B100, for example, illustrates a specification of an SWM in text as it may be convenient for usage as a system specification. According to the method of symbols of this invention, there may be a mathematical relationship of domains, maps, and arrows of such an SWM specification and of a (Self) symbol further describing such an SWM. For example, according to 2B100, an SWM may be specified as a machine that "shall receive data from an RF channel according to an LTE protocol stack." Accordingly, a symbol 2B200 may express such a specification in symbol notation.

A (Self) symbol 2B200 may include list of (things) such as an LTE(protocol). Such a list of things may specify a usage context in symbol notation 2A00 as a [place]. A set of radio things, for example may be noted as [RF [TX (frame) (payload)] for transmitting a frame and a payload and [RX[(frame) (payload)] for receiving a frame and payload according to the [protocol(LTE)].

More explicit symbols in a (Self) corresponding to hardware of an SWM may include many single quotation marks referring to fixed constants, such as ('Self' . . . ['Ethernet' ['Input' ['Port_80'] . . . ] . . . ), for example. Also, for the greater clarity of improved readability, a simplified symbol notation (Self) may refer to such a more explicit symbol notation ('Self'). A simplified notation 2B200 may refer to constant symbols. A symbol notation 2B200 for an SWM may include other places that may correspond to logic of an SWM, such as a place for '[TCP' input '[In . . . ]' and output '[Out . . . ]' that may correspond to logic of the TCP IP protocol embodied in the circuits of the (Self) pipes and arrows 1A94 and 1A80. Another symbol for a place of an SWM may include a domain as a place [HTTP], e.g. that may list the elements of a Domain HTTP, such as 'FRAME' and '4G SDR controller'. A symbol notation 2B200 may include a place [HTML] in which there place may be an HTML object, such as a (Message). So a symbol notation for a (Self) may incorporate a variety of symbols that may express a specification. In some embodiments, a (Self) specification may be complete and consistent because unlike a Turing-equivalent machine that Goedel proved may not be both complete and consistent at the same time, the finite domains and associated logic of an SWM may be both complete and consistent simultaneously, enabling consistent self-reference of symbols of (Self), e.g. as illustrated in 2A00 and as employed in 2B00.

A flow of information through an SWM may be expressed in a self-referentially consistent (Self) symbol 2B200 as a {path . . . } 2A53 according to which a thing such as an (Message), or more simply (packet), may flow, e.g. from an input port to circuits representing an HTTP domain causing a related flow, e.g. of data of a (Message) to an output port realizing an SDR controller application. According to notation 2A00, a {path} may be named; e.g. a top level path from input to output may be named {TOP . . . }. Such a top level path may include other paths that may correspond to circuitry 1B20, 1B40 and 1B60. Such maps noted by corresponding paths may in turn correspond to circuits of pipes explained further in other figures to follow that may realize the logic of maps (e.g., circuitry 1B20, 1B40 and 1B60). A top level path {TOP . . . } may express itself as a sequence of lower level paths. For example, a path {TOP} may express more specifically {TOP (Receiving {[[User U1(message)]→[RF[RX([LTE (payload)→(message)]]→[HTTP[POST(User U2(message)]]}. An arrow '→' of such a path may express a constraint, e.g. that a given object to the left of such an arrow may interact with and only with a given object to the right of such an arrow. In such a case, the scope of the top level path, TOP, extends from the bracket to the left of the name, {, to the balanced bracket,} towards the very end of such a (Self) symbol. For convenience of understanding the logic of such an SWM, a lower level path may be given a name according to notation 2A53. For example, a path {[Ethernet [In([TCP[Port_80 [In (packet)]]→[HTTP[(request)]} may be referred to as a named path {Get_IP}, indicating that such a path may refer to circuits that may get a (request) object from packets of an Ethernet port. A circuit 1B91 from a (Self) circuit 1B90 to circuitry 1B20 may establish a logical relationship between the functions of circuitry 1B20 and the symbols of a {Get_IP} path of a (Self) 1B90. Other symbols of a (Self) may represent circuits of an SWM that comprise a complete, consistent communications application.

Another path of a (Self) 1B90 noted more explicitly as {[HTTP (4G SDR controller)]]→[HTML[Message]]} may be noted for convenience as a named path {Respond_to_4G SDR controller_request} indicating that the logic function of circuits referred to by such a path may be to respond to an HTTP 4G SDR controller request. A circuit 1B92 of a (Self) circuit 1B90 may connect to circuitry 1B20 to establish a logical relationship between the logic of circuitry 1B20 and the symbols of a {Respond_to_4G SDR controller_request} path of a (Self) 1B90, such as that an HTTP 4G SDR controller request results in a change to an HTML Message. Such a logic function may 4G SDR controller information with respect to an applications domain such as a database of products, of control laws, etc.

A further path of a top level path {TOP} may comprise {[HTML (Message)]→[Ethernet[Out([TCP[Port_80 [Out (packet)]]]}. Such a path may be referred to more conveniently as {publish_page}, indicating that such a path may convert a (Message) object of an HTML domain that may be located in an HTML place in an SWM into a series of (packet) objects in an Ethernet output port circuit of such a device. Circuitry 1B93 from a (Self) circuit 1B90 to circuitry 1B60 may establish a logical relationship between the functions of circuitry 1B60 and the symbols of a {publish_page} path of a (Self) 1B90, such as that an HTML Message may be converted to TCP (packets) for Ethernet output.

Thus, a {TOP} path may comprise multiple paths, a radio PHY layer path, and various higher layer paths such as {Get_IP}, {Respond_to_4G SDR controller_request}, and {publish_page}. An equivalent (Self) notation may express a path {TOP} as a sequence of these named paths. In various implementations, it may be convenient for a (Self) circuit 1B90 of FIG. 1B to connect via circuits 1B91, 1B92, and 1B93 to circuitry 1B20, 1B40 and 1B60. In various implementations it may be convenient to express a (Self) symbol in documentation as a guide for circuit design.

In 2B200, there may be [places . . . ] that may refer, for example, to an Ethernet port 80 circuit with an SWM 1A200 of FIG. 1A having an Ethernet port within its input 1B01, i.e. acting as an input that may be expressed as a symbol '(Self . . . [Ethernet[In[Port_80]]] . . . )'. In some embodiments, a (Self) notation may correspond to a circuit 1B90. In some embodiments, a (Self) notation may correspond to documentation. In circuit and documentation usage of symbol notation, a pair of outer parenthesis of the (Self . . . ) notation may indicate the entirety of the (Self). In this example, the Ethernet is expressed a [place] 2A52 of the (Self).

There may be mathematical relationships between a specification 2B100 and a symbol 2B200. One such mathematical relationship between a word, HTTP, in a specification 2B100 and a symbol 'HTTP' in a symbol 2B200 may be termed a one to one mapping (briefly, 1:1). One such mathematical relationship between a specification 2B 100 and a symbol 2B200 may be that such a specification and such a symbol are complete with respect to each other such that a symbol may be complete with respect to a specification and a related specification may be complete with respect to a corresponding symbol; such a mathematical relationship of completeness may be termed mapping a specification ONTO a symbol and mapping a corresponding symbol ONTO a corresponding specification, briefly ONTO. There may be a mathematical relationship between such 1:1 and ONTO relationships that it does not matter whether one begins with a specification or begins with a symbol, both relationships 1:1 and ONTO apply; such a correspondence may be termed that 1:1 and ONTO each may have inverses.

There may be a further mathematical relationship between a symbol and an item of hardware such that for each circuit in hardware there is a corresponding symbol. There may be a further mathematical relationship between an item of hardware and a corresponding symbol such that for each constituent symbol of a given symbol there corresponds a circuit of such hardware; such a mathematical relationship between symbol and hardware then may be 1:1, ONTO, and have inverses. Constructing an item of hardware according to a symbol such that there may be 1:1, ONTO, and inverse mathematical relationships may embody mathematical properties of a symbol into such hardware. For example, a symbol may express a finite domain such as a set of valid HTTP requests; corresponding hardware may embody such a symbol (e.g. as text 'HTTP') and as a list of HTTP requests to which such hardware will respond, such as 'Frame,' 'GET,' and '4G SDR controller'.

Such explicit finiteness may impart advantages to hardware. For example, if malware expresses itself to the hardware as an HTTP request, a map of the hardware, not finding the malware expression in its finite domain HTTP, may respond to the malware as a fault or error (e.g., respond not as if a valid HTTP request was received). Malware may attempt to mask itself as valid protocol data such as an HTTP request; however, because an SWM validates domain membership at every stage of information processing (e.g. via circuitry of FIGS. 1A and 1B), only a completely valid HTTP request that performs authorized actions on authorized blocks of data will be completely processed, which renders even such advanced malware ineffective.

Figure 3A:
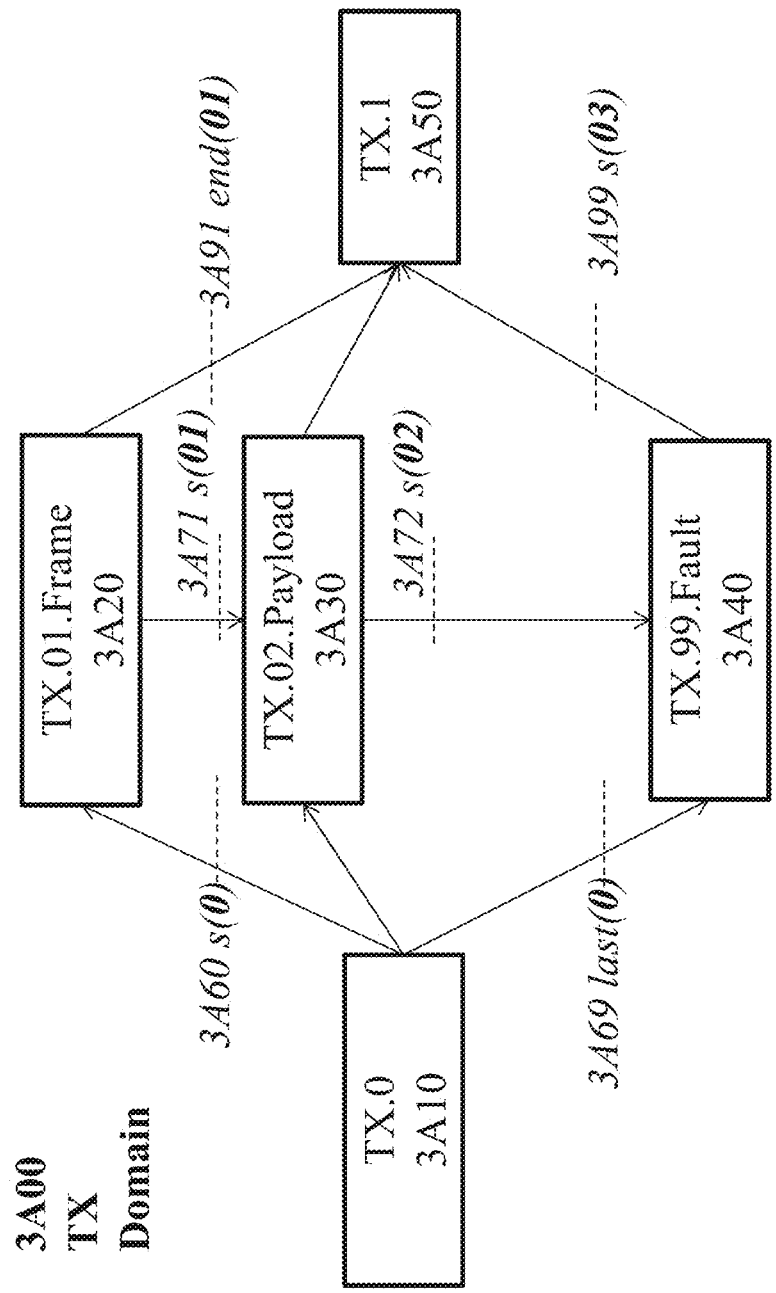
FIG. 3A illustrates an example of a domain for an SWM that provides examples of objects for a radio transmission capability and relationships thereof.

FIG. 3A An Example SDR Web Machine Protocol Domain: TX

As explained above, a symbol may be a member of a domain. One domain for an SWM is the radio protocol domain for Long Term Evolution (LTE). The radio protocol domain may be denoted according to a symbol notation 2A00 and may be used to validate symbols that are used to generate data that are transmitted as radio signals. For simplicity, the radio protocol domain will be referred to as [TX]. A symbol for the domain [TX] may contain a symbol for a data object, 'FRAME'. The symbol for the data object may be noted in a (Self) as a (thing) (FRAME), denoting a synchronization request for the [TX] domain. Other symbols that are members of the domain [TX] may include 'GET' and '4G SDR controller' denoting requests to get or post information to a message. Accordingly, an example notation for the domain [TX] may take the example form of [TX (FRAME) (GET) (4G SDR controller)]).

FIG. 3A illustrates an example block diagram for circuitry that is configured to realize the domain [TX]. In particular, the illustrated example includes the example domain [TX] that includes member symbols for Frame, and Payload controller requests, which may be noted [TX (FRAME) (4G Payload)]) according to notation 2A00 in a (Self) 1A90. Circuits of a domain [TX (FRAME) (4G Payload)] may be termed circuits for an TX domain 3A00. Circuits of the TX domain 3A00 for example may include a circuit 3A10 that embodies a fixed symbol 'TX.0' that may indicate a circuit serving as a point of entry into a collection of circuits expressing an TX domain. Circuits of the TX domain 3A00 for example may include a circuit 3A20 that embodies a fixed sequence number 01, the first member of such a domain, and that further embodies a fixed object, FRAME, indicating an TX synchronization request, according to notation for a circuit (e.g. in VHDL, noted TX.01.FRAME at 3A20 embodying a fixed text value, 'FRAME'). Circuits of the TX domain 3A00 may include a circuit 3A30 that embodies a second member of an TX domain enumerated as such via a fixed sequence number 02 and that further embodies a fixed data object, TX.02.Payload, embodying a variable value of an LTE payload. Circuits of the TX domain 3A00 may include a circuit 3A40 that may embody a fixed sequence number 99 and that further may embody a fixed data object, TX.99.Fault, embodying a fixed text value, 'Fault'. Circuits of the TX domain 3A00 may include a circuit 3A50 that embodies a fixed object, TX.1, an object that terminates a domain TX. Circuits of such a terminating object TX.1 may signal other circuits of a failure to match items of a TX domain. In some embodiments, in validating an unknown data object X with respect to this TX domain, a circuit TX.0 may provide wires to various circuits beginning at circuit 3A60 and to a last circuit 3A69, for all the members of the domain. Based on these wires, a comparison of object X to each object of such a TX domain may be enabled and/or performed. In some embodiments the comparison may be performed in parallel for all enumerated members TX.01 to TX.03, yielding a result TX.1, the end of the domain, in case there is no match to such a domain. Intuitively, TX.0 may be a circuit accessing all members of a domain TX while TX.1 may be a circuit accessing none of the members of such a domain. In some embodiments, for each domain there may be a circuit domain.0 (read "dot zero") accessing all members of a domain and a related object domain.1 (read "dot one") representing none of the elements of such a domain, but specifically as a terminating object of that domain. In some embodiments, circuits dot zero and dot one may interconnect across domains to realize further finite properties of domains, such as that one domain may form a subset of another domain.

Circuits of an example TX domain 3A00 may include a successor circuit 3A60, denoting the relationship "successor of zero" compactly as "s(0)"; more specifically s(TX.0) may indicate a successor object, TX.01.FRAME of an object TX.0; an example successor circuit 3A71, s(01), more specifically s(TX.01.FRAME) may indicate a successor object, of an object TX.01.FRAME; an example successor circuit 3A72, s(02), more specifically s(TX.02.GET) may indicate a successor object, TX.03.4G SDR controller, of an object TX.02.4G SDR controller; other successor circuits may indicate further successors of a given object of such a domain; ultimately an enumerated object termed a "Fault" may enable a Fault object X having a value "Fault" to match an [TX] domain as an TX.04.Fault object. In some embodiments such a Fault member of a domain may enable a fault object to match a given domain. Circuits of such a Fault object may connect domain circuits to fault management circuits or may handle faults (e.g. by ignoring an input that would attempt to use a successor of TX.4G SDR controller). Other successor circuits 3A91 through 3A99 may enable connection between each object of a domain and a distinguished domain terminating object, e.g. TX.1. Circuits 3A91 to 3A99 connecting a given object to a terminating object may indicate in circuits that a match to a domain object 3A20 through 3A40 has matched circuits of a domain TX. An example successor circuit 3A99, s(03), more specifically s(TX.03.Fault) may indicate a successor object 3A50, TX.1, a domain terminating object, of a starting object TX.03.Fault; an example type of successor circuit 3A91, end(01) may associate an object with a terminal object 3A50, TX.1, more specifically s(TX.01.Frame) that may indicate a domain ending successor object 3A50, TX.1, of a starting object TX.01.Frame. Other relationships in addition to those thus far illustrated may be included in order to perform logic related to such a domain.

FIG. 3B An Example SDR Web Machine RX Domain

As explained above, a symbol for a place of an SWM may include a domain, such as a symbol for one or more abstract places. An SWM may include a domain of receiving a radio signal (e.g. a [RX Domain] place at 3B00). The symbol for the place [RX Domain] illustrated in FIG. 3B may contain symbols for all such RX Domain states, RX Domain.0 at 3B10; for all states of an RX Domain such as a state of testing an incoming signal for noise versus signal, termed squelch in radio engineering, RX Domain.01.Squelch at 3Be0. Given Squelch, a radio state machine may then look for a frame, RX.02.Frame, RX Domain.02.Chair, at 3B30. In some embodiments, a RX Domain may include a Fault object at 3B40 and a domain terminating object, RX Domain.1 at 3B50; such a RX Domain may include circuits 3B60 enumerating objects of such a domain, circuits 3B71 enumerating a successor of an object, and circuits 3B91 indicating the end of the domain with a terminating object RX Domain.1 at 3B50. A RX Domain may consist of any number of different fixed data objects representing, for example, states of a radio state machine specified by a standard like LTE. Such a RX Domain and its members may correspond to a (Self) notation [RX Domain (Squelch) (Frame)] according to which circuits 3B00 may be validated as to number of RX Domain and members of a RX Domain via circuits 1B91 and 1B93.

It is noted that the circuitry illustrated in FIG. 3B for the RX domain may operate similarly to the circuitry of FIG. 3A (e.g., circuitry 3A10 operates similarly to circuitry 3B10, etc.). The domain being hard-coded into the circuitry of FIG. 3B is different from the domain being hard-coded into the circuitry of FIG. 3A (e.g., FIG. 3A is for a TX domain, while FIG. 3B is for a RX domain).

FIG. 3C An Example SDR Web Machine Control Domain

As explained above, a symbol for a place of an SWM may include abstract domains such as a domain of Control laws for conducting an SDR controller transaction, e.g. a [Control laws] place illustrated in FIG. 3C at 3C00. The symbol for a place [Control laws] may contain symbols for all such Control law modes, Mode.0 at 3C10; for a specific Control laws such as a receiver (RX) mode associated information such as a name of a card holder, a billing address, a card expiration date, and additional information, for example embodied in circuits of a Control laws domain at Control laws.01.C1 at 3B20. Other Control laws may be embodied in circuits Control laws.02.C2, at 3B30 and millions of such cards enumerated in circuits of such a domain. In some embodiments, a Control laws domain may include a Fault object at 3B40 and a domain terminating object, Control laws.1 at 3B50; such a Control laws domain may include circuits 3B60 enumerating objects of such a domain, circuits 3B71 enumerating a successor of an object, and circuits 3B91 indicating the end of the domain with a terminating object Control laws.1 at 3B50. A Control laws domain may consist of any number of different fixed data objects representing, for example, control laws known to an SWM. Such a Control laws domain and its members may correspond to a (Self) notation [Control laws (C1) (C2) . . . (C2,000,000)] e.g. containing two million control laws according to which circuits 3B00 may be validated as to number of Control laws and members of such a Control laws domain via circuits 1A91 and 1A93.

It is noted that the circuitry illustrated in FIG. 3C for the Control domain may operate similarly to the circuitry of FIG. 3A (e.g., circuitry 3A10 operates similarly to circuitry 3C10, etc.). The domain being hard-coded into the circuitry of FIG. 3C is different from the domain being hard-coded into the circuitry of FIG. 3A (e.g., FIG. 3A is for a TX domain, while FIG. 3C is for a Control domain).

FIG. 3D An Example SDR Web Machine Crypto Domain

As explained above, a symbol for a place of an SWM may include abstract domains such as a domain of cryptographic exchange laws for conducting an SDR controller transaction, e.g. a [Crypto] place illustrated in FIG. 3D at 3D00.

It is noted that the circuitry illustrated in FIG. 3D for the Crypto domain may operate similarly to the circuitry of FIG. 3A (e.g., circuitry 3A10 operates similarly to circuitry 3D10, etc.). The domain being hard-coded into the circuitry of FIG. 3D is different from the domain being hard-coded into the circuitry of FIG. 3A (e.g., FIG. 3A is for a TX domain, while FIG. 3D is for a Crypto domain).

FIG. 3E An Example SDR Web Machine HTTP Domain

As explained above, a symbol for a place of an SWM may include abstract domains such as a domain of Control laws for conducting an SDR controller transaction, e.g. a [HTTP] place illustrated in FIG. 3E at 3E00.

It is noted that the circuitry illustrated in FIG. 3E for the HTTP domain may operate similarly to the circuitry of FIG. 3A (e.g., circuitry 3A10 operates similarly to circuitry 3E10, etc.). The domain being hard-coded into the circuitry of FIG. 3E is different from the domain being hard-coded into the circuitry of FIG. 3A (e.g., FIG. 3A is for a TX domain, while FIG. 3E is for an HTTP domain).

Figure 4:
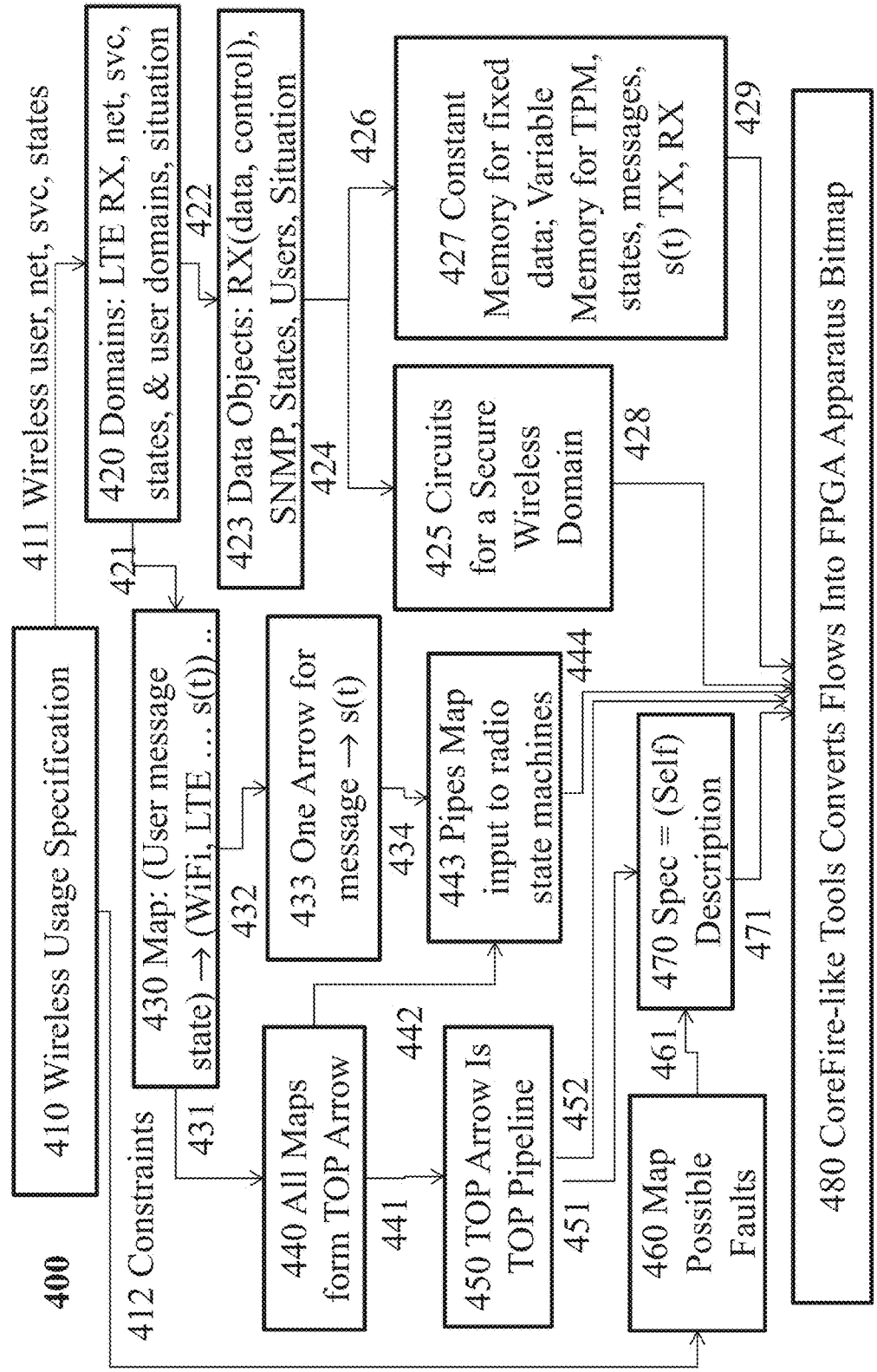
FIG. 4 illustrates an example flow chart that depicts a method for transforming a wireless access usage specification into a representation of an SWM that can be implemented by an apparatus, such as an ASIC or FPGA.

FIG. 4 General Method for Transforming a Specification into an SWM

FIG. 4 illustrates an example flow chart that depicts a method for transforming a wireless usage specification into an SWM. The method 400 illustrated in FIG. 4 may result in the generation an FPGA image that includes data for generating circuitry for each of the data objects, pipes, arrows, and memory blocks that will form an SWM. The method may begin from a specification that describes the SWM (e.g., as discussed in connection with FIG. 2B). A specification of an SWM may comprise text 2B 100 providing a human readable specification in a natural language such as English, Chinese, etc. Examples of such specifications include human-readable source code of one or more computer programming languages, comments to the code, software-generated log files, and results of software tools for reverse-engineering of software such as JVM code for Java or un-compiled instructions of binary executable code in addition to the purpose-written type of specification provided in standards like LTE and illustrated in 2B100. Such specifications may be mapped via a computer algorithm such as a Deep Learning algorithm to a symbolic notation of FIG. 2A. Such illustrations employed do not limit the applicability of this invention to other forms of human and machine-generated and human or machine-readable specifications of the logic of a computing machine. Via symbol notation 2A00, such an SWM specification 2B 100 and related source material may be expressed more compactly in a symbolic form 2B200. A method for transforming specifications 2B100 and 2B200 into an SWM comprising circuits according to FIGS. 3A through 3E and various DUPPL machine specifications is represented in FIG. 4. Briefly, a human readable form 2B100 may guide the use of process 400, while a symbolic form 2B200 may comprise a (Self) description some or all of which may be embodied into the (Self) 1A90 of a resulting machine.

At step 410, a specification may be received (e.g., from a designer). The specification may be a wireless usage specification (e.g., a definition of one or more functions for wireless usage). The specification may comprise a statement as illustrated briefly in 2B100 of FIG. 2B. The specification may include data indicating constraints regarding usage of a resulting SWM, such as that it may transfer only 120 characters in a single text message, and that it may access movie content from various sources (e.g., NetFlix®) in rating categories G, PG, and PG13 (shown in 2B100 and 2B200), and potentially many other such constraints. The specification may identify many other specifications such as the LTE standard and release number that includes LTE encryption (e.g. from the 3GPP standards organization); the GPS standard for location information; HTTP, HTML or other web service standard; the TPM and NIST AES encryption standards; and others. The specification may include data indicating various types of users, types of wireless services, and various states of an overall situation (such as location, speed of motion if any, etc.) as may be expressed in such a set of specifications. In the case of example specification 2B 100, the specification may include data indicating that an SWM is to be capable of processing according to the LTE protocol and is to be capable of processing messages such as text messages, and is capable of providing access to a database of movies for rent (e.g. via NetFlix®). Based on the data included in a specification, the various pipes, domains, variable objects, maps, etc., may be determined and converted to a FPGA image (e.g., a specification may be used to generate an FPGA image that configures an SWM to allows the reading of text and the viewing of G-rated movies). In general, the method of FIG. 4 may be used to generate an FPGA image that configures an SWM to perform the various functions discussed throughout this disclosure (e.g., the embodiments discussed in connection with FIGS. 1-3).

At step 411, a list of domains may be determined based on the state and situation information in the specification 410. The state and situation information may include, for example, data identifying a user, a wireless network, one or more services (svc), and various states of an overall situation. The determined list of domains 420 may include domains for WiFi®, LTE, GPS, a list of approved ratings of movies for rent, radio control laws, and various services expressed, for example, in English in 2B100 and expressed in symbol notation in 2B200. The determined list of domains 420 may include the domains illustrated in connection with FIGS. 3A-3E. Such domains may include user information domains (e.g. Name, Address, Affiliation, email address), radio control law domains (containing radio state machines, control parameters), and other such clearly specified sets of values allowed in such a machine.

At step 430, based on the list of domains (e.g., as shown at flow 421), a list of maps may be determined for converting symbols among the determined domains. The list of maps may include the maps needed to realize the SWM examples discussed throughout this disclosure (e.g., the maps for the various DUPPL machines in FIG. 1A and/or maps used to configure circuitry 1B40 and 1B82 of FIG. 1B). As another example, the list of maps may be based on a state machine for an LTE protocol (similarly, the domains would have one or more domains related to the LTE protocol). Accordingly the list of maps may include a map from a given state (e.g. idle) to a next state (e.g. sending data) that may occur upon reception of a given input (e.g. request to send). A map between states of an LTE state machine may map a state change to an output (e.g. a message to be sent) so that a state change is accompanied by the generation of a required output. The list of maps may be based on state machines of other radio protocols (e.g. WiFi) and, therefore, the list of maps may include a map between states of a state machine for the other radio protocol. The list of maps may be based on state machines for encrypting and decrypting messages according to states of a TPM and local conditions such as location and speed measured (e.g. by a GPS reception of such a SWM). Accordingly, the list of maps may include maps related to encrypting and decrypting messages.

At step 423, based on the list of domains (e.g., as shown at flow 421), a list of objects may be determined. In some arrangements, the list of objects may include at least one object for each domain in the list of domains. An SWM, for example, may include a Domain termed LTE RX and the objects for that domain may be specified according to notation 2A00 to express a hierarchical Domain thing (4G SDR controller frame) of 2B200 that contains data elements ([(Header), (Content), (control law number)]). Further objects of other domains may comprise an object for an entertainment domain compactly noted in 2B200 as a path for {Receiving [Movie [NetFlix [Ratings (G) (PG) (PG13)]] }, allowing certain ratings of movies to be viewed.

At step 425, circuitry for a secure wireless domain may be determined based on the objects (e.g., as noted at flow 424). The circuitry for the secure wireless domain may include circuitry forming hard-wired representations of the domains and circuitry that form pipes that may be fixed during the operation of such a SWM. In some embodiments, the circuitry for the secure wireless domain may, for example, include the circuitry for the Crypto domain according to FIG. 3D and the circuitry for the TPM.

At step 427, memory block circuitry may be determined based on the objects (e.g., as noted at flow 426). The memory blocks may be configured to include a fixed value (e.g., a memory block for a constant) or a variable value (e.g., a memory block for a variable object). For example, names of domains may be fixed into memory block circuits, while memory blocks that serve as the input and output ports of pipes may be variable (e.g., memory blocks 1B10, 1B30, 1B50, 1B70, 1B81, 1B83 and 1B85 of FIG. 1B). Memory blocks for storing the states of the TPM may be variable. Memory blocks for storing a received message or a portion thereof may be variable (e.g. memory blocks for memory 1A250 of FIG. 1A). Similarly, memory blocks for storing a message or a portion thereof that is to be transmitted may be variable (e.g., memory blocks for memory 1A220 of FIG. 1A). Additionally, memory blocks for storing the symbols that are transmitted via the various DUPPL machines of an SWM may also be variable (e.g., memory blocks for memory 1A220 and 1A250 of FIG. 1A). Memory blocks for storing a received signal (e.g., radio signal s(t), as discussed in FIGS. 1A-1C) may be variable.

At step 440, based on the list of maps (as shown by flow 431), a collection of maps for the various DUPPL machines of the SWM may be determined. The collection of maps may be a top-level collection termed a TOP arrow and may serve to represent the organization of the domains, objects, and pipes of the SWM.

At step 433, based on the list of maps, associations for the arrows may be determined. The associations may represent different arrows than the one determined at step 440 and/or be based on the arrow determined at step 440. For example, the associations may indicate logical choices (e.g. forming branches of pipes), choices (joining pipes), levels of detail (forming hierarchies of pipes), inverse relationships, identity relationships, and logic paths between domains forming parallel pipelines, and the like. Based on the associations determined at step 433 and the TOP arrow determined at step 440 (as shown via flows 434, 442 and 441), steps 443 and 450 may be performed to determine a complete set of pipes for the SWM (e.g., pipes for the TOP arrow and other pipes).

Throughout steps 430, 433, 440, 443 and 450, and based on constraints indicated in the specification (as shown via flow 412), various fault conditions may be determined. These fault conditions may establish a listing of maps for possible faults. These maps may be used to determine circuitry for the fault recovery mechanisms of an SWM (e.g., the connections from circuitry 1B94 to circuitry 1B80 in FIG. 1B). Fault recovery mechanisms may include, for example, the ignoring of faulty data, requesting retransmission, and machine learning of DUPPL machines.

At step 470, a (Self) description may be determined based on steps 450 and 460 (as indicated by flows 451 and 461). The (Self) may be determined by combining symbolic forms of the arrows determined at steps 450 and 443, the objects determined at steps 425 and 427, the constraints of the specification, and the fault recovery mechanisms.

Based on the above, steps (as indicated by flows 428, 429, 444, 452 and 471), an FPGA image may be determined that will configure an FPGA as the SWM. The FPGA image may include a representation of the circuitry (e.g., via a VHDL language) required to configure an FPGA as the SWM. In some arrangements, the FPGA image may be usable to configure an FPGA to perform the LTE and/or 4B-related functions of the SWM (e.g., as described in connection with FIGS. 1A-1C), or the other various embodiments of the SWM described throughout this disclosure. For example, the FPGA image may be usable to configure an FPGA to perform the video-use case discussed in connection with FIG. 1D. The FPGA image may be usable to configure to an FPGA to perform the SWM management use case described in connection with FIG. 1E. After generating the FPGA image, the FPGA image may be compiled into the FPGA. Compiling the FPGA image may result in the configuration of the SWM. In some embodiments, the SWM may operate within specified constraints, may mutually authenticate a management entity, and may accept uploads securely via time-variable TPM operation for remote management of such a soft-wired machine.

The above discussion of the method 400 illustrated in FIG. 4 can be summarized as follows: the method may begin by receiving a definition of one or more functions for wireless usage to be implemented in an apparatus, wherein the one or more functions include receiving a radio frequency signal that conforms to a Long Term Evolution (LTE) standard and/or is received via a 4G wireless network and its intended usage by given users. The method may proceed by determining a list of domains, a list of objects and a list of maps based on the definition. Based on the lists and/or information from the description, the circuitry components required to configure the SWM to perform the one or more functions may be determined. This may include, for example, determining various pipe circuitry, various memory blocks, circuitry for a (Self), circuitry for fault management, and the like (e.g., determine circuitry for the components discussed at FIGS. 1-3). For example, in some arrangements, the method may include determining, based on the list of domains and/or the list of maps, domain validation pipe circuitry to produce a plurality of domain validation pipe circuits that are each configured to validate input as having a valid value according to at least one domain in the list of domains (e.g., circuitry 1B20 and/or circuitry 1B60); determining, based on the list of domains and/or the list of maps, domain mapping pipe circuitry to produce a plurality of domain mapping pipe circuits that are each configured to map input between a first domain in the list of domains to a second domain in the list of domains (e.g., circuitry 1B40); determining, based on the list of objects, memory block circuitry to produce a plurality of memory block circuits, the plurality of memory block circuits being configured to at least (a) provide input to and receive output from the plurality of domain validation pipe circuits and (b) provide input to and receive output from the plurality of domain mapping pipe circuits (e.g., memory 1A220, memory 1A250, memory blocks 1B10, 1B30, 1B50 and/or 1B70); determining, based on constraints specified in the definition, self-description circuitry that defines what the apparatus is configured to perform (e.g., (Self) circuitry 1B90, (Self) circuitry 1A90); determining fault recovery circuitry configured to perform fault recovery if other circuitry generates a fault (e.g., circuitry 1B80, the connections to circuitry 1B80 from circuitry 1B94, and/or circuitry 1A80); and implementing the plurality of domain validation pipe circuits, the plurality of domain mapping pipe circuits, the plurality of memory block circuits, the self-description circuitry and/or the fault recovery circuitry into the apparatus such that the apparatus is configured to perform the one or more functions. In some arrangements, the implementing may be based on an FPGA image that represents the various circuitry components that need to be implemented.

FIG. 5A, a Conventional Mechanization of an SDR Controller Application

FIG. 5A illustrates the time line of operation of an SDR controller application 5A00 on a general purpose computer having an operating system and communications application realized via a contemporary von Neumann central processing unit (CPU) having an instruction set architecture (ISA) with registers and a random access memory (RAM). The time line across the top of FIG. 5A illustrates how a conventional computer executes a web services application, each step in sequence. At each time T1, T2, etc. the operating system (OS) and applications share various instruction registers of various CPUs, saving persistent information in a large shared RAM that may be more permanently stored on non-volatile memory such as a hard drive. For example, at time T1, an Interrupt Service Routine (ISR) may respond to a hardware interrupt from the Binary Input Output System (BIOS) of an incoming packet. At time T2, the CPU then may push the data into a stack of data maintained by the OS where it may be copied into memory associated with an Ethernet process, storing messages in random access memory (RAM). At time T3, an LTE application may recognize (via instructions operating in the CPU) that the messages comprise a GET request. In such a case at time T4, the OS may call other Ethernet software libraries to convert an HTML message document "<!doctype . . . > e.g. containing a list of products for sale to be loaded into cache for transmission at time T5. Such a conventional communications application of a general purpose computer 5A00 may consume a certain amount of power through the operation of its CPU, RAM, hard drive, and other computing and communications components. The presence in general purpose computer 5A00 of CPU, OS, RAM, and software provides communications via a machine having myriad attack surfaces by which APT malware otherwise may manipulate such an SDR controller application to the detriment of those involved.

FIG. 5B SDR Web Machine Mechanization of the Same SDR Controller Application In contrast to such a conventional general purpose computer, an SWM may comprise hardware having pipes and arrows developed via processes 9A and 9B to result in a useful embodiment such as an FPGA illustrated in FIGS. 12A and 12B. A timing diagram 5B00 illustrates the timing of data that may flow through the resulting pipes of logic; e.g. logic that forms packets at time X1 from the signals received at an Ethernet cable; further pipes of soft-wired logic that extract messages from such packets at time X2; packets that may be provided via soft-wired logic of pipes that recognize an LTE GET request at time X3 providing such an HTML document at that time; and having further pipes of soft-wired logic that may recognize an LTE GET/ products request at time X4 generating a Products Message previously stored in read only memory; comprising further pipes which at time X5 may convert such a Products Message into a form of packets at an Ethernet cable addressed to appear at the IP address that issued such a Get/products request. Thus, SDR Web Machine timing diagram 5B00 illustrates a flow of digital information via soft-wired pipes and circuits employing block memory for intermediate results and employing fixed data to deliver content in messages as may be suited to an SDR controller application.

Such an SWM as illustrated at 5B00 employs no shared CPU containing registers for data since each intermediate variable may be represented in its own variable object memory block connecting a given pipe to a subsequent pipe; the value of each such variable object may be constrained by domains soft-wired into such an SWM, checked for conformity to such domains via pipes and arrows implicit but not explicit in the flow of 5B00. The absence of CPU, OS, RAM, and software in SDR Web Machine 5B00 may provide information processing in a machine having no attack surfaces by which malware otherwise may have manipulated such an SDR controller application to the detriment of those involved.

Such an SWM 5B00 may consume a certain amount of power through the operation of its pipes and related communications components on a per-packet basis. The total power dissipated by such an SWM 5B00 described in FIGS. 1A through 12B may be significantly less than that of a conventional computing machine performing web services applications, 5A00. Such an SWM 5B00 therefore may be termed a green computing machine.

In summary regarding FIGS. 5A and 5B, APT malware may infect random access memory (RAM) of a general purpose computer. In contrast, SDR Web Machine 5B00 retains information in the isolated memory blocks that cannot be randomly accessed. Specifically, the memory blocks of an SWM can only be accessed via hardware of pipes that perform various functions such as validation checks on symbols as they are passed through the pipe circuitry. As a result of such validation, each such memory block may contain only validated results that satisfy the constraints of the soft-wired domains of the specific application 9B00 being realized in such an SWM. Thus, the circuits of an SWM may prove much more resistant to software and network-based malware that uses RAM, and in some cases may be impervious to the types of malware that prey on computers having RAM.

FIG. 6, Autonomous Learning

FIG. 6 illustrates example SDR Web Machine circuitry for fault recovery (FIG. 1, at 1A80) via autonomous learning, e.g. via interacting with an external entity such as a user or such as another SDR Web Machine without human intervention to update the soft-wiring of such an SWM. An interactive fault recovery circuit 1A80 may be further explained with reference to FIG. 6. A symbol (Fault f) may occur at memory block 601. Circuits 610 may lookup f in a lookup table 621 via symbol g1 containing previously learned responses to resolve such a fault; finding such a response, learning circuitry may convey such an action (via paths implicit but not explicit in FIG. 6) via circuits 1A86 at a fault recovery interface 640; not finding such a previously learned result, learning circuits 610 may search further at 612 for resources in a (Self) description 1A90; A symbol g2 thus retrieved from a (Self) 1A90 may specify steps of a dialog for interactive fault resolution, e.g. via a dialog with a user moderated via fault recovery circuits 623 and resulting in the storage of a (fault, response) pair (f,g) in Lookup Table 621. A circuit 631 may apply resulting symbol g as an/Action(result) at 1A85. A fault f may be unresolved, concluding the dialog, e.g. by sending an error message. Dialog circuits 623 may include a case-base of known fault-response situations. A best match of such a case base may revise pair (f1,g1) of such a case base to a new symbol sent to a user, e.g. to display such a symbol as a candidate solution via circuits 1A86; in the process circuits 631 may record an audit trail of fault f, self-description 613, and responses g that may occur in such a dialog. A user may respond via input port that may be transferred via fault path, e.g. 1A21 to be transferred to interactive dialog circuits at 623. Circuits 623 may further compare user response to symbols of {g1}. Such a response may resolve the fault via interaction 623, causing g to be employed and causing a (fault, recovery) pair (f,g) to be retained in Lookup Table 621 and in case base 623. That failing, a dialog may continue via 623 until {dialog script g} may be exhausted, at which point, circuits 623 may report to the user that fault f is unresolvable.

The invention claimed is:

1. An apparatus comprising:
first circuitry configured to embed a first plurality of domains associated with a first domain-specific user-defined parallel pipelined learning (DUPPL) machine;
second circuitry configured to receive a signal;
third circuitry configured to generate, based on the signal, a first input symbol;
fourth circuitry configured to validate, according to a first domain, that a value of the first input symbol conforms to the first domain, wherein the first domain is one of the first plurality of domains;
fifth circuitry configured to generate an output symbol by mapping the first input symbol from the first domain to another domain of the first plurality of domains; and
sixth circuitry configured to generate a random challenge for transmission to a paired device;
wherein the paired device is configured as a second DUPPL machine;
wherein the random challenge includes an identifier of the apparatus, first data based on a time domain, and second data based on an index domain;
wherein the time domain and the index domain are embedded in seventh circuitry of the apparatus;
wherein the identifier of the apparatus is embedded in circuitry of the second DUPPL machine; and
wherein the signal comprises a signed response to the random challenge.

2. The apparatus of claim 1, wherein the apparatus has no registers; no central processing unit (CPU); no Random Access Memory (RAM); no instruction registers; no Instruction Set Architecture (ISA); no operating system (OS); and no applications programming; and
wherein the second DUPPL machine has no registers; no central processing unit (CPU); no Random Access Memory (RAM); no instruction registers; no Instruction Set Architecture (ISA); no operating system (OS); and no applications programming.

3. The apparatus of claim 1, wherein the signal conforms to a Long Term Evolution (LTE) standard and/or is received via a Fourth Generation (4G) wireless network.

4. The apparatus of claim 1 further comprising:
eighth circuitry configured to transmit the output symbol to a third DUPPL machine that embeds, within hardware of the third DUPPL machine, a second plurality of domains;
wherein the output symbol is configured to cause the third DUPPL machine to:

generate, based on the output symbol, a second input symbol, and validate, according to a second domain of the second plurality of domains, that a value of the second input symbol conforms to the second domain.

5. The apparatus of claim 1 further comprising:

eighth circuitry configured to store a self-description of the apparatus, wherein the self-description provides a description of what the apparatus is configured to perform, and wherein the self-description includes an indication that the apparatus is configured to receive an LTE frame and a payload associated with the LTE frame.

6. The apparatus of claim 1 further comprising:

eighth circuitry configured to cause the apparatus to ignore the signal if the value of the first input symbol is invalid.

7. The apparatus of claim 1, wherein the first circuitry through the sixth circuitry are embodied in one or more field-programmable gate arrays (FPGA) or one or more application-specific integrated circuits (ASIC).

8. An apparatus comprising:

first circuitry configured to embed a first plurality of domains associated with a first domain-specific user-defined parallel pipelined learning (DUPPL) machine;

second circuitry configured to receive a first output symbol from a second DUPPL machine that embeds, within hardware of the second DUPPL machine, a second plurality of domains, and wherein the first output symbol is based on the second DUPPL machine validating, according to a second domain of the second plurality of domains, that a value of a symbol conforms to the second domain;

third circuitry configured to generate, based on the first output symbol, a first input symbol;

fourth circuitry configured to validate, according to a first domain, that a value of the first input symbol conforms to the first domain, wherein the first domain is one of the first plurality of domains;

fifth circuitry configured to generate a second output symbol by mapping the first input symbol from the first domain to another domain of the first plurality of domains;

sixth circuitry configured to generate a random challenge for transmission to a paired device;

wherein the paired device is configured as a third DUPPL machine;

wherein the random challenge includes an identifier of the apparatus, first data based on a time domain, and second data based on an index domain;

wherein the time domain and the index domain are embedded in seventh circuitry of the apparatus; and wherein the identifier of the apparatus is embedded in circuitry of the third DUPPL machine.

9. The apparatus of claim 8, wherein the apparatus has no registers; no central processing unit (CPU); no Random Access Memory (RAM); no instruction registers; no Instruction Set Architecture (ISA); no operating system (OS); and no applications programming; and wherein the second DUPPL machine has no registers; no central processing unit (CPU); no Random Access Memory (RAM); no instruction registers; no Instruction Set Architecture (ISA); no operating system (OS); and no applications programming.

10. The apparatus of claim 8, wherein the first output symbol is associated with a message being sent according to a Long Term Evolution (LTE) standard.

11. The apparatus of claim 8 further comprising:

eighth circuitry configured to determine, based on the second output symbol, output data; and ninth circuitry configured to transmit the output data.

12. The apparatus of claim 8 further comprising:

eighth circuitry configured to store a self-description of the apparatus, wherein the self-description provides a description of what the apparatus is configured to perform, and wherein the self-description includes an indication that the apparatus is configured to receive an LTE frame and a payload associated with the LTE frame.

13. The apparatus of claim 8 further comprising:

eighth circuitry configured to cause the apparatus to ignore a signal being received by the apparatus if the value of the first input symbol is invalid.

14. The apparatus of claim 8, wherein the first circuitry through the seventh circuitry are embodied in one or more field-programmable gate arrays (FPGA) or one or more application-specific integrated circuits (ASIC).

15. A system comprising:

a first apparatus comprising:

first circuitry configured to embed a first plurality of domains associated with a first domain-specific user-defined parallel pipelined learning (DUPPL) machine;

second circuitry configured to receive a signal;

third circuitry configured to generate, based on the signal, a first input symbol;

fourth circuitry configured to validate, according to a first domain, that a value of the first input symbol conforms to the first domain, wherein the first domain is one of the first plurality of domains;

fifth circuitry configured to generate a first output symbol by mapping the first input symbol from the first domain to another domain of the first plurality of domains; and sixth circuitry configured to transmit the first output symbol;

seventh circuitry configured to generate a random challenge for transmission to a paired device;

wherein the paired device is configured as a second DUPPL machine;

wherein the random challenge includes an identifier of the apparatus, first data based on a time domain, and second data based on an index domain;

wherein the time domain and the index domain are embedded in eighth circuitry of the first apparatus; and wherein the identifier of the apparatus is embedded in circuitry of the second DUPPL machine; and a second apparatus comprising:

ninth circuitry configured to embed a second plurality of domains associated with a third DUPPL machine;

tenth circuitry configured to receive the first output symbol;

eleventh circuitry configured to generate, based on the first output symbol, a second input symbol;

twelfth circuitry configured to validate, according to a second domain, that a value of the second input symbol conforms to the second domain, wherein the second domain is one of the second plurality of domains;

thirteenth circuitry configured to generate a second output symbol by mapping the second input symbol from the second domain to another domain of the second plurality of domains;

fourteenth circuitry configured to determine, based on the second output symbol, second output data; and fifteenth circuitry configured to transmit the second output data.

16. The system of claim 15, wherein the first apparatus has no registers; no central processing unit (CPU); no Random Access Memory (RAM); no instruction registers; no Instruction Set Architecture (ISA); no operating system (OS); and no applications programming; and wherein the second apparatus has no registers; no central processing unit (CPU); no Random Access Memory (RAM); no instruction registers; no Instruction Set Architecture (ISA); no operating system (OS); and no applications programming.

17. The system of claim 15, wherein the signal conforms to a Long Term Evolution (LTE) standard and/or is received via a Fourth Generation (4G) wireless network.

18. The system of claim 15, wherein the signal comprises a signed response to the random challenge.

19. The system of claim 15, wherein the first circuitry through the fifteenth circuitry are embodied in one or more field-programmable gate arrays (FPGA) or one or more application-specific integrated circuits (ASIC).

20. The system of claim 15, further comprising:

sixteenth circuitry configured as a memory block disposed between the first DUPPL machine and the third DUPPL machine, wherein the memory block, based on the sixth circuitry transmitting the first output symbol, is configured to receive the first output symbol from the first DUPPL machine and store the first output symbol, and wherein the memory block is configured to be read by the third DUPPL machine to cause the tenth circuitry to receive the first output symbol.

* * * * *